(12) United States Patent
Kitora et al.

(10) Patent No.: US 8,274,667 B2
(45) Date of Patent: Sep. 25, 2012

(54) IMAGE PROCESSING APPARATUS, CONTROL METHOD THEREOF, AND STORAGE MEDIUM STORING A PROGRAM FOR CONVERTING RASTER IMAGE DATA INTO BLOCK VECTOR IMAGE FORMAT

(75) Inventors: Masakazu Kitora, Kawasaki (JP); Nobuaki Matsui, Kawasaki (JP); Keishi Inaba, Yokohama (JP); Tadaaki Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1289 days.

(21) Appl. No.: 11/910,102

(22) PCT Filed: May 22, 2006

(86) PCT No.: PCT/JP2006/310599
§ 371 (c)(1),
(2), (4) Date: Sep. 28, 2007

(87) PCT Pub. No.: WO2006/129577
PCT Pub. Date: Dec. 7, 2006

(65) Prior Publication Data
US 2008/0273218 A1 Nov. 6, 2008

(30) Foreign Application Priority Data
May 30, 2005 (JP) .................................. 2005-157607

(51) Int. Cl.
*G06F 3/12* (2006.01)
(52) U.S. Cl. ....... 358/1.13; 358/1.9; 358/1.14; 358/1.15
(58) Field of Classification Search .................. None
See application file for complete search history.

(56) References Cited

U.S. PATENT DOCUMENTS

| 4,566,128 | A | | 1/1986 | Araki |
| 5,276,515 | A | * | 1/1994 | Katsumata et al. ............ 348/704 |
| 5,285,723 | A | * | 2/1994 | Ichikawa et al. ................ 101/35 |
| 5,542,031 | A | | 7/1996 | Douglass et al. ............. 395/114 |
| 5,579,419 | A | | 11/1996 | Yaguchi et al. ............... 382/305 |
| 5,594,860 | A | * | 1/1997 | Gauthier ....................... 345/543 |
| 5,719,886 | A | * | 2/1998 | Matsui et al. ................. 714/763 |
| 5,850,504 | A | | 12/1998 | Cooper et al. ................ 395/117 |

(Continued)

FOREIGN PATENT DOCUMENTS
EP 0607988 A 7/1994
(Continued)

OTHER PUBLICATIONS

Japanese Official Communication dated Aug. 14, 2009, regarding Application No. 2005-157607.

(Continued)

*Primary Examiner* — Dung Tran
(74) *Attorney, Agent, or Firm* — Fitzpatrick, Cella, Harper & Scinto

(57) ABSTRACT

Raster image data is converted into block vector image data corresponding to blocks each having a predetermined size by segmenting the raster image data into the blocks with the predetermined size and executing vectorization processing. The input raster image data is converted into a block vector image. The converted block vector image is stored in a storage means. Transfer of the image data as a processing target in the apparatus is controlled to output the raster image data obtained by rasterizing the stored block vector image data.teh

25 Claims, 29 Drawing Sheets

U.S. PATENT DOCUMENTS

| | | | |
|---|---|---|---|
| 5,870,501 A | 2/1999 | Kim | |
| 5,930,001 A | 7/1999 | Satoh et al. | 358/296 |
| 6,031,631 A | 2/2000 | Tahara et al. | 358/296 |
| 6,067,097 A | 5/2000 | Morita et al. | 345/505 |
| 6,130,965 A | 10/2000 | Kobayashi et al. | 382/284 |
| 6,295,134 B1* | 9/2001 | Hughes | 358/1.13 |
| 6,611,632 B1 | 8/2003 | Tomiyama et al. | |
| 6,711,305 B2* | 3/2004 | Sakaegi | 382/300 |
| 6,970,262 B1* | 11/2005 | Saito | 358/1.15 |
| 6,985,255 B2* | 1/2006 | Saito | 358/1.9 |
| 7,023,455 B2* | 4/2006 | Matsuoka et al. | 345/660 |
| 7,103,833 B1 | 9/2006 | Sano et al. | |
| 7,202,964 B2* | 4/2007 | Christiansen | 358/1.15 |
| 7,352,481 B2* | 4/2008 | Christiansen | 358/1.13 |
| 7,397,852 B2* | 7/2008 | Sugiyama et al. | 375/240.02 |
| 7,565,011 B2* | 7/2009 | Matsunaga et al. | 382/173 |
| 7,821,657 B2* | 10/2010 | Ferlitsch | 358/1.13 |
| 7,864,199 B2* | 1/2011 | Utsunomiya et al. | 345/629 |
| 8,054,474 B2* | 11/2011 | Torii | 358/1.11 |
| 8,139,082 B2* | 3/2012 | Kitora | 345/619 |
| 2001/0038469 A1* | 11/2001 | Saito | 358/518 |
| 2003/0063666 A1* | 4/2003 | Sugiyama et al. | 375/240.03 |
| 2004/0008359 A1* | 1/2004 | Christiansen | 358/1.13 |
| 2004/0013316 A1* | 1/2004 | Park et al. | 382/276 |
| 2004/0062522 A1 | 4/2004 | Kitora et al. | |
| 2005/0111052 A1 | 5/2005 | Nishikawa et al. | 358/448 |
| 2005/0111053 A1 | 5/2005 | Yoshida et al. | 358/448 |
| 2005/0123209 A1 | 6/2005 | Kitora et al. | 382/243 |
| 2005/0162680 A1 | 7/2005 | Sekiguchi et al. | 358/1.13 |
| 2005/0271296 A1 | 12/2005 | Tsuji et al. | 382/275 |
| 2006/0008113 A1 | 1/2006 | Matsukubo et al. | 382/100 |
| 2006/0008114 A1 | 1/2006 | Sekiguchi et al. | 382/100 |
| 2006/0010115 A1 | 1/2006 | Yoshida et al. | 707/3 |
| 2006/0055952 A1* | 3/2006 | Ferlitsch | 358/1.13 |
| 2006/0244751 A1* | 11/2006 | Kitora | 345/501 |
| 2007/0279705 A1* | 12/2007 | Takiyama et al. | 358/453 |

FOREIGN PATENT DOCUMENTS

| | | |
|---|---|---|
| EP | 0 818 929 A2 | 1/1998 |
| EP | 1 533 745 A1 | 5/2005 |
| EP | 1 533 746 A2 | 5/2005 |
| JP | 59-47666 A | 3/1984 |
| JP | 7-73334 | 3/1995 |
| JP | 10-16319 | 1/1998 |
| JP | 10-79942 A | 3/1998 |
| JP | 10-307924 | 11/1998 |
| JP | 11-203061 A | 7/1999 |
| JP | 11-296670 A | 10/1999 |
| JP | 3111971 | 9/2000 |
| JP | 2004-120639 A | 4/2004 |
| JP | 2004-272485 A | 9/2004 |

OTHER PUBLICATIONS

Russell G. Congalton, "Exploring and Evaluating the Consequences of Vector-to-Raster and Raster-to-Vector Conversion," Journal of the American Society for Photogrammetry and Remote Sensing, vol. 63, No. 4, Apr. 1997, pp. 425-434.

Supplementary European Search Report issued in counterpart application No. 06746928.8 dated Jul. 7, 2010-12 pages.

Office Action issued Jun. 19, 2012 in counterpart EPO application No. 06746928.8.

* cited by examiner

F I G. 6
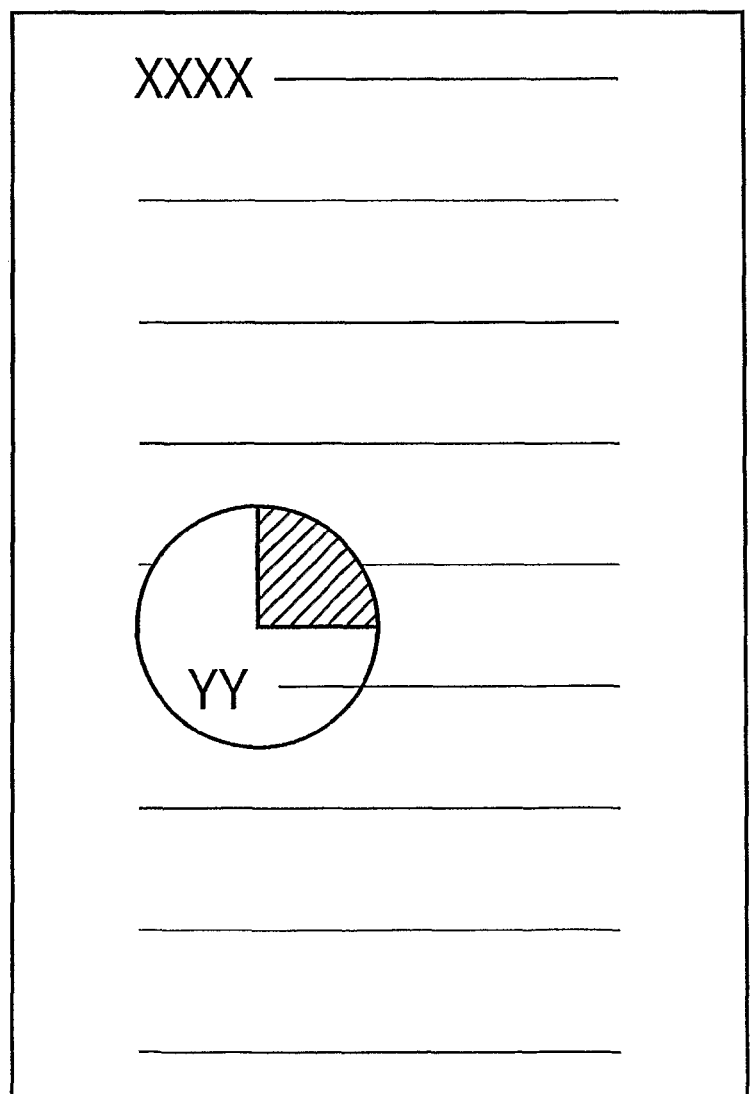

F I G. 14
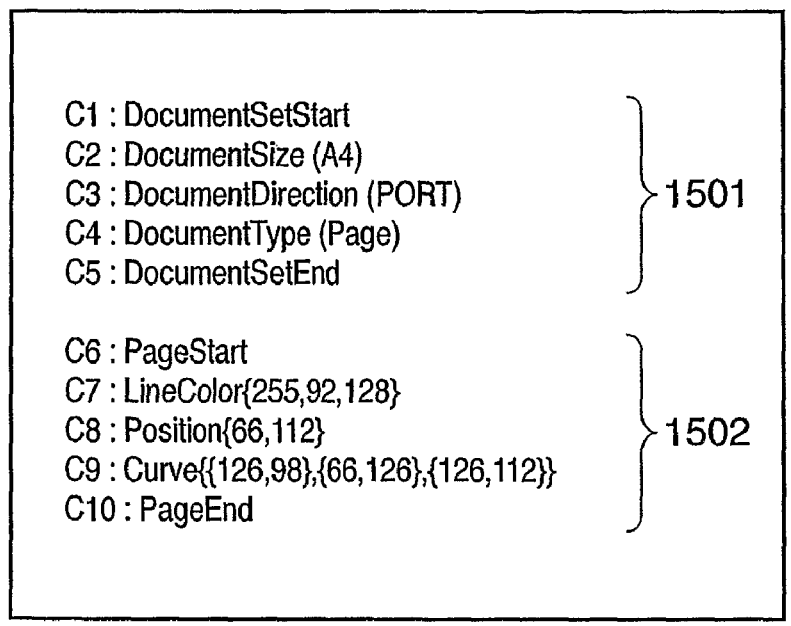

FIG. 15

C1 : DocumentSetStart  
C2 : DocumentSize (A4)  
C3 : DocumentDirection (PORT)  } 1601  
C4 : DocumentType (TILE)  
C5 : DocumentSetEnd C6 : PageStart C7 : TileStart(0,0)  } 1603  
C8 : TileEnd

.  
.

C100 : TileStart (2,3)  
C101 : LineColor{255,92,128}  
C102 : Position{2,16}  } 1606  } 1604  
C103 : Curve{{31,3},{1,15},{32,4}}  
C104 : Position{32,16}  } 1607  
C105 : Curve{{24,28},{26,30},{32,28}}  
C106 : TileEnd

.  
.

C120 : TileStart (3,3)  
C121 : LineColor{255,92,128}  
C122 : Position{0,4}  } 1608  } 1605  
C123 : Curve{{6,2},{8,6},{0,16}}  
C124 : Position{0,28}  } 1609  
C125 : Curve{{29,17},{1,29},{30,16}}  
C126 : TileEnd

.  
.

C500 : PageEnd

} 1602

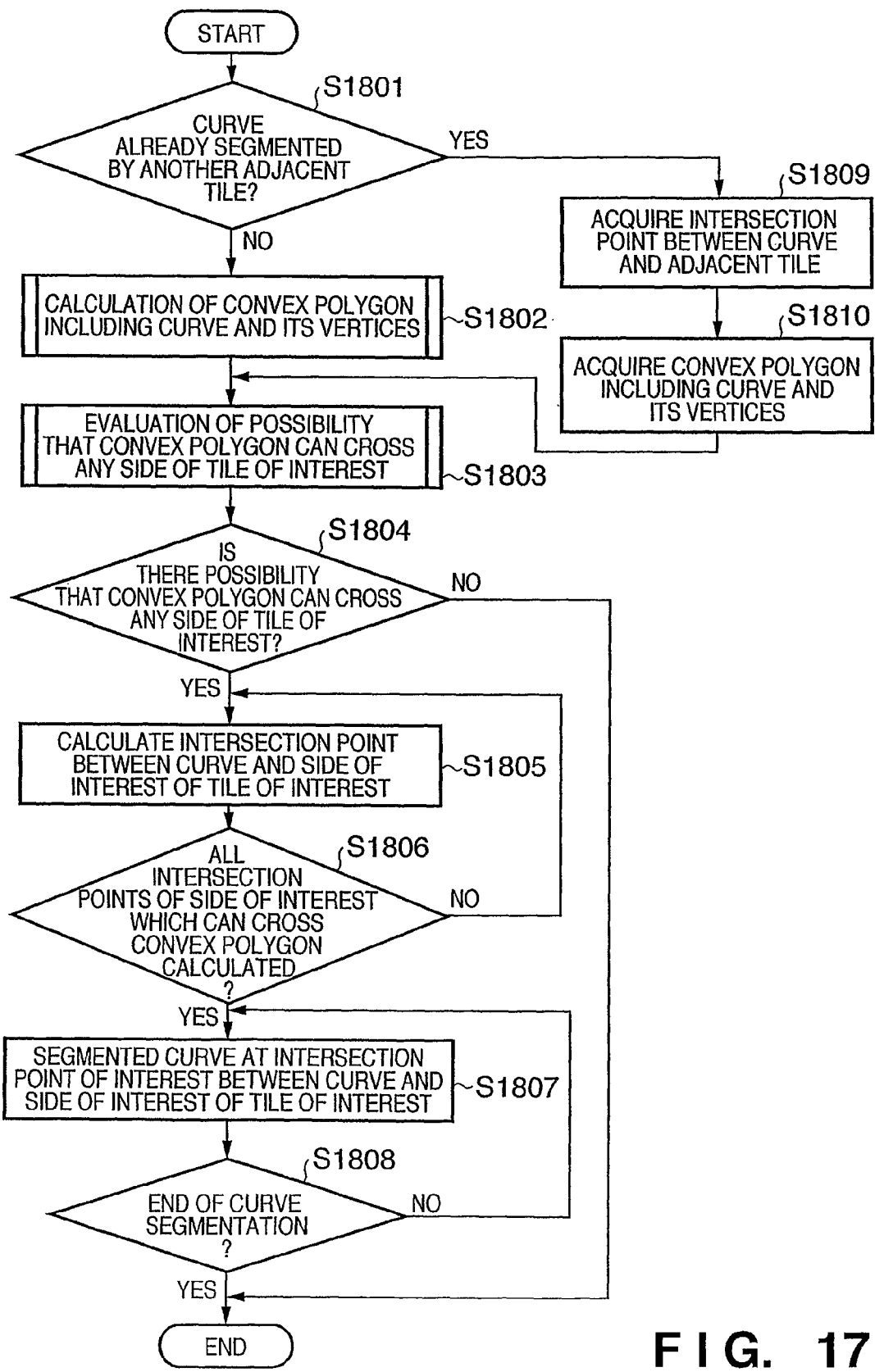
F I G. 17

F I G. 20
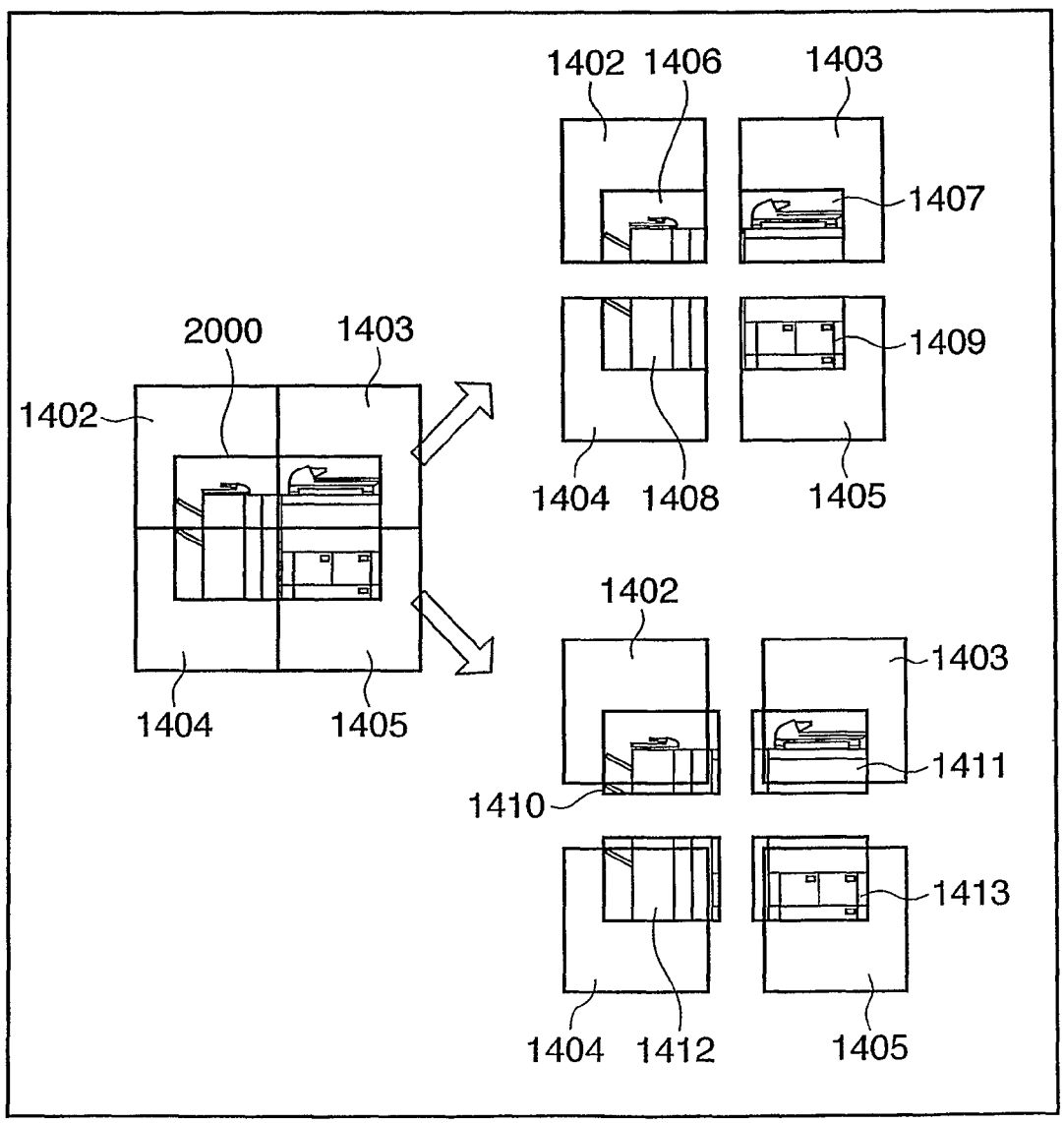

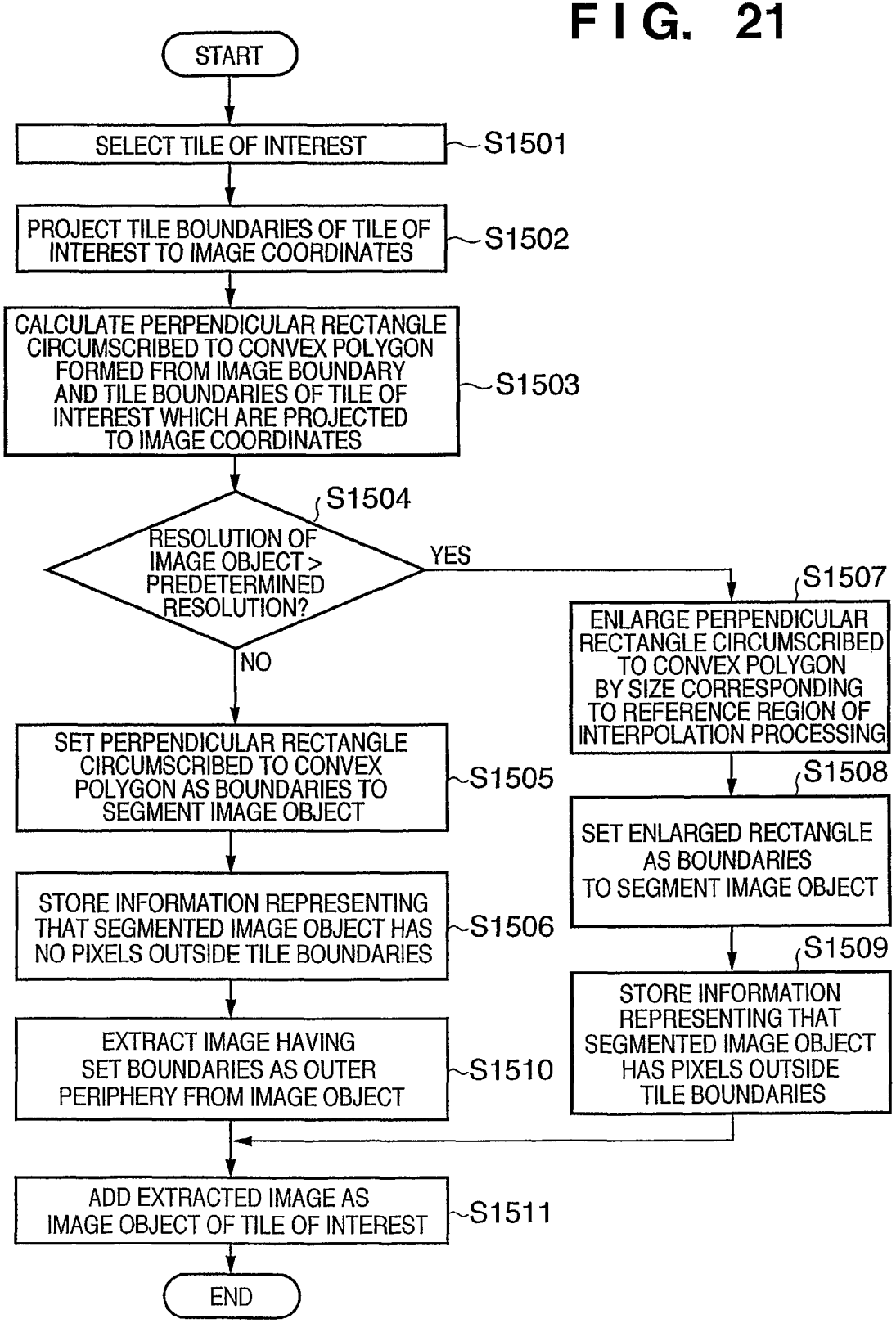

--PRIOR ART--

IMAGE PROCESSING APPARATUS, CONTROL METHOD THEREOF, AND STORAGE MEDIUM STORING A PROGRAM FOR CONVERTING RASTER IMAGE DATA INTO BLOCK VECTOR IMAGE FORMAT

TECHNICAL FIELD

The present invention relates to an image processing apparatus which processes and manages input image data, a control method thereof, and a program.

BACKGROUND ART

An image data input/output system is known which is connected to a network to process external or internal image data and output the processed image data.

An example of the image data input/output system is a device called an MFP (Multi Function Peripheral).

FIG. 29 shows a controller 100 which controls a conventional MFP (Japanese Patent Laid-Open No. 2004-120639). In the controller 100, a CPU 102, memory controller (MC) 103, global bus 105, image processing unit 110, and image data rasterization unit (RIP (Raster Image Processor)) 113 are connected through a system bus bridge (SBB) 101.

A hard disk controller (HDD Cont) 106 which controls a mass storage unit (HDD (Hard Disk Drive)) 107 for storing image data and a network I/F 109 serving as an interface to transfer image data to an external device through a network 108 connected to the MFP are connected to the global bus 105. An example of the image data is image data with a page vector format (e.g., PDL (Page Description Language), PDF, or SVG).

The HDD (Hard Disk Drive) 107 is connected to the HDD Cont 106 and used as an image data storage medium. Similarly, a system memory (Memory) 104 is connected to the MC 103 and used as a medium to temporarily store image data. A DIMM is generally used as the system memory 104.

A scanner 111 and a printer 112 are connected to the image processing unit 110. Image data input from the scanner 111 is subjected to predetermined image processing by the image processing unit 110 and input to the controller 100. Image data stored in the controller 100 is subjected to predetermined image processing by the image processing unit 110 and output to the printer 112.

Image data handled by the controller 100 is input/output from/to an external device through the network by using a page vector format (e.g., PDL, PDF, or SVG) and input from the scanner 111 or output to the printer 112 by using a raster data format. Image data with a page vector format which is input from an external device is interpreted to a primitive object by the CPU 102, converted into intermediate data (DL data) called DL (Display List), and input to the RIP 113.

These image data are temporarily stored in the system memory 104 in the controller 100. Hence, a number of kinds of data such as raster data, page vector data (e.g., PDL), and DL data are present on the system memory 104.

The HDD 107 stores, as image data, image data input from the scanner 111 and raster image data rendered by the RIP 113.

Of the above-described image data handled by the MFP, raster image data has a large data size. The raster image data therefore consumes many system resources such as the memory size of the system memory 104 and the bandwidths of the global bus 105 and the path between the HDD Cont 106 and the HDD 107.

In addition, page vector data such as PDL data is subjected to interpretation in the system and rasterized to DL data to generate a rendering object. At this time, since the DL data is spooled on the system memory 104, the memory resource consumption is enormous.

Recently, user demands for the quality of output images are growing. As one of solutions, the resolution (quality) of image data is increased. In addition to the image quality, the processing speed of systems is also required to be high.

For these reasons, system resources necessary for satisfying the above-described various required specifications are bloated. Hence, the challenge is how to balance the cost performance of products.

In addition to the problem of the cost performance of products, a problem of manpower to develop diversified and sophisticated systems must also be solved. To solve this problem, the product lineup must efficiently be strengthened by forming one fundamental system in a scalable form to cope with various required specifications.

For example, there is needed a system that enables distributed processing by providing multiple modules such as the image processing unit 110 and RIP 113 in FIG. 29 in high-end models.

Along with the progress of paperless offices, a demand for seamlessly handling paper output products and electronic data also arises. For this purpose, even an MFP serving as an I/F device between paper and electronic data is required to have more intelligent functions of converting raster image data into objects, i.e., reusable object data and speeding up image processing to cope with POD (Print On Demand).

DISCLOSURE OF INVENTION

The present invention has been made to solve the above-described problems, and has as its object to provide an image processing apparatus capable of relaxing restrictions on the system resource of an entire system and improving total throughput, a control method thereof, and a program.

According to the present invention, the foregoing object is attained by providing an image processing apparatus for executing processing for input image data, comprising:

input means for inputting image data;

output means for outputting the image data;

first conversion means for converting raster image data into block vector image data corresponding to blocks each having a predetermined size by segmenting the raster image data into the blocks with the predetermined size and executing vectorization processing;

storage means for storing the block vector image data;

rasterization means for rasterizing the block vector image data into the raster image data; and image data transfer control means for controlling transfer of the image data as a processing target in the apparatus so as to cause the first conversion means to convert the raster image data input from the input means into the block vector image data, cause the storage means to store the converted block vector image data, and cause the output means to output the raster image data obtained by causing the rasterization means to rasterize the block vector image data stored in the storage means.

In a preferred embodiment, the apparatus further comprises second conversion means for converting page vector image data into block vector image data corresponding to blocks each having a predetermined size, wherein the image data transfer control means controls transfer of the image data as the processing target in the apparatus so as to cause the first conversion means to execute conversion to the block vector image data when the image data input from the input means is raster image data, cause the second conversion means to execute conversion to the block vector image data when the image data input from the input means is page vector image data, cause the storage means to store the block vector image data converted by using one of the first conversion means and the second conversion means, and cause the output means to output the raster image data obtained by executing the rasterization means for the block vector image data stored in the storage means.

In a preferred embodiment, the apparatus further comprises further comprises third conversion means for converting block vector image data corresponding to one page into page vector image data representing the whole page, wherein the image data transfer control means controls transfer of the image data as the processing target in the apparatus so as to cause the output means to output raster image data obtained by executing the rasterization means for the block vector image data stored in the storage means when it is determined that a format of the image data to be output from the output means is a raster image data format, and cause the output means to output page vector image data obtained by executing the third conversion means for the block vector image data stored in the storage means when it is determined that the format of the image data to be output from the output means is a vector image data format.

In a preferred embodiment, the input means includes an image processing unit which inputs raster image data from a scanner unit, and an interface which inputs page vector image data transmitted from an external device.

In a preferred embodiment, the output means includes an image processing unit which outputs the raster image data to a printer unit.

In a preferred embodiment, the output means includes an interface unit which outputs the page vector image data to an external device.

In a preferred embodiment, the image data transfer control means comprises bus arbitration means, connected to each of the means through a bus, for executing arbitration control of the bus to be used to transfer the image data as the processing target in accordance with the image data as the processing target.

In a preferred embodiment, the image data transfer control means controls transfer of the image data as the processing target in the apparatus so as to store, in the storage means in advance, the block vector image data generated by the first conversion means and page vector image data corresponding to the block vector image data in association with each other.

In a preferred embodiment, in converting the page vector image data containing a curve object into the block vector image data corresponding to the blocks having the predetermined size, the second conversion means comprises:

calculation means for calculating a convex polygon including the curve object;

evaluation means for evaluating whether the convex polygon calculated by the calculation means crosses a side of a block of interest;

intersection point calculation means for calculating an intersection point between the curve object and a side of interest of the block of interest on the basis of an evaluation result of the evaluation means; and segmentation means for segmenting the curve object into blocks on the basis of the intersection point calculated by the intersection point calculation means.

In a preferred embodiment, in converting the page vector image data containing an image object into the block vector image data by segmenting the page vector image data into the blocks having the predetermined size, the second conversion means comprises:

comparison means for comparing a resolution of the image object with a predetermined resolution;

first segmentation means for segmenting the image object extending over a plurality of blocks at each block boundary of the plurality of blocks when the resolution of the image object is not more than the predetermined resolution as a result of comparison by the comparison means; and second segmentation means for segmenting the image object extending over a plurality of blocks so that a part of the image object beyond each block boundary of the plurality of blocks partially overlaps when the resolution of the image object is higher than the predetermined resolution as the result of comparison by the comparison means.

In a preferred embodiment, the rasterization means 1) rasterizes the block vector image data into raster image data by using a first interpolation method of interpolating the image object on the basis of a pixel of interest of the image object included in the block vector image data when the block vector image data as the processing target is segmented by the first segmentation means, and 2) rasterizes the block vector image data into raster image data by using a second interpolation method of interpolating the image object on the basis of a pixel of interest and a neighboring pixel of the image object included in the block vector image data when the block vector image data as the processing target is segmented by the second segmentation means.

In a preferred embodiment, the predetermined resolution is a resolution of the raster image data generated by the rasterization means.

In a preferred embodiment, the apparatus further comprises write control means for controlling write of the block vector image data in the storage means, wherein when the block vector image data contains an object, the write control means executes the write of the block vector image data of a block containing the object in the storage means, and when the block vector image data contains no object, the write control means inhibits the write of the block vector image data of a block containing no object in the storage means.

In a preferred embodiment, the write control means generates a block management table in which block identification information to identify a position of the block vector image data as the processing target and object identification information indicating presence/absence of an object in the block vector image data are managed for each block and controls the write of the block vector image data as the processing target in the storage means by looking up the block management table.

In a preferred embodiment, the apparatus further comprises:

setting means for setting set block identification information indicating a position of block vector image data as a read target from the storage means;

read means for reading out block identification information of block vector image data which exists in the storage means;

comparison means for comparing the set block identification information set by the setting means with the read block identification information read out by the read means; and generation means for generating the block vector image data on the basis of a comparison result of the comparison means, wherein when the set block identification information and the read block identification information are discontinuous as the result of comparison by the comparison means, the generation means generates block vector image data containing no object corresponding to the discontinuous part.

In a preferred embodiment, the rasterization means includes a plurality of sub rasterization units to process a plurality of block vector image data in parallel.

In a preferred embodiment, the rasterization means comprises a font cache unit common to the plurality of sub rasterization units, the font cache unit comprising a font cache memory, and a lock flag register to store a lock flag representing that each of the plurality of sub rasterization units is referring to the font cache memory.

In a preferred embodiment, when rasterized font data corresponding to font data contained in the block vector image data as the processing target in the sub rasterization unit is present in the font cache unit, the rasterization means sets the lock flag of a corresponding lock flag register, and when read of the rasterized font data is ended, the rasterization means clears the lock flag.

In a preferred embodiment, in causing the sub rasterization unit to rasterize font data as a rasterization target into raster data, if the font cache memory has no free space to rasterize the raster data, the rasterization means replaces the rasterized font data on the font cache memory without no lock flag set in the lock flag register with the font data as the rasterization target.

In a preferred embodiment, a control signal line to control a corresponding lock flag register is connected to each of the plurality of sub rasterization units.

According to the present invention, the foregoing object is attained by providing a control method of an image processing apparatus for executing processing for input image data, comprising:

a first conversion step of converting raster image data into block vector image data corresponding to blocks each having a predetermined size by segmentation into the blocks with the predetermined size and vectorization processing;

a storage step of storing the block vector image data in storage means;

a rasterization step of rasterizing the block vector image data into the raster image data; and an image data transfer control step of controlling transfer of the image data as a processing target in the apparatus so as to convert the input raster image data into the block vector image data in the first conversion step, cause the storage means to store the converted block vector image data, and cause an output unit to output the raster image data obtained by rasterizing, in the rasterization step, the block vector image data stored in the storage means.

According to the present invention, the foregoing object is attained by providing a program which causes a computer to execute control of an image processing apparatus for executing processing for input image data, characterized by causing the computer to execute:

a first conversion step of converting raster image data into block vector image data corresponding to blocks each having a predetermined size by segmentation into the blocks with the predetermined size and vectorization processing;

a storage step of storing the block vector image data in storage means;

a rasterization step of rasterizing the block vector image data into the raster image data; and a control step of executing control so as to convert the input raster image data into the block vector image data in the first conversion step, cause the storage means to store the converted block vector image data, and cause an output unit to output the raster image data obtained by rasterizing, in the rasterization step, the block vector image data stored in the storage means.

According to the present invention, the foregoing object is attained by providing an image processing apparatus for executing processing for input image data, comprising:

input means for inputting image data;

output means for outputting the image data;

second conversion means for converting page vector image data into block vector image data corresponding to blocks each having a predetermined size;

storage means for storing the block vector image data;

rasterization means for rasterizing the block vector image data into the raster image data; and image data transfer control means for controlling transfer of the image data as a processing target in the apparatus so as to cause the second conversion means to convert the page vector image data input from the input means into the block vector image data, cause the storage means to store the converted block vector image data, and cause the output means to output the raster image data obtained by causing the rasterization means to rasterize the block vector image data stored in the storage means.

According to the present invention, the foregoing object is attained by providing a control method of an image processing apparatus for executing processing for input image data, comprising:

a second conversion step of converting input page vector image data into block vector image data corresponding to blocks each having a predetermined size;

a storage step of storing the block vector image data in storage means;

a rasterization step of rasterizing the block vector image data into the raster image data; and an image data transfer control step of controlling transfer of the image data as a processing target in the apparatus so as to convert the input page vector image data into the block vector image data in the second conversion step, cause the storage means to store the converted block vector image data, and cause an output unit to output the raster image data obtained by rasterizing, in the rasterization step, the block vector image data stored in the storage means.

According to the present invention, the foregoing object is attained by providing a program which causes a computer to execute control of an image processing apparatus for executing processing for input image data, characterized by causing the computer to execute:

a second conversion step of converting input page vector image data into block vector image data corresponding to blocks each having a predetermined size;

a storage step of storing the block vector image data in storage means;

a rasterization step of rasterizing the block vector image data into the raster image data; and a control step of executing control so as to convert the input page vector image data into the block vector image data in the second conversion step, cause the storage means to store the converted block vector image data, and cause an output unit to output the raster image data obtained by rasterizing, in the rasterization step, the block vector image data stored in the storage means.

According to the present invention, the foregoing object is attained by providing an image processing apparatus for processing input image data, comprising:

input means for inputting image data of one of a raster format and a vector format;

conversion means for converting the image data of one of the raster format and the vector format input by the input means into block vector image data;

storage means for storing the block vector image data converted by the conversion means; and output means for executing predetermined processing for the block vector image data stored in the storage means and outputting the image data which has undergone the processing.

According to the present invention, the foregoing object is attained by providing a control method of an image processing apparatus for processing input image data, comprising:

an input step of inputting image data of one of a raster format and, a vector format;

a conversion step of converting the image data of one of the raster format and the vector format input in the input step into block vector image data;

a storage step of storing, in storage means, the block vector image data converted in the conversion step; and an output step of executing predetermined processing for the block vector image data stored in the storage means and outputting the image data which has undergone the processing.

According to the present invention, the foregoing object is attained by providing a program which causes a computer to execute control of an image processing apparatus for processing input image data, characterized by causing the computer to execute:

an input step of inputting image data of one of a raster format and a vector format;

a conversion step of converting the image data of one of the raster format and the vector format input in the input step into block vector image data;

a storage step of storing, in storage means, the block vector image data converted in the conversion step, and an output step of executing predetermined processing for the block vector image data stored in the storage means and outputting the image data which has undergone the processing.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention, and together with the description, serve to explain the principles of the invention.

FIG. 6 is a view showing an example of document data transferred from a network according to the first embodiment of the present invention;

FIG. 14 is a view showing a description example of page vector data according to the third embodiment of the present invention;

FIG. 15 is a view showing a description example of tile vector data according to the third embodiment of the present invention;

FIG. 17 is a flowchart showing details of curve object segmentation processing according to the third embodiment of the present invention;

FIG. 20 is a view for explaining image object tile segmentation according to the fourth embodiment of the present invention;

FIG. 21 is a flowchart showing details of image object segmentation processing according to the fourth embodiment of the present invention;

BEST MODE FOR CARRYING OUT THE INVENTION

Preferred embodiments of the present invention will be described in detail in accordance with the accompanying drawings.

[First Embodiment]
[Outline of MFP Apparatus]

Figure 1:
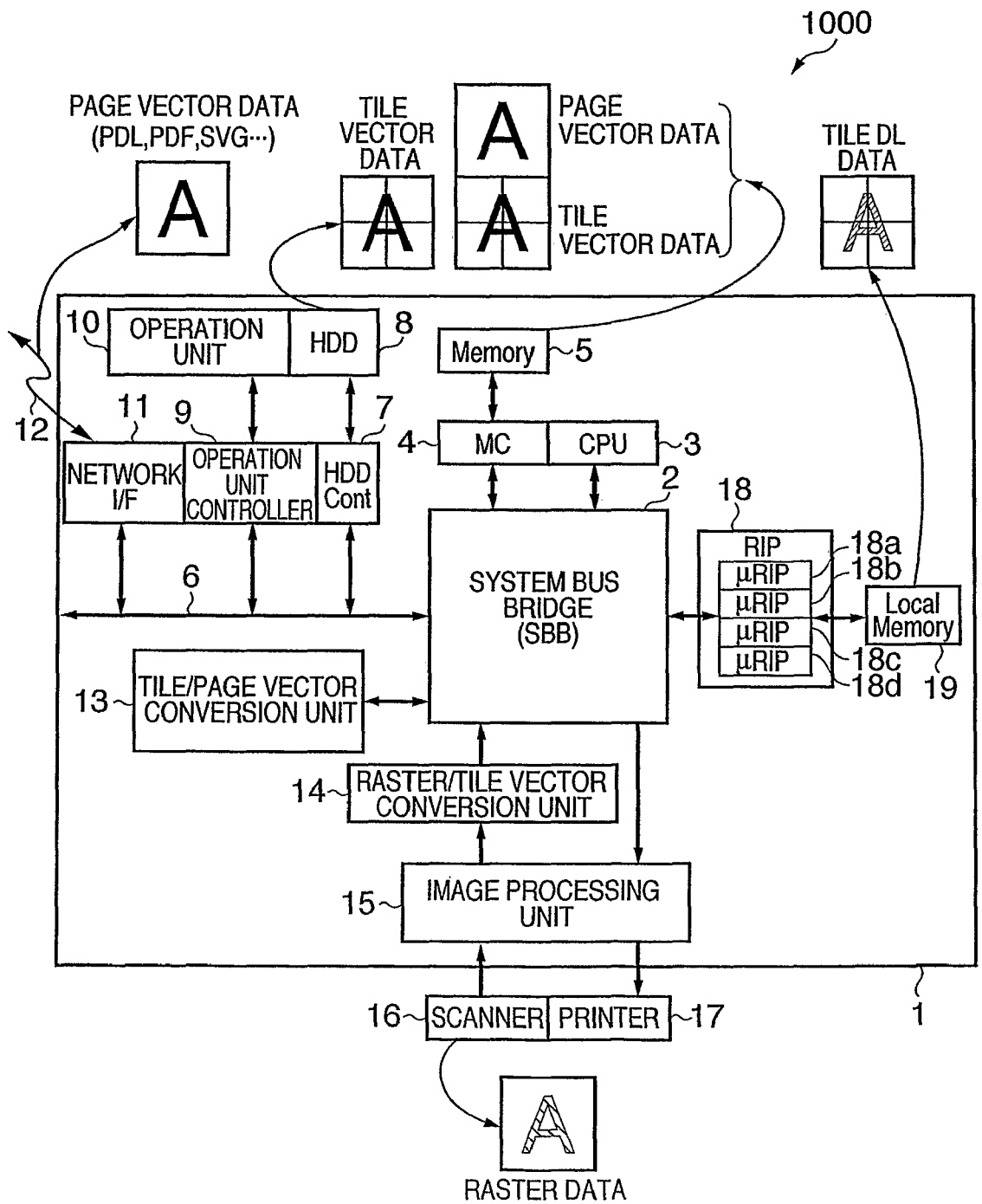
FIG. 1 is a block diagram showing details of the controller of an MFP included in an image processing system according to the first embodiment of the present invention.

FIG. 1 is a block diagram showing details of the controller of an MFP included in an image processing system according to the first embodiment of the present invention.

In a controller 1 that controls an MFP 1000, a CPU 3, memory controller (MC) 4, global bus 6, tile/page vector conversion unit 13, raster/tile vector conversion unit 14, image processing unit 15, and image data rasterization unit (RIP) 18 are connected through a system bus bridge (SBB) 2.

The RIP 18 can rasterize tile vector data and incorporates a plurality of sub image data rasterization units (μRIPs) 18a to 18d.

A system memory (Memory) 5 is connected to the MC 4 and used as a medium to temporarily store image data.

A hard disk controller (HDD Cont) 7 which controls an HDD 8 for storing image data, an operation unit controller 9 which controls an operation unit 10, and a network I/F 11 serving as an interface to transfer image data to an external device through a network 12 connected to the MFP 1000 are connected to the global bus 6.

The operation unit 10 is implemented by, e.g., a touch panel formed from an LCD or the like. The operation unit 10 has an operation screen to input various kinds of processing execution instructions and display processing results according to the first embodiment and embodiments to be described later. The user can implement various kinds of operations through the operation screen.

The image processing unit 15 is connected to the raster/tile vector conversion unit 14. A scanner 16 and a printer 17 are connected to the image processing unit 15.

The RIP 18 is connected to the SBB 2. A local memory (Local Memory) 19 to store data output from the RIP 18 is connected to the RIP 18.

Image data handled by the controller 1 is input/output from/to an external device as image data with a vector format and input from the scanner 16 or output to the printer 17 as image data with a raster format.

Example of the vector format is PDL, PDF, and SVG. Image data having the vector format will also simply be referred to as vector data, and image data having the raster format will also simply be referred to as raster data hereinafter.

In the controller 1, scan data (raster data) is converted into tile vector data by the raster/tile vector conversion unit 14. Tile DL data obtained from the tile vector data by processing of the RIP 18 is stored in the local memory 19 connected to the RIP 18.

Hence, only two kinds of images, i.e., page vector data and tile vector data are stored on the system memory 5. That is, raster data and DL data with a large image size need not be stored in the system memory 5. For this reason, the image data area that must be ensured on the system memory 5 can be reduced.

DL data output from the RIP 18 is segmented into tiles and stored as tile DL data. The tile DL data can be stored by using a very small memory capacity as compared to conventional page DL data for each page. Hence, the local memory 19 can be implemented as an on-chip memory, and the memory latency can be reduced. As a result, the tile data rasterization speed can be increased.

Additionally, since only tile vector data needs to be stored on the HDD 8 as image data, bottlenecks of the access speed to the HDD 8 are relaxed, and data processing can be speeded up. Since processing is done for each tile, the cost of the RIP 18 can also be reduced.

If a higher processing capability is demanded, the processing capability can be made changeable by implementing the plurality of μRIPs 18a to 18d in parallel in the RIP 18. With this arrangement, the processing capability of the controller 1 can be adjusted simply so that a system capable of easily ensuring scalability can be formed.

In the present invention, the network I/F 11 and scanner 16 function as image input units to input image data to the controller 1. The network I/F 11 and printer 17 function as image output units to output image data.

The data flows of various kinds of processing which can be implemented by the MFP 1000 will be described below.

[Copy]

Figure 2:
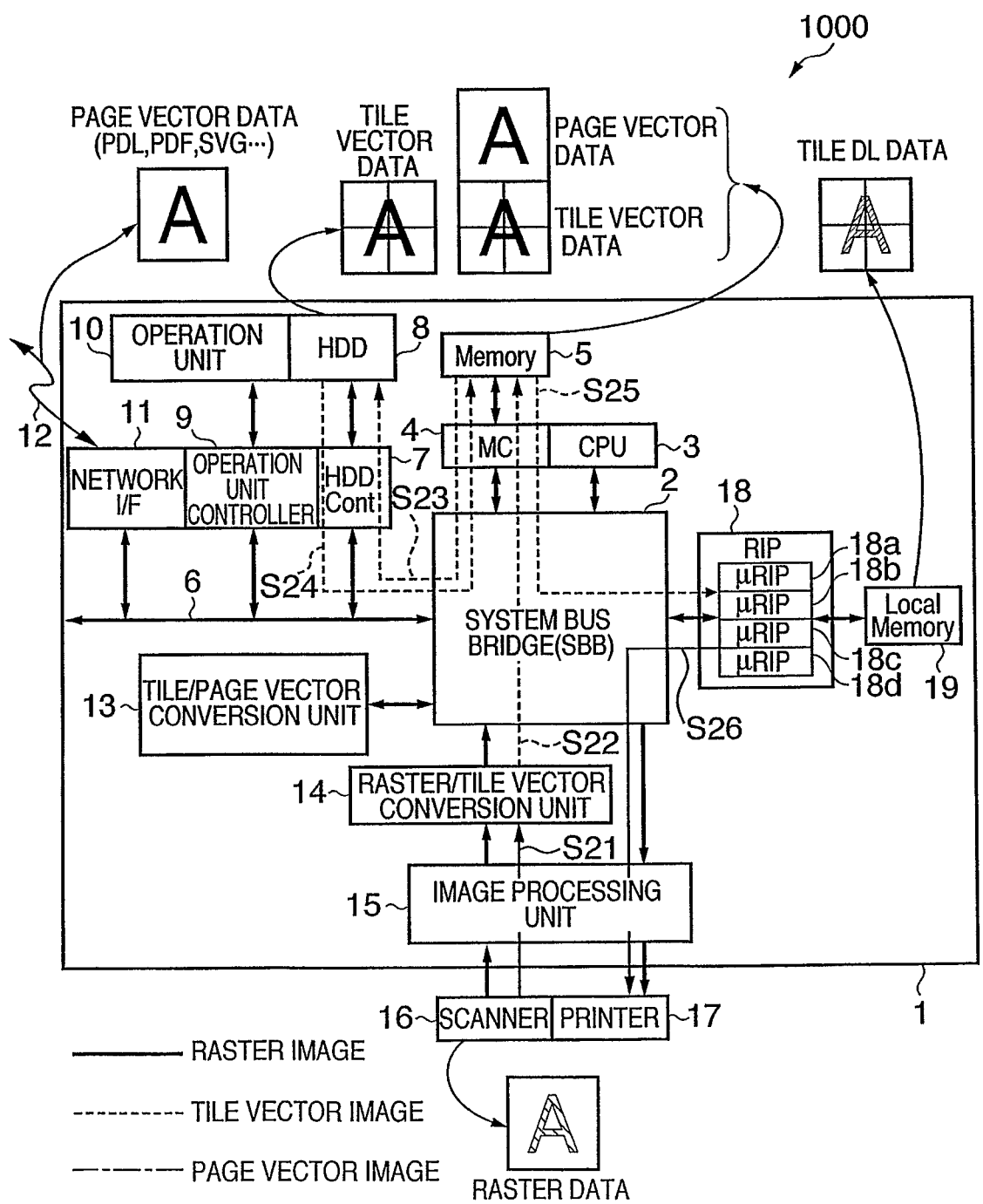
FIG. 2 is a block diagram showing the data flow of a copy operation of the image processing system according to the first embodiment of the present invention.

FIG. 2 is a block diagram showing the data flow of a copy operation of the image processing system according to the first embodiment of the present invention.

This data flow is implemented by causing the various kinds of constituent elements included in the MFP 1000 to cooperate under the control of the CPU 3.

Arrows in FIG. 2 indicate various kinds of data flows. Especially, a solid arrow indicates the data flow of raster data (raster image data), a broken arrow indicates the data flow of tile vector data (tile vector image data), and an alternate long and short dashed arrow indicates the data flow of page vector data (page vector image data). Page vector data and tile vector data will be described later in detail in association with the tile/page vector conversion unit 13.

(S21): When the user instructs the start of copy from the operation unit 10, the scanner 16 starts a document image reading operation. An image (R, G, and B images) input from the scanner 16 to the image processing unit 15 is frequency-converted in synchronism with the clock of the image processing unit 15 and subjected to, e.g., the following processing.

1) Correction processing of scanner properties such as the line pitch and chromatic aberration of the CCD sensor in the scanner 16

2) Input image data quality correction processing such as color space correction and sharpness correction 3) Image manipulation processing such as frame removal and book frame removal of input image data (S22): When image processing by the image processing unit 15 is ended, the image data output from the image processing unit 15 is input to the raster/tile vector conversion unit 14 and subjected to tile vector conversion processing. That is, the raster/tile vector conversion unit 14 segments the image data into blocks (tiles) each having a predetermined size.

Vectorization processing is executed for raster data in each block to generate vector data (tile vector data (block vector data)) of each block (tile).

The generated tile vector data is subjected to bus arbitration by the SBB 2 to acquire a bus right to the system memory 5 and stored in the system memory 5 through the MC 4 (when a data path is connected via the SBB 2, a procedure of acquiring a bus right by bus arbitration is fundamentally executed, though the procedure will be omitted in the following description of the flow).

(S23): The tile vector data stored in the system memory 5 is stored in the HDD 8 through the MC 4, SBB 2, and HDD Cont 7. When tile vector data is stored in the HDD 8, a document having a plurality of pages can be copied and output in a different order of pages by sorting or stored in the MFP 1000 as archive image data.

(S24): The tile vector data stored in the HDD 8 is read out by the HDD Cont 7 in accordance with the timing of printer ready sent from a printer CPU (not shown) in the printer 17. Then, the data is temporarily stored in the system memory 5 through the SBB 2 and MC 4.

If the readout tile vector data is directly output from the HDD 8 to the printer 17, synchronous output to the printer 17 cannot be guaranteed because of limitations of the access speed of the HDD 8 or congestion on the global bus 6. When page vector data is spooled in the system memory 5 before synchronous data transfer to the printer 17, real-time throughput is guaranteed.

(S25): The tile vector data stored in the system memory 5 is read out by the MC 4 in accordance with an activation signal sent from the printer 17 to the controller 1, and transferred to the RIP 18 through the SBB 2.

The RIP 18 analyzes the tile vector data and generates (interprets) a rendering object (tile DL data) of each tile. The generated tile DL data is temporarily stored in the local memory 19.

The RIP 18 reads out the tile DL data from the local memory 19, rasterizes the tile DL data to raster data (tile raster data) for each tile, and outputs the raster data.

In the first embodiment, the four sub image data rasterization units (μRIPs) 18*a* to 18*d* are provided in the RIP 18, as described above. The controller 1 can operate the μRIPs 18*a* to 18*d* in parallel to execute tile vector data rasterization at a high speed.

The vector data rasterization time dominates over the total performance of the image processing system. The performance can be improved by increasing the number of μRIPs. Hence, when the configuration of the present invention is employed, a scalable system can easily be formed by increasing or decreasing the number of μRIPs or the number of μRIPs to be operated.

(S26): The tile raster data generated by the RIP 18 is transferred to the image processing unit 15 and subjected to, e.g., the following processing.

1) Conversion processing from the tile raster data into page raster data

2) Correction processing of the color or density of the output image in accordance with the printer characteristics 3) Tone conversion processing of converting the tone of the output image by image data quantization 4) Frequency conversion processing to output the image in synchronism with a printer I/F clock The image processing unit 15 executes the image processing operations 1) to 4) to obtain raster data. The raster data is transferred to the printer 17, printed on a printing medium, and output.

[Print]

Figure 3:
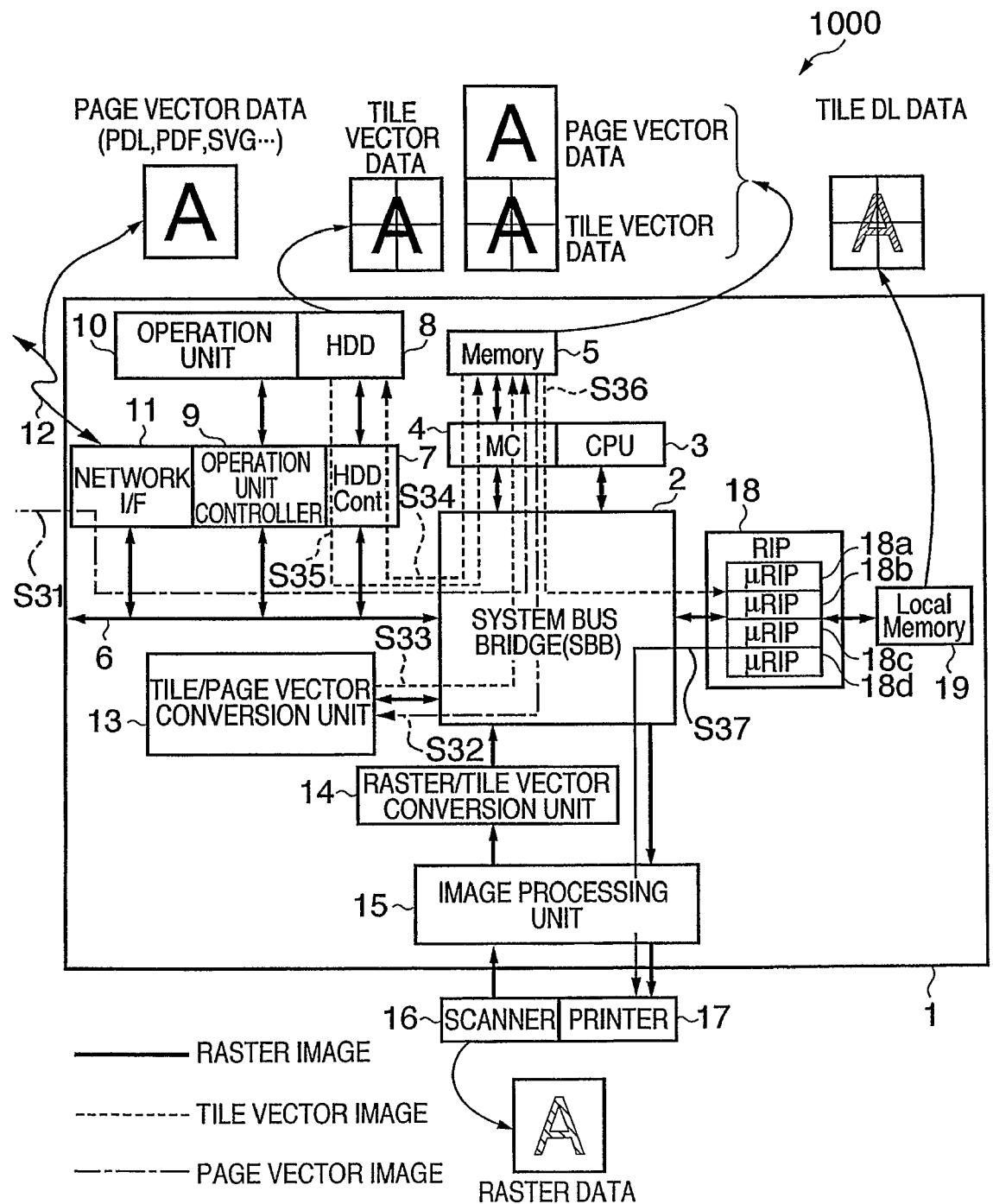
FIG. 3 is a block diagram showing the data flow of a print operation of the image processing system according to the first embodiment of the present invention.

FIG. 3 is a block diagram showing the data flow of a print operation of the image processing system according to the first embodiment of the present invention.

This data flow is implemented by causing the various kinds of constituent elements included in the MFP 1000 to cooperate under the control of the CPU 3.

(S31): The network I/F 11 connected to the global bus 6 receives page vector data from an external device connected to the network 12. The page vector data is transferred to the system memory 5 through the MC 4 connected to the SBB 2.

(S32): The page vector data stored in the system memory 5 is read out by the tile/page vector conversion unit 13 and subjected to tile vector conversion processing. More specifically, the tile/page vector conversion unit segments each object that exists in the page vector data into objects each fitted in a block (tile) with a predetermined size. With this processing, vector data (tile vector data) of each tile is generated.

(S33): The generated tile vector data is stored in the system memory 5 again through the SBB 2.

(S34): The tile vector data stored in the system memory 5 is stored in the HDD 8 through the MC 4, SBB 2; and HDD Cont 7. When tile vector data is stored in the HDD 8, a document having a plurality of pages can be copied and output in a different order of pages by sorting or stored in the MFP 1000 as archive image data.

(S35): The tile vector data stored in the HDD 8 is read out by the HDD Cont 7 in accordance with the timing of printer ready sent from a CPU (not shown) in the printer 17. Then, the data is temporarily stored in the system memory 5 through the SBB 2 and MC 4.

If the readout tile vector data is directly output from the HDD 8 to the printer 17, synchronous output to the printer 17 cannot be guaranteed because of limitations of the access speed of the HDD 8 or congestion on the global bus 6. When vector image data corresponding to one page is spooled in the system memory 5 before synchronous data transfer to the printer 17, real-time throughput is guaranteed.

(S36): The tile vector data stored in the system memory 5 is read out by the MC 4 in accordance with an activation signal sent from the printer 17 to the controller 1, and transferred to the RIP 18 through the SBB 2.

The RIP 18 analyzes the tile vector data and generates (interprets) a rendering object (tile DL data) of each tile. The generated tile DL data is temporarily stored in the local memory 19.

The RIP 18 reads out the tile DL data from the local memory 19, rasterizes the tile DL data to raster data (tile raster data) for each tile, and outputs the raster data.

(S37): The tile raster data generated by the RIP 18 is transferred to the image processing unit 15 and subjected to, e.g., the following processing.

1) Conversion processing from the tile raster data into page raster data

2) Correction processing of the color or density of the output image in accordance with the printer characteristics 3) Halftoning processing of converting the tone of the output image by image data quantization 4) Frequency conversion processing to output the image in synchronism with a printer I/F clock The image processing unit 15 executes the image processing operations 1) to 4) to obtain raster data. The raster data is transferred to the printer 17, printed on a printing medium, and output.

[Transmission]

Figure 4:
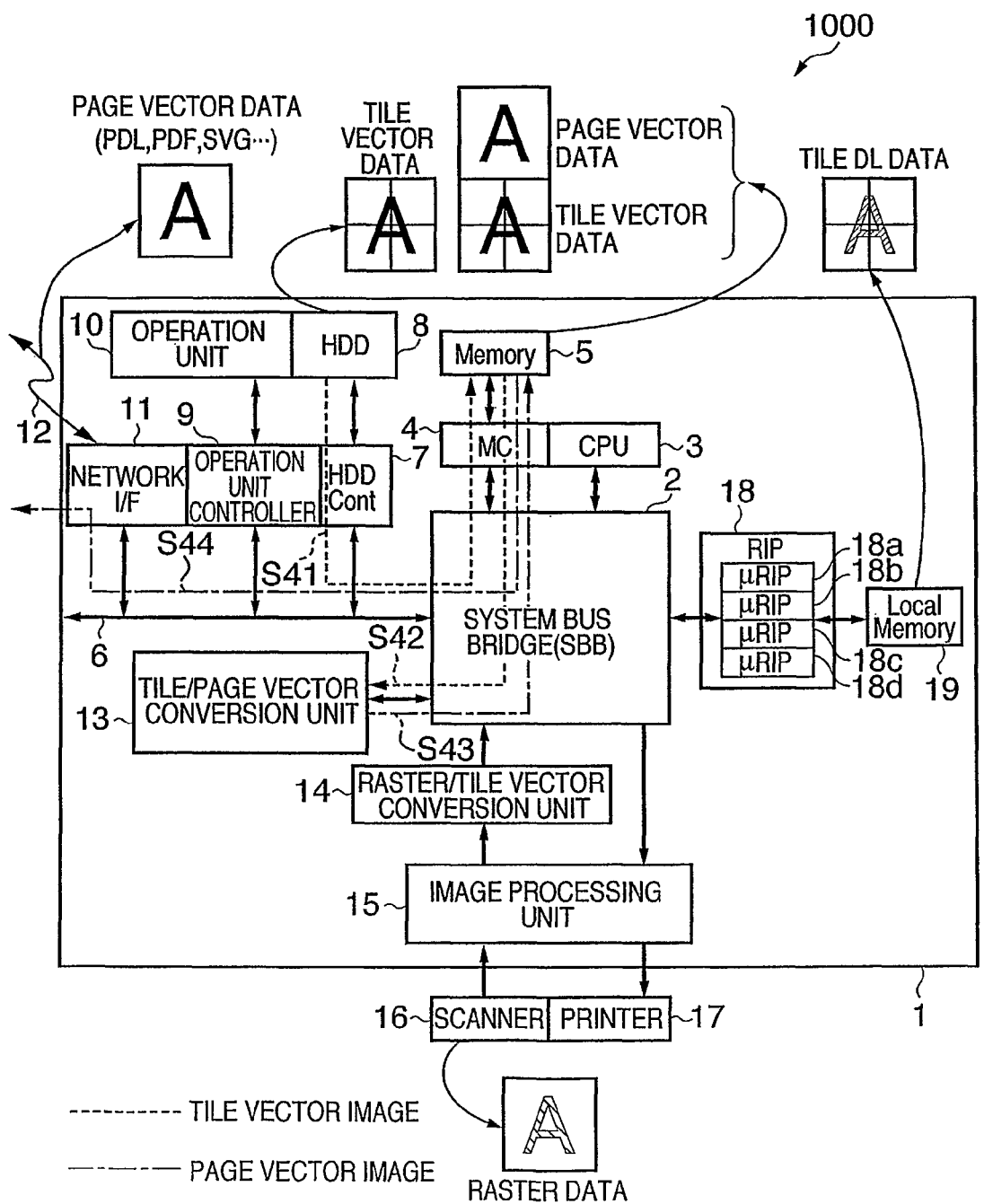
FIG. 4 is a block diagram showing the data flow of a transmission operation of the image processing system according to the first embodiment of the present invention.

FIG. 4 is a block diagram showing the data flow of a transmission operation of the image processing system according to the first embodiment of the present invention.

This data flow is implemented by causing the various kinds of constituent elements included in the MFP 1000 to cooperate under the control of the CPU 3.

As for the data flow until image data is stored in the HDD 8, the flow of raster data is the same as in [Copy] while the flow of page vector data input from an external device on the network 12 is the same as in [Print], and a description thereof will be omitted.

Image data may be stored in the HDD 8 in accordance with a storage instruction from the user or automatically left in the HDD 8 in [Copy] or [Print] processing. Transmission processing will be described which is executed in accordance with an instruction to transmit image data designated by the user from image data stored in the HDD 8 in the above-described way.

(S41): The tile vector data stored in the HDD 8 is read out, through the SBB 2, by the HDD Cont 7 connected to the global bus 6 and is temporarily stored in the system memory 5.

(S42): The tile vector data stored in the system memory 5 is read out by the tile/page vector conversion unit 13 and subjected to tile vector conversion processing. More specifically, objects segmented into blocks are concatenated to generate page vector data that describes the objects of a whole page. That is, page vector data representing the vector data of a whole page is generated from the tile vector data of one page.

(S43): The generated page vector data is stored in the system memory 5 again through the SBB 2.

(S44): The page vector data stored in the system memory 5 is read out from the network I/F 11 connected to the global bus 6 and transmitted to an external device connected to the network 12.

As in the present invention, when tile vector data are returned to page vector data to decrease the number of objects contained in the data at the time of transmission to an external device, the transmission data amount can be reduced. In addition, the data can easily be converted into a general format such as PDF or SVG.

In the present invention, raster data input from the scanner 16 can also be transmitted to an external device. In this case, the raster data is preferably converted into a page vector and then transmitted to the external device.

[Raster/Tile Vector Conversion Unit]

The processing of the raster/tile vector conversion unit 14 will be described next in detail.

Figure 5:
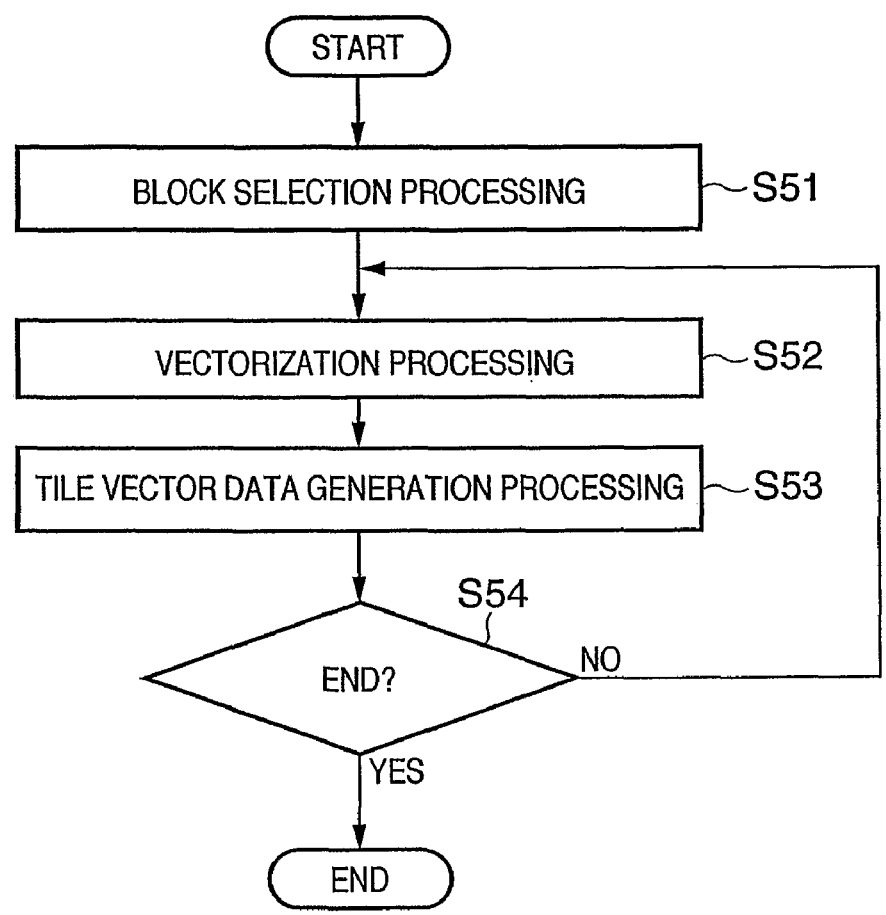
FIG. 5 is a flowchart showing processing executed by a raster/tile vector conversion unit according to the first embodiment of the present invention.

FIG. 5 is a flowchart showing processing executed by the raster/tile vector conversion unit according to the first embodiment of the present invention.

(Step S51: Block Selection (Block Segmentation: BS) Processing)

Raster data (image data) input from the image processing unit 15 is segmented into text/line art regions containing a text or line art, halftone photo regions, image regions having indefinite shapes, and the like. A text/line art region is further segmented into text regions mainly containing a text and line art regions mainly containing, e.g., a table or graphic. A line art region is segmented into table regions and graphic regions.

In the first embodiment, connected pixels of an image in the process target are detected. Data is segmented into the regions of respective attributes by using feature amounts such as the shape, size, and pixel density of the circumscribed rectangular region of the connected pixels. However, any other region segmentation method may be used.

A text region is segmented into rectangular blocks (text region rectangular blocks), i.e., the blocks of paragraphs. A line art region is segmented into rectangular blocks of individual objects (table region rectangular blocks and line art region rectangular blocks) such as tables and graphics.

A photo region expressed by halftone is segmented into rectangular blocks of objects such as image region rectangular blocks and background region rectangular blocks.

Each separated region is further segmented into regions (tiles) having a predetermined size. Each tile is vectorized by the next vectorization processing.

(Step S52: Vectorization Processing)

Image data of each attribute region is converted into vector data by vectorization processing (vectorized). For example, vectorization methods (a) to (f) to be described below are present.

(a) When an attribute region is a text region, code conversion of the text image is executed by OCR. Alternatively, the size, style, and font of each character are recognized to convert the character into font data which is visually faithful to the character obtained by scanning the document.

(b) When an attribute region is a text region, and recognition by OCR is insufficient, the outline of each character is traced to convert the data into a format that expresses outline information (outline) as connected line segments.

In the first embodiment, one of the methods (a) and (b) is used for a text region in accordance with an OCR result. However, the present invention is not limited to this. For example, only the method (b) may be used for all text regions without using the method (a).

(c) When an attribute region is a graphic region, the outline of the graphic object is traced to convert the data into a format that expresses outline information as connected line segments.

(d) Outline information of the line segment format in the method (b) or (c) is fitted by, e.g., a Bezier function to convert the data into function information.

(e) The shape of each graphic is recognized from the outline information of the graphic object in the method (c) to convert the data into graphic definition information such as a circle, rectangle, or polygon.

(f) When an attribute region is a graphic region containing an object of a table format in a specific region, rule lines and frame lines are recognized to convert the data into document format information with a predetermined format.

(Step S53: Tile Vector Data Generation Processing)

In correspondence with each data that is converted into command definition format information such as format code information, graphic information, or function information in the methods (a) to (f) in step S52, tile vector data is generated by adding a vector type to discriminate between page vector data and tile vector data in the controller 1 and header information to discriminate coordinate information such as a coordinate position of the tile in the page. In this way, tile vector data added various kinds of information for each tile is output to the SBB 2.

(Step S54: End Determination Processing)

The presence/absence of raster data as a processing target is determined. If raster data as a processing target is present (NO in step S54), the flow returns to step S51. If no raster data as a processing target is present (YES in step S54), the processing is ended.

[Tile/Page Vector Conversion Unit]

Before details of the processing of the tile/page vector conversion unit 13 are described, document data (image data) as a processing target will be described.

FIG. 6 is a view showing an example of document data transferred from the network according to the first embodiment of the present invention In FIG. 6, a device coordinate system is defined in which the widthwise direction of document data 801 is defined as an "X" direction, and the longitudinal direction is defined as a "Y" direction. The document data 801 can be page vector data, tile vector data, page vector data (tile vector data) containing raster data expression, or raster data.

A description example of the contents of the document data 801 formed from page vector data of the first embodiment will be described with reference to FIG. 7.

Figure 7:
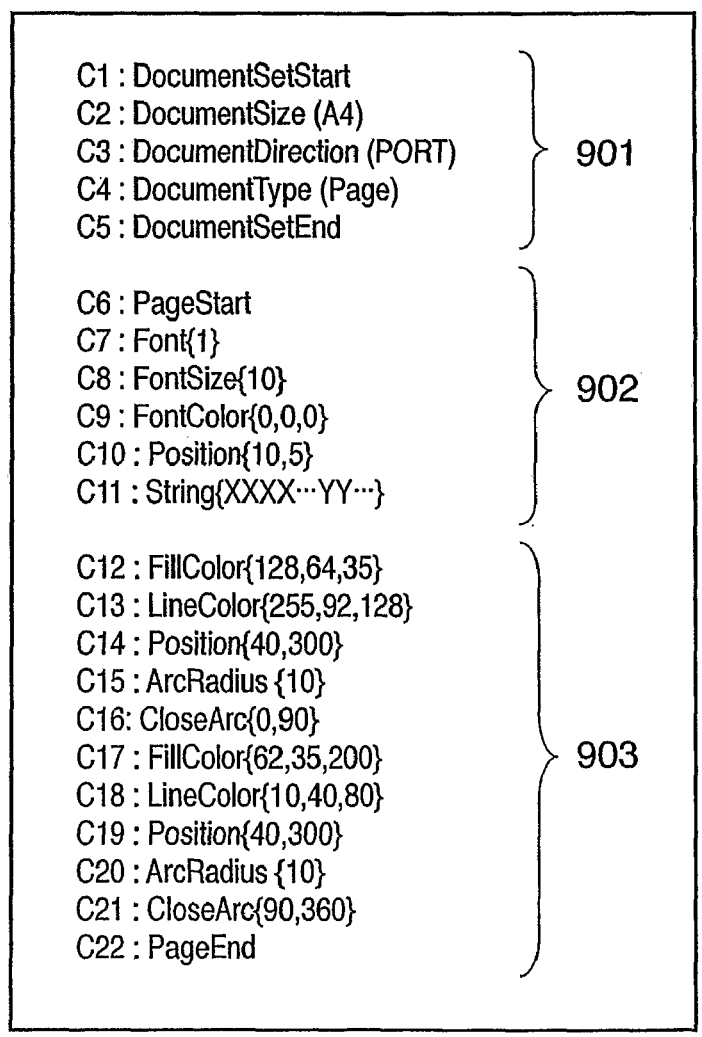
FIG. 7 is a view showing a description example of page vector data according to the first embodiment of the present invention.

FIG. 7 is a view showing a description example of page vector data according to the first embodiment of the present invention.

Referring to FIG. 7, reference numeral 901 denotes a document setting instruction part related to setting of entire document data; 902, a text rendering instruction part; and 903, a graphic rendering instruction part.

Details of the rendering instruction parts will be described.

In the document setting instruction part 901, C1 to C5 are commands related to the entire document. Only one set of the commands C1 to C5 is present in a document.

Examples of the commands related to the entire document data are a character set command (font designation command), scalable font command (a command to designate whether to use a scalable font), and hard reset command (a command to reset the preceding printer use environment).

C1 is a document set start command. C2 is a command to indicate the output paper size of document data. In this case, A4 is set. C3 is a command to indicate the direction of document data. "Portrait" and "landscape" can be selected, and "portrait" (PORT) is set in this case.

C4 is a command to indicate the type of document data, i.e., whether the document data contains page vectors or tile vectors. In this case, "page" (PAGE) is set. C5 is a document set end command.

C6 to C22 contained in the text rendering instruction part 902 and graphic rendering instruction part 903 are various kinds of commands to output the document data.

C6 is a command to indicate the start of the page. C7 is a command to select the font type of a text. In this case, a font set numbered "1" is set. C8 is a command to set the font size. In this case, "10 points" is set.

C9 is a command to set the text color and sequentially indicates the luminances of R (red), G (green), and B (blue) color components. The luminances are quantized in, e.g., 256 levels from 0 to 255. In this case, {0,0,0} is set. C10 is a command to indicate the coordinates of the text rendering start position. A coordinate position (X,Y) is designated on the basis of the origin that is set at the upper left corner of the page. In this case, text rendering is set to start from a position {10,5} of the page. C11 is a command to indicate the character string (XXXX . . . YY . . . ) to be actually rendered.

C12 is a command to indicate the filling color of a plane in graphic rendering. The color is designated like the text color. C13 is a command to designate the line color of graphic rendering. C14 is a command to indicate the coordinates of the graphic rendering position.

C15 is a command to designate the radius of an arc to be rendered. In this case, "10" coordinate units are designated. C16 is a command to render a closed arc. The two parameters in the command indicate the rendering start angle and end angle in rendering an arc. Vertical information is defined to 0°. In this case, rendering of an arc from 0° to 90° is designated.

C17 to C21 are commands to designate, e.g., the plane and line colors and the position in graphic rendering, like the commands C12 to C16. C22 is a command to indicate the end of the page.

A case will be described below with reference to FIG. 8 in which the document data 801 is tile vector data.

Figure 8:
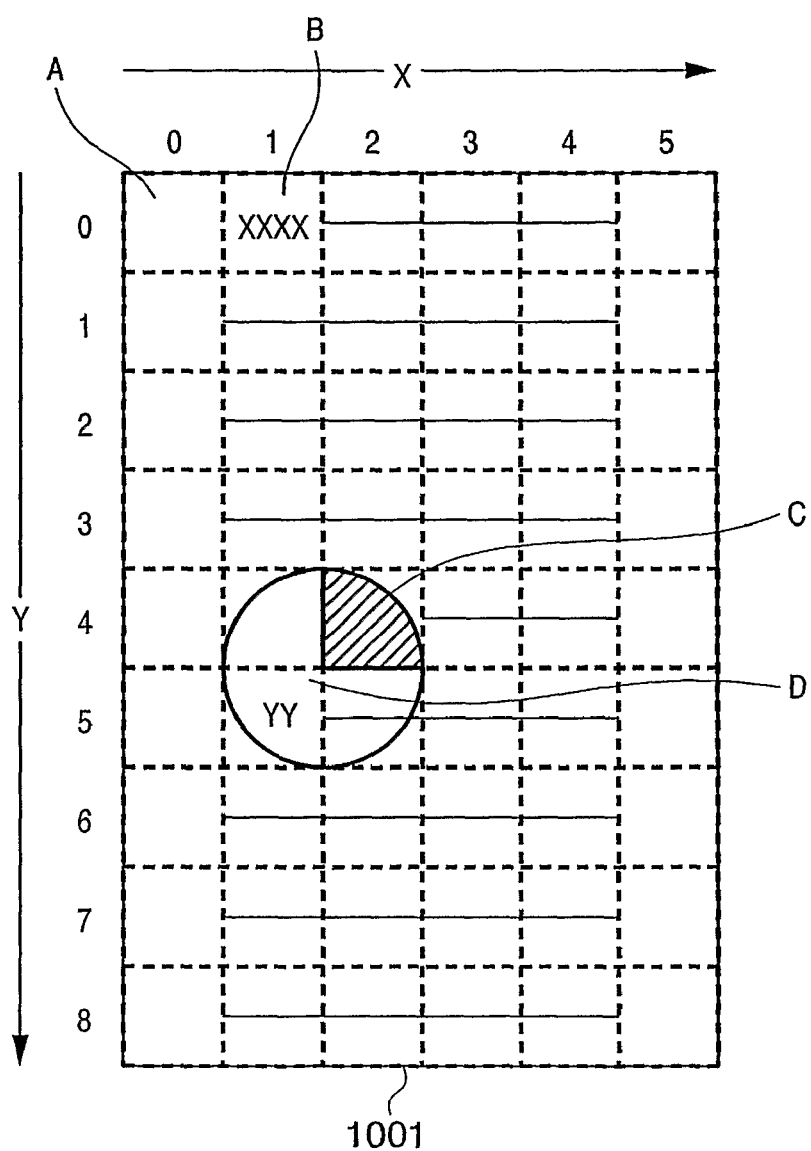
FIG. 8 is a view showing an example of tile vector data according to the first embodiment of the present invention.

FIG. 8 is a view showing an example of tile vector data according to the first embodiment of the present invention.

FIG. 8 shows an example of tile vector data (document data 1001) obtained by segmenting the document data 801 (page vector data) in FIG. 6 into blocks (tiles).

In FIG. 8, a device coordinate system is defined in which the widthwise direction of document data 1001 is defined as an "X" direction, and the longitudinal direction is defined as a "Y" direction. The numbers arrayed in the X direction in FIG. 8 indicate X-direction tile IDs. The numbers arrayed in the Y direction indicate Y-direction tile IDs. A to D represent tile data located at positions of tile IDs=(0,0), (1,0), (2,4), and (1,5).

A description example of the contents of the document data 1001 formed from tile vector data of the first embodiment will be described with reference to FIG. 9.

Figure 9:
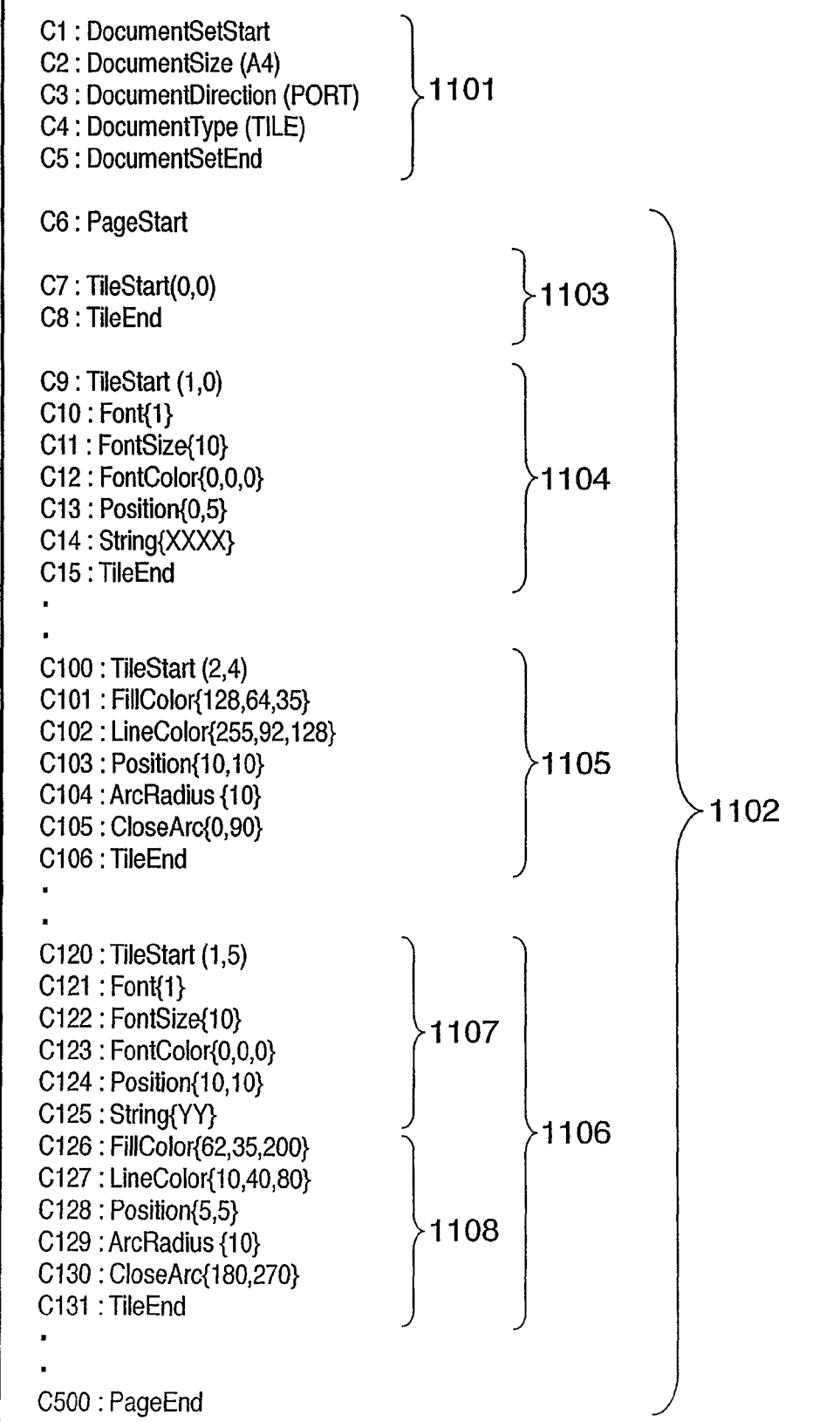
FIG. 9 is a view showing a description example of tile vector data according to the first embodiment of the present invention.

FIG. 9 is a view showing a description example of tile vector data according to the first embodiment of the present invention.

Referring to FIG. 9, reference numeral 1101 denotes a document setting instruction part related to setting of entire document data; 1102, a whole rendering instruction part; 1103 to 1106, rendering instruction parts of the tiles A, B, C, and D; 1107 and 1108, a text rendering instruction part and a graphic rendering instruction part of the tile D.

Details of the rendering instructions will be described.

In the document setting instruction part 1101, C1 to C5 are commands related to the entire document. Only one set of the commands C1 to C5 is present in a document.

Examples of the commands related to the entire document data are a character set command (font designation command), scalable font command (a command to designate whether to use a scalable font), and hard reset command (a command to reset the preceding printer use environment).

C1 is a document set start command. C2 is a command to indicate the output paper size of document data. In this case, A4 is set. C3 is a command to indicate the direction of document data. "Portrait" and "landscape" can be selected, and "portrait" (PORT) is set in this case.

C4 is a command to indicate the type of document data, i.e., whether the document data contains page vectors or tile vectors. In this case, "tile" (TILE) is set. C5 is a document set end command.

C6 to C500 contained in the rendering instruction part 1102 are various kinds of commands to output the document data.

C6 is a command to indicate the start of the page. C7 is a command to indicate the start of the rendering command of the tile A in FIG. 8. The two parameters in TileStart(0,0) indicate the tile ID in the document data. C8 is a command to indicate the end of the rendering command of the tile A. If no object is present in a tile, as in the tile A, only the commands to indicate the start and end of the tile are described.

C9 is a command to indicate the start of the rendering command of the tile B. C10 is a command to select the font type of a text. In this case, a font set numbered "1" is set. C11 is a command to set the font size. In this case, "10 points" is set.

C12 is a command to set the text color and sequentially indicates the luminances of R (red), G (green), and B (blue) color components. The luminances are quantized in, e.g., 256 levels from 0 to 255. In this case, {0,0,0} is set. C13 is a command to indicate the coordinates of the text rendering start position. A coordinate position (X,Y) is designated on the basis of the origin that is set at the upper left corner of the tile. In this case, text rendering is set to start from a position {0,5} of the tile. C14 is a command to indicate the character string (XXXX) to be actually rendered. C15 is a command to indicate the end of the rendering command of the tile B.

C100 is a command to indicate the start of the rendering command in FIG. 8. C101 is a command to indicate the filling color of a plane in graphic rendering. The color is designated like the text color. C102 is a command to designate the line color of graphic rendering. C103 is a command to indicate the coordinates of the graphic rendering position.

C104 is a command to designate the radius of an arc to be rendered. In this case, "10" coordinate units are designated. C105 is a command to render a closed arc. The two parameters in the command indicate the rendering start angle and end angle in rendering an arc. Vertical information is defined to 0°. In this case, rendering of an arc from 0° to 90° is designated. C106 is a command to indicate the end of the rendering command of the tile C.

C120 is a command to indicate the start of the rendering command of the tile D in FIG. 8. C121 to C130 are commands to designate, e.g., the font type, color, and size of a text in the text rendering instruction, like the commands C9 to C15, and, e.g., the plane and line colors and the position of a graphic in the graphic rendering instruction, like the commands C100 to C106. C131 is a command to indicate the end of the rendering command of the tile D.

C500 is a command to indicate the end of the page.

The processing of the tile/page vector conversion unit 13 will be described next in detail with reference to FIG. 10.

Figure 10:
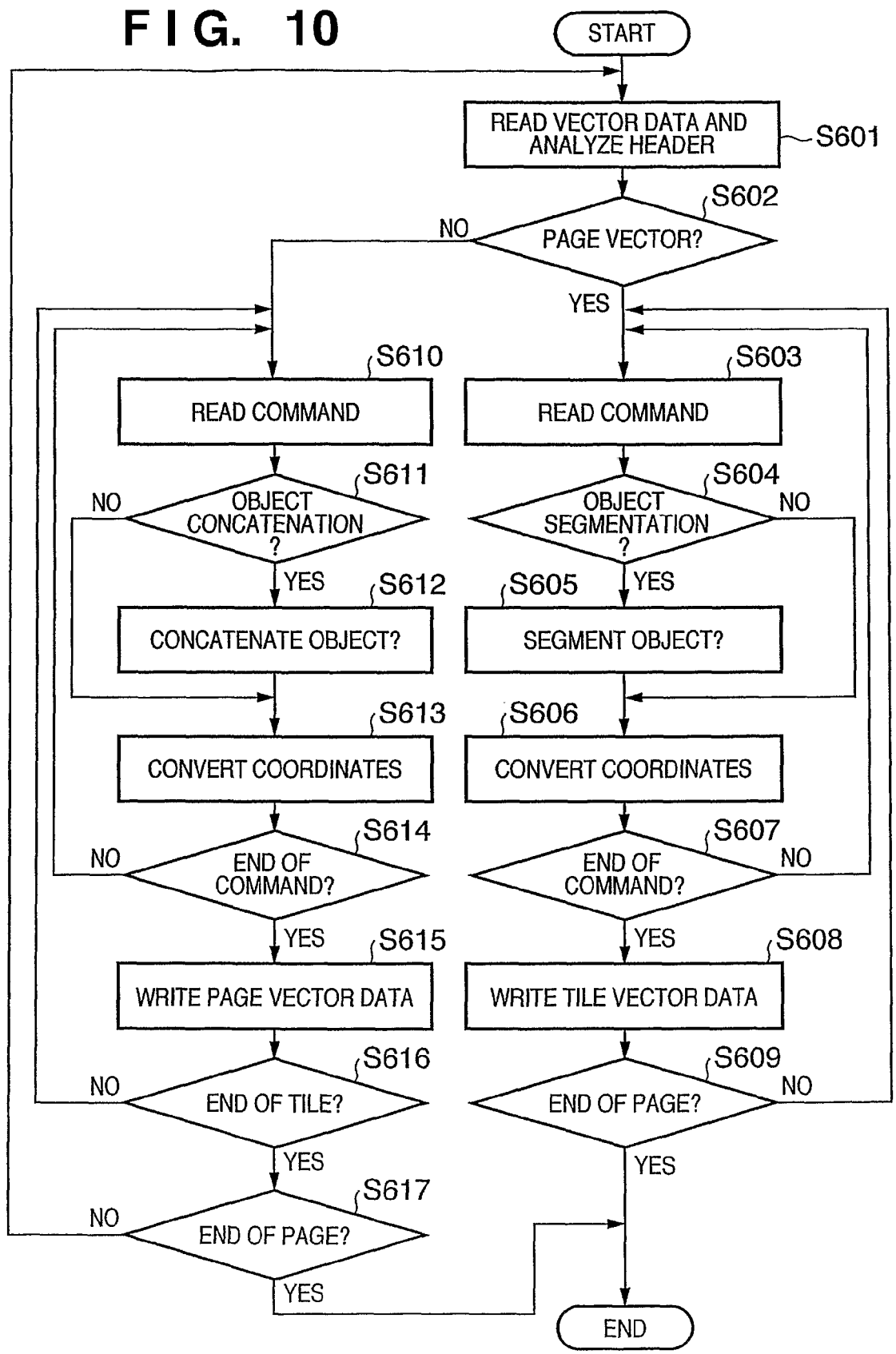
FIG. 10 is a flowchart showing processing executed by a tile/page vector conversion unit according to the first embodiment of the present invention.

FIG. 10 is a flowchart showing processing executed by the tile/page vector conversion unit according to the first embodiment of the present invention.

The tile/page vector conversion unit 13 can perform mutual conversion between page vector data and tile vector data. The tile/page vector conversion unit 13 may includes a conversion unit which converts page vector data into tile vector data and a conversion unit which converts tile vector data into page vector data.

(Step S601)

A command sequence corresponding to the header field is read out from document data (vector data) stored in the system memory 5 to analyze the command part related to the entire document data as a processing target. More specifically, the contents of a part corresponding to C1 to C5 in FIG. 7 or 9 are analyzed.

(Step S602)

It is determined on the basis of the analysis result whether the document data type is page vector data. If the data type is page vector data (YES in step S602), the flow advances to step S603 to execute page vector→tile vector conversion. If the data type is not page vector data, i.e., the data type is tile vector data (NO in step S602), the flow advances to step S610 to execute tile vector→page vector conversion.

(Step S603)

A command sequence describing an object is read out from the page vector data.

(Step S604)

The command sequence read out in step S603 is analyzed to determine whether the size of the described object is larger than the desired segmented tile size. That is, it is determined whether the object needs to be further segmented.

If the object size is smaller than the desired segmented tile size (NO in step S604), the flow skips step S605 and advances to step S606. If the object size is larger than the desired segmented tile size (YES in step S604), the flow advances to step S605.

(Step S605)

The input object is segmented here.

In, e.g., the page vector data shown in FIG. 7, the text rendering instruction part 902 describes the rendering instruction of the whole character string including (XXXX ... YY ... ). To the contrary, for example, the rendering instruction 1104 for the tile B in the tile vector data shown in FIG. 9 describes only the rendering instruction of the character string "XXXX".

Hence, in tile vector data, if a character string extends over a plurality of tiles, the character string is segmented midway (at a tile boundary). A succeeding character string generated by segmentation is described in the next tile as another character string. If the description is not fitted in the second tile, the character string contained in the tiles is segmented in a similar manner. This processing is repeated until all segmented character strings are fitted in the tile size. Where to segment the character string is determined by calculating the number of characters fitted in a tile on the basis of the font type and size and extracting characters in that number.

For example, for the text rendering instruction part 902 of the page vector data shown in FIG. 7, the number of characters fitted in a tile is calculated as four. In this case, the description of the command C11 in FIG. 7 is converted into the description of the command C13 contained in the rendering instruction for the tile B.

In the graphic rendering instruction part 903, the graphic (the ¾ circle in FIG. 6) described by the commands C17 to C21 is not fitted in a tile contained in the tile vector data in FIG. 8. For this reason, this graphic is segmented into a plurality of tiles including the tile D. In graphic segmentation, a portion that contacts the boundary region of tiles is calculated on the basis of the rendering position, shape, and size of the graphic. A closed region formed from the boundary and the partial region of the graphic in the tile is re-described as a new graphic.

Of the graphic (the ¾ circle in FIG. 6) described in the graphic rendering instruction part 903 in FIG. 7, the lower left partial region is converted into a description of a ¼ circle indicated by the commands C126 to C130 of the graphic rendering instruction part 1108. Each of the remaining regions is also converted into a description of a ¼ circle with a similar shape.

(Step S606)

In the command description of the input object, a coordinate position is converted into a rendering position in the tile vector data. In the page vector data, a position from the upper left corner of the page is described. In the tile vector data, however, the position is re-described to a position from the upper left corner of a tile. When a rendering position is described by coordinates in a tile, the data length required for coordinate calculation can be reduced.

(Step S607)

When command description conversion of one object is ended, it is determined whether command description conversion of all objects in the page is ended. If conversion is not ended (NO in step S607), the flow returns to step S603 to repeat the processing in steps S603 to S607 for the next command. If conversion is ended (YES in step S607), the flow advances to step S608.

(Step S608)

When description conversion of all commands is ended, the tiles in the tile vector data segmented as shown in FIG. 8 are written in the system memory 5 as tile vector data sequentially from the upper left corner of the page. The tile vector data is described in a format that adds commands to indicate the start and end of each tile to the commands described in steps S605 and S606.

In writing the first command of the page, a tile vector containing no object is generated in the system memory 5. An example of a tile vector containing no object is the tile A in FIG. 8. The tile A is described by the rendering instruction part 1103 (FIG. 9) containing only the commands C7 and C8 which indicate the start and end of the tile.

Next, an object description is added to a tile at coordinates where the commands processed in steps S603 to S607 exist. For example, the tile B in FIG. 8 is described by the rendering instruction part 1104 (FIG. 9) containing the commands C9 to C15. If a plurality of objects are present in a single tile, like the tile D, an object description included in the text rendering instruction part 1107 and an object description included in the graphic rendering instruction part 1108 are written in order, as in the rendering instruction part 1106.

(Step S609)

When the write of one object in a tile vector is ended, it is determined whether the description of all objects in the page is ended. If the description is not ended (NO in step S609), the flow returns to step S603. If the description is ended (YES in step S609), the processing is ended.

A case wherein the document data type is determined as tile vector data in step S602 will be described.

(Step S610)

A command sequence describing an object is read out from the tile vector data.

(Step S611)

The command sequence read out in step S610 is analyzed to determine whether the described object can be concatenated to a tile read out before. If the object cannot be concatenated (NO in step S611), the flow skips step S612 and advances to step S613. If the object can be concatenated (YES in step S611), the flow advances to step S612.

Whether the object can be concatenated is determined on the basis of, e.g., the coordinate position of the readout command the type of a graphic. For a character string, the determination is done on the basis of the font size and type.

(Step S612)

Object concatenation processing is executed. This processing is fundamentally implemented by reversing the process procedure in step S605.

(Step S613)

In the command description of the input object, a coordinate position is converted into a rendering position in the page vector data. In the tile vector data, a position from the upper left corner of a tile is described. In the page vector data, however, the position is re-described to a position from the upper left corner of the page. When a rendering position is described by coordinates in a tile, the data length required for coordinate calculation can be reduced.

(Step S614)

When command description conversion of one object is ended, it is determined whether command description conversion of all objects in the tile is ended. If conversion is not ended (NO in step S614), the flow returns to step S610 to repeat the processing in steps S610 to S613 for the next command. If conversion is ended (YES in step S614), the flow advances to step S615.

(Step S615)

When description conversion of all commands is ended, the tile vector data is written in the system memory 5 as page vector data. The page vector data is described in a format that deletes commands to indicate the start and end of each tile from the commands described in steps S612 and S613.

In writing the command described in the first tile of the page, a page vector containing no object is generated in the system memory 5. Referring to the description in FIG. 7, the page vector is described by only the commands C1 to C6 and C22.

Next, an object description processed in steps S610 to S613 is added. In the description shown in FIG. 7, this object description corresponds to the commands C7 to C11 included in the text rendering instruction part 902. In this case, the object indicates a character string {XXXX . . . YY . . . }. This object description is generated by sequentially concatenating character strings in tiles described in the text rendering instruction parts 1104 and 1107 in FIG. 9 in step S612.

(Step S616)

When the write of one command in the page vector is ended, it is determined whether the description of all objects in the tile is ended. If the description is not ended (NO in step S616), the flow returns to step S610. If the description is ended (YES in step S616), the flow advances to step S617.

(Step S617)

When the write of one tile vector data is ended, it is determined whether processing of the description of all tile vector data of the page is ended. If the processing is not ended (NO in step S617), the flow returns to step S610. If the processing is ended (YES in step S617), the processing is ended.

[Image Data Rasterization Unit (RIP)]

The image data rasterization unit 18 in the controller 1 will be described next in detail.

Before the start of processing such as copy, print, or transmission of image data, the local memory 19 is initialized, and the resolution of each object to be created is set. In the first embodiment, the generation resolution is set to 600 dpi. By using this value, a print command designated by a unit system such as a point size or mm is converted into a dot count.

Processing of causing the image data rasterization unit 18 to execute tile vector data rasterization will be described below with reference to FIG. 11.

Figure 11:
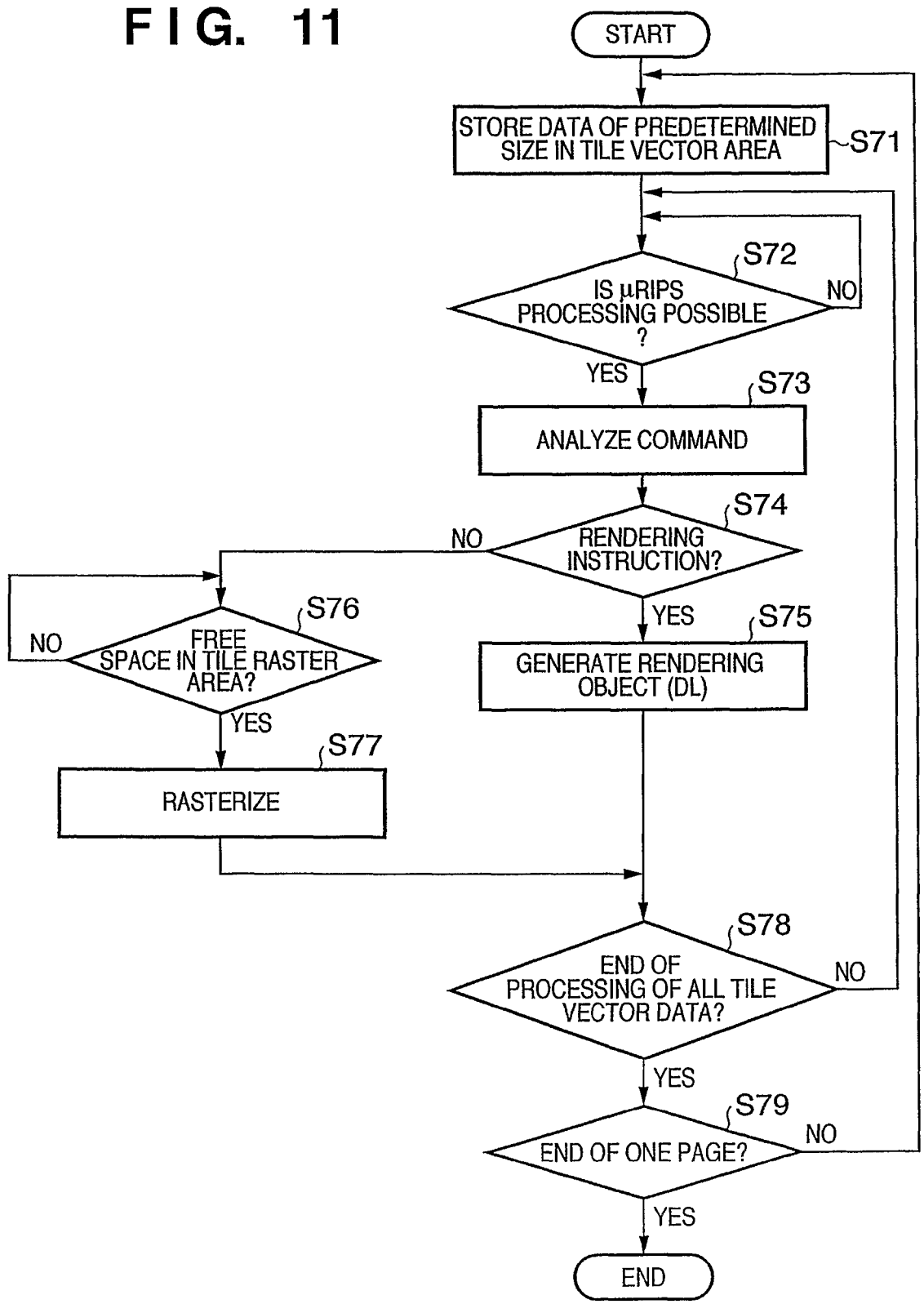
FIG. 11 is a flowchart showing processing executed by an image data rasterization unit according to the first embodiment of the present invention.

FIG. 11 is a flowchart showing processing executed by the image data rasterization unit according to the first embodiment of the present invention.

(Step S71)

Tile vector data of a predetermined size which is input from the system memory 5 to the RIP 18 through the SBB 2 is temporarily stored in the tile vector area of the local memory 19.

(Step S72)

When the tile vector data is stored in the local memory 19, it is determined whether any one of the μRIPs 18*a* to 18*d* in the RIP 18 can rasterize (process) the tile vector data. If all the μRIPs 18*a* to 18*d* are rasterizing (processing) tile vector data (NO in step S72), the processing waits until one of them can execute rasterization.

(Step S73)

When one of the μRIPs 18*a* to 18*d* can rasterize tile vector data, command analysis of the tile vector data stored in the local memory 19 is executed in accordance with a predetermined grammar.

(Step S74)

It is determined on the basis of the command analysis result whether the command is a rendering instruction or a discharge instruction. If the command indicates a rendering instruction (YES in step S74), the flow advances to step S75. If the command indicates a discharge instruction (NO in step S74), the flow advances to step S76.

(Step S75)

If the command indicates a rendering instruction, a rendering object (DL data) is generated. When the command in the tile vector data is a text rendering instruction, a font object is generated on the basis of the font style, character size, and character code designated by the command, and stored in the DL data area of the local memory 19. When the command indicates a rendering instruction other than a text rendering instruction, i.e., a graphic rendering instruction, a rendering object of a graphic (e.g., a line, circle, or polygon) designated by the command is generated and stored in the DL data area of the local memory 19.

If the command indicates print data that is not designated by a rendering instruction, print control processing such as print position movement or print environment setting is executed for the print data. Then, the command analysis for one unit is ended.

The above-described processing is repeated until all commands in the tile vector data are analyzed.

(Step S76)

If the command indicates a discharge instruction, the μRIP determines whether the tile raster area on the local memory 19 has a free space. If no free space is present (NO in step S76), the processing waits until another μRIP ends the processing, and the tile raster area is released to form a free space. If a free space is present (YES in step S76), the flow advances to step S77.

(Step S77)

If the tile raster area has a free space, the rendering object generated in step S75 is read out and rendered (rasterized) in the tile raster area. If the generation resolution is 600 dpi, the rendering object is rasterized in the tile raster area as a 600-dpi image. The rendered tile raster image is output to the image processing unit 15 through the SBB 2.

(Step S78)

When command analysis or rendering processing of one tile vector data is ended in step S75 or S77, it is determined whether all tile vector data stored in the tile vector area are processed. If unprocessed tile vector data remains (NO in step S78), the flow returns to step S72 to continuously process the next tile vector data. If no unprocessed tile vector data remains (YES in step S78), the flow advances to step S79.

(Step S79)

It is determined whether all tile vector data of one page are processed. If unprocessed tile vector data remains (NO in step S79), the flow returns to step S71 to read out tile vector data from the system memory 5 and continue the processing. If no unprocessed tile vector data remains (YES in step S79), the processing is ended.

As described above, the first embodiment employs the configuration that stores, as input image data, only image data of two formats, i.e., page vector data and tile vector data on the system memory. Raster data and DL data that have a large image size need not be stored on the system memory. For this reason, the image data area that must be ensured on the system memory can be reduced.

In transmitting image data to an external device, tile vector data is converted into page vector data to decrease the number of objects that exist in the image data. Hence, the transmission data amount can be decreased. When image data is transmitted to the transmission destination as page vector data, the received image data (page vector data) can easily be converted into a general format such as PDF or SVG in the transmission destination.

When data spool is done using vector data, the resolution dependence of the system is solved. Hence, a high image quality and a high system processing speed can be implemented in parallel. That is, a system with high cost performance can be formed.

When image data in the system is handled as vector data, the stored image data searchability can be improved. In addition, a more intelligent system can be implemented so that image manipulation for POD printing where raster data is converted into objects and reused can be speeded up.

When a plurality of image data rasterization units for rasterization to vector data are prepared and operated in parallel, tile vector data rasterization can be executed at a high speed. When the number of image data rasterization units to be operated is controlled, a scalable system capable of changing the processing function in accordance with the application and purpose can be formed.

[Second Embodiment]

In the first embodiment, for transmission from the MFP to an external device, the data amount is reduced or image data versatility is increased by converting tile vector data into page vector data. However, the present invention is not limited to this. For example, in storing image data, not only tile vector data but also page vector data may be stored in advance. In such a configuration, page vector data can be transmitted to an external device at the time of transmission without converting tile vector data into page vector data.

The entire configuration of the system is the same as in the first embodiment, and a detailed description thereof will be omitted.

A transmission operation of the image processing system according to the second embodiment will be described below.

[Transmission]

Figure 12:
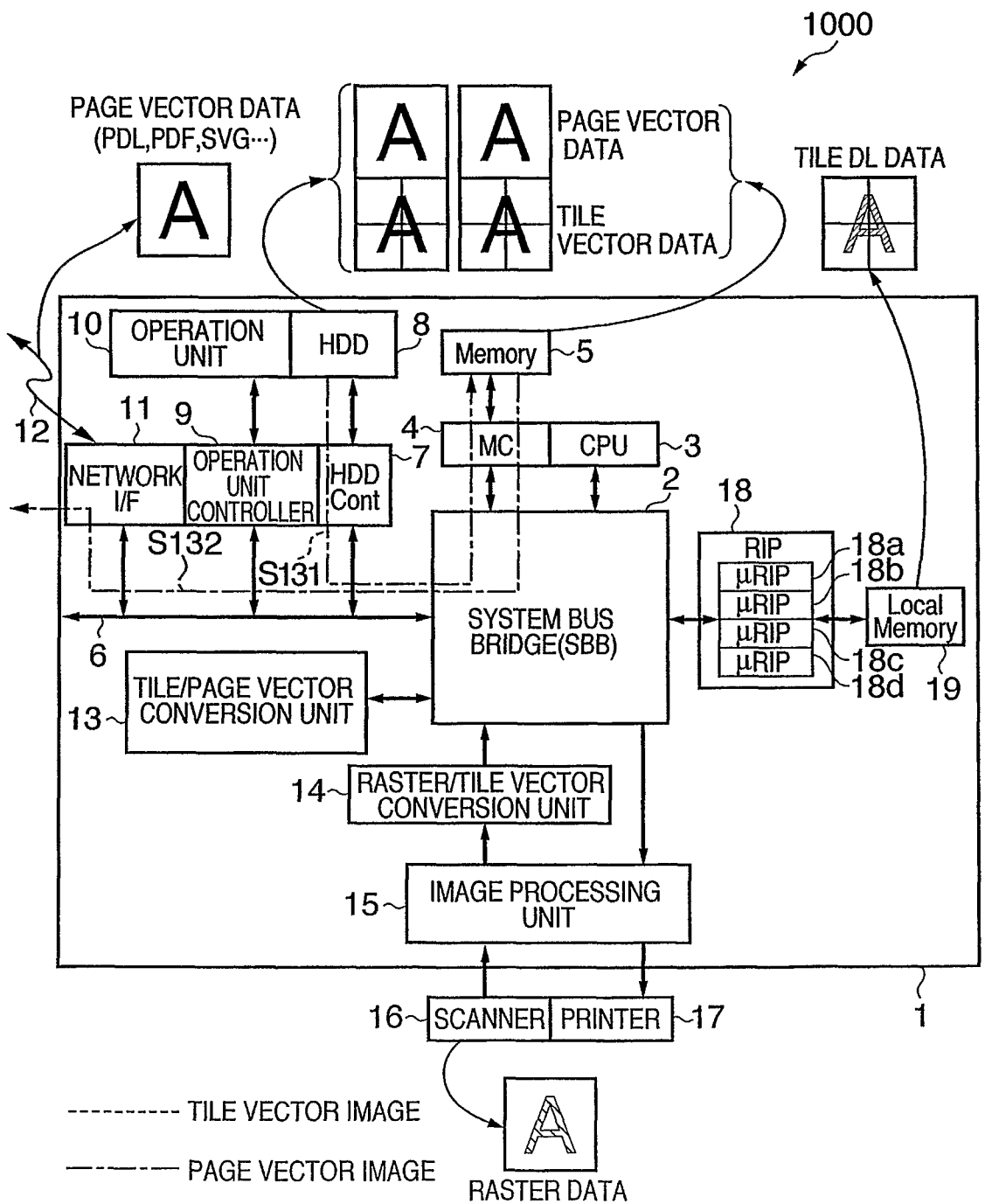
FIG. 12 is a block diagram showing the data flow of a transmission operation of an image processing system according to the second embodiment of the present invention.

FIG. 12 is a block diagram showing the data flow of a transmission operation of the image processing system according to the second embodiment of the present invention.

This data flow is implemented by causing the various kinds of constituent elements included in an MFP 1000 to cooperate under the control of a CPU 3.

(S131): In the second embodiment, tile vector data and page vector data are stored in an HDD 8 in association with each other in correspondence with one image data. In transmission, page vector data is selected, read out from an HDD Cont 7 connected to a global bus 6 through an SBB 2, and temporarily stored in a system memory 5.

(S132): The page vector data stored in the system memory 5 is read out from a network I/F 11 connected to the global bus 6 and transferred to an external device connected to a network 12.

In the second embodiment, the capacity of image data to be stored in the HDD 8 is larger than in the first embodiment. However, the flow in transmission is very simple.

As described above, according to the second embodiment, in addition to the effects described in the first embodiment, tile vector data and page vector data corresponding to it are stored and managed in the HDD in correspondence with one image data. Hence, only by selecting two kinds of vector data stored and managed in the HDD, as needed, more appropriate vector data can be output in outputting the image data without conversion processing.

[Third Embodiment]

In the third embodiment, an application example of object segmentation processing in step S605 in FIG. 10 of the first embodiment will be described.

In the third embodiment, object segmentation processing executed by a tile/page vector conversion unit 13 especially when the processing target object is a curve object will be described.

Figure 13:
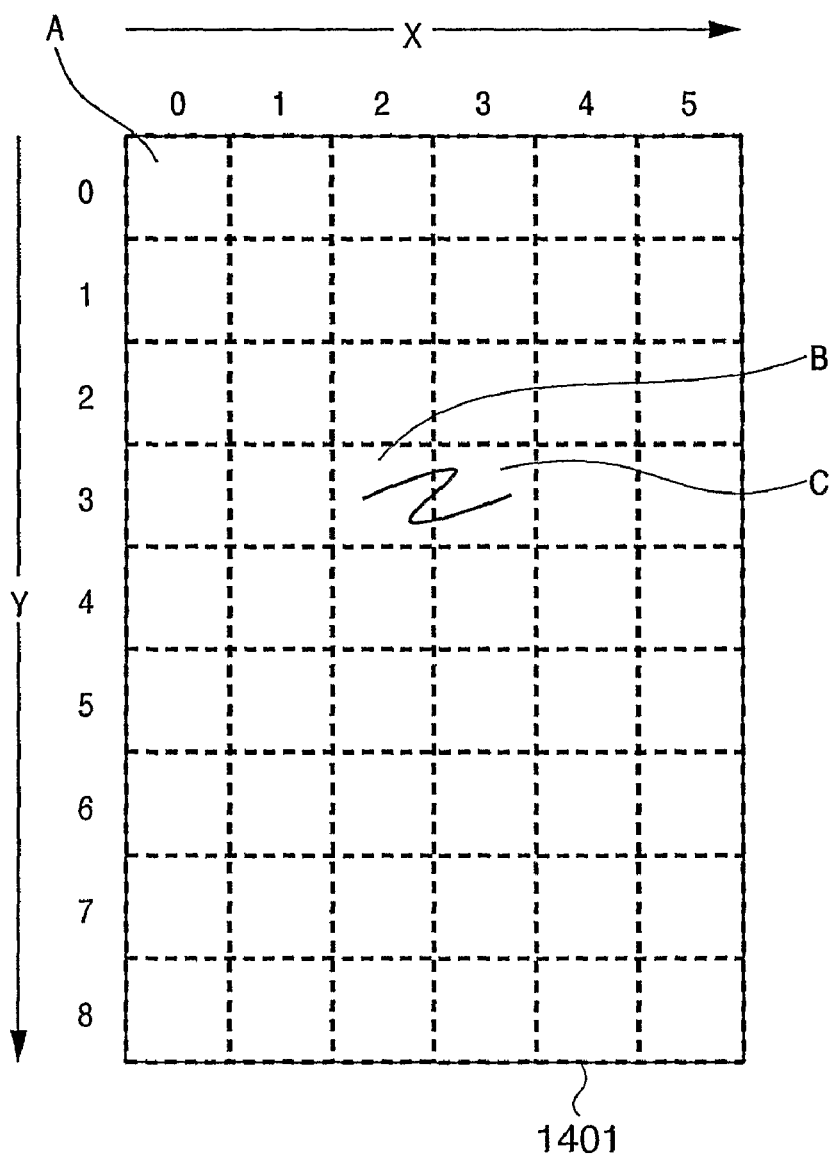
FIG. 13 is a view showing an example of tile vector data according to the third embodiment of the present invention.

FIG. 13 is a view showing an example of tile vector data according to the third embodiment of the present invention.

In FIG. 13, the widthwise direction of document data 1401 is defined as an "X" direction, and the longitudinal direction is defined as a "Y" direction. The numbers arrayed in the X direction in FIG. 13 indicate X-direction tile IDs. The numbers arrayed in the Y direction indicate Y-direction tile IDs. A to C represent tile vectors located at positions of tile IDs=(0, 0), (2,3), and (3,3).

Especially in FIG. 13, a curve object extends over the tiles B and C. That is, in this example, the curve object is segmented into the tiles B and C.

A description example of the contents of the document data 1401 formed from page vector data before tile segmentation will be described with reference to FIG. 14.

FIG. 14 is a view showing a description example of page vector data according to the third embodiment of the present invention.

Referring to FIG. 14, reference numeral 1501 denotes a document setting instruction part related to setting of entire document data; and 1502, a whole rendering instruction part.

Details of the rendering instructions will be described.

In the document setting instruction part 1501, C1 to C5 are commands related to the entire document. Only one set of the commands C1 to C5 is present in a document.

The contents of the commands related to the entire document data are the same as those described in detail with reference to FIG. 7 in the first embodiment.

C6 to C10 contained in the rendering instruction part are various kinds of commands to output the document data.

C6 is a command to indicate the start of the page. C7 is a command to set the line (curve) color and sequentially indicates the luminances of R (red), G (green), and B (blue) color components. The luminances are quantized in, e.g., 256 levels from 0 to 255. In this case, {255,92,128} is set.

C8 is a command to indicate the coordinates of the curve rendering start position (one end point that defines the curve). A coordinate position (X,Y) is designated on the basis of the origin that is set at the upper left corner of the page. In this case, curve rendering is set to start from a position {66,12} of the page. C9 is a command to indicate the coordinates of the anchor points and end position (the other end point that defines the curve) of curve rendering. In this case, curve rendering is set to pass through anchor points {126,98} and {66,126} and end at a position {126,112} of the page. C10 is a command to indicate the end of the page.

A description example of the contents of the document data 1401 formed from tile vector data after tile segmentation will be described with reference to FIG. 15.

FIG. 15 is a view showing a description example of tile vector data according to the third embodiment of the present invention.

Referring to FIG. 15, reference numeral 1601 denotes a document setting instruction part related to setting of entire document data; 1602, a whole rendering instruction part; 1603 to 1605, rendering instruction parts of the tiles A to C; 1606 and 1607, graphic (curve) rendering instruction parts of the tile B; and 1608 and 1609, graphic (curve) rendering instruction parts of the tile C.

Details of the rendering instructions will be described.

In the document setting instruction part 1601, C1 to C5 are commands related to the entire document. Only one set of the commands C1 to C5 is present in a document.

The contents of the commands related to the entire document data are the same as those described in detail with reference to FIG. 9 in the first embodiment.

C6 to C500 contained in the rendering instruction part 1602 are various kinds of commands to output the document data.

C6 is a command to indicate the start of the page. C7 is a command to indicate the start of the rendering command of the tile A in FIG. 13. The two parameters in TileStart(0,0) indicate the tile ID in the document data. C8 is a command to indicate the end of the rendering command of the tile A. If no object is present in a tile, as in the tile A, only the commands to indicate the start and end of the tile are described.

As for the tiles B and C, one curve object on the page vector data is segmented into four curve objects by the tiles B and C. Two of the four curve objects belong to each of the tiles B and C.

For this reason, the rendering instruction part 1604 of the tile B describes the command C101 to indicate the color of the two curve objects, and the rendering instruction part 1606 (commands C102 and C103) and rendering instruction part 1607 (commands C104 and C105) which contain the start positions, anchor points, and end positions of the curve objects.

Similarly, the rendering instruction part 1605 of the tile C describes the command C121 to indicate the color of the two curve objects, and the rendering instruction part 1608 (commands C122 and C123) and rendering instruction part 1609 (commands C124 and C125) which contain the start positions, anchor points, and end positions of the curve objects.

Tile segmentation of the curve object extending over the tiles B and C will be described next with reference to FIGS. 16A to 16C.

Figure 16A:
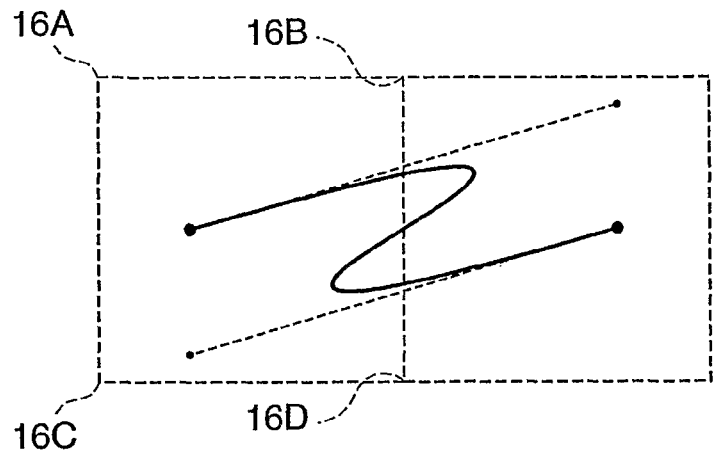
FIGS. 16A to 16C are views for explaining curve object tile segmentation according to the third embodiment of the present invention.
Figure 16B:
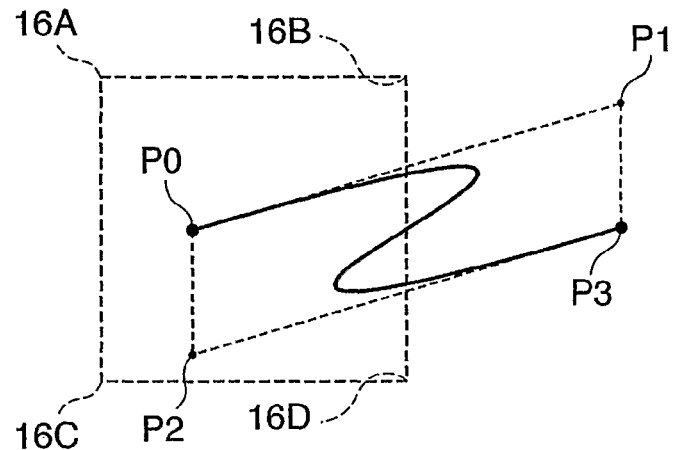
Figure 16C:
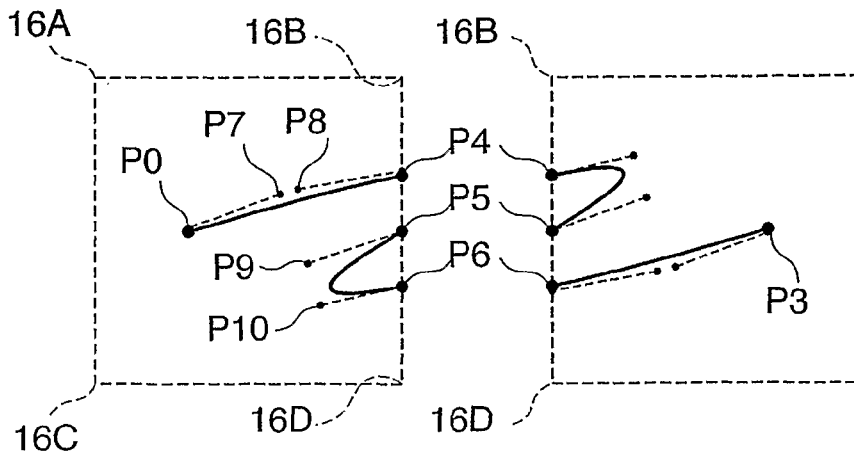

FIGS. 16A to 16C are views for explaining curve object tile segmentation according to the third embodiment of the present invention.

For the curve object shown in FIG. 16A which extends over at least one tile, a convex polygon P0-P1-P3-P2 including the curve is calculated, as shown in FIG. 16B. Next, the possibility that the curve object can cross any side of the tile of interest is evaluated by determining the presence/absence of intersection between tile sides 16A-16B, 16B-16D, 16D-16C, and 16C-16A and line segments P0-P1, P1-P3, P3-P2, and P2-P1.

As shown in FIG. 16C, intersection points between a curve P0-P3 and the tile side 16B-16D which crosses the line segments P0-P1 and P3-P2 are calculated so that intersection points P4, P5, and P6 are acquired. The curve P0-P3 is segmented into curves P0-P4, P4-P5, P5-P6, and P6-P3 which have the intersection points P4, P5, and P6 as end points. Anchor points P7, P8, P9, and P10 of the curves are calculated. Commands to render the segmented curves are generated.

In the above-described way, the curve object extending over at least one tile can be segmented into tiles.

The curve object segmentation processing will be described next in detail with reference to FIG. 17.

FIG. 17 is a flowchart showing details of curve object segmentation processing according to the third embodiment of the present invention.

This processing is executed when the processing target is a curve object in the object segmentation processing in step S605 in FIG. 10.

(Step S1801)

First, it is determined whether the curve object as the processing target is already segmented by another adjacent tile. If the curve object is segmented (YES in step S1801), the flow advances to step S1809. If the curve object is not segmented (NO in step S1801), the flow advances to step S1802.

(Step S1802)

A convex polygon including the curve object as the processing target and its vertices are calculated.

(Step S1803)

The possibility that the convex polygon including the curve object as the processing target can cross any side of the tile of interest is evaluated.

(Step S1804)

It is determined on the basis of the evaluation result in step S1803 whether there is a possibility that the convex polygon including the curve object as the processing target can cross any side of the tile of interest. If no cross possibility is present (NO in step S1804), the processing is ended. If a cross possibility is present (YES in step S1804), the flow advances to step S1805.

(Step S1805)

A side of interest (tile side) of the tile of interest which can cross the convex polygon including the curve object as the processing target is selected. The intersection point between the tile side and the curve object is calculated. The calculated intersection point is stored in the system memory 5. The number of intersection points can be, e.g., 0 to 3.

The intersection point is calculated on the basis of, e.g., an equation defined by the convex polygon and the tile side of the tile of interest.

(Step S1806)

It is determined whether all intersection points between the convex polygon including the curve object as the processing target and the side of interest which can cross the convex polygon are calculated. If the side of interest has an uncalculated intersection point (NO in step S1806), the flow returns to step S1805. If the side of interest has no uncalculated intersection point (YES in step S1806), the flow advances to step S1807.

When the processing in steps S1802 to S1804 is executed, the number of times of loop of the intersection point calculation processing (steps S1805 and S1806) with a large throughput can be reduced.

(Step S1807)

The curve object is segmented by using the intersection point of interest between the curve object and the side of interest of the tile of interest. The end points and anchor points of the segmented curves are calculated and stored in the system memory 5.

(Step S1808)

It is determined whether curve object segmentation is ended at all intersection points between the tile sides and the curve object, which are stored in the system memory 5. If segmentation is not ended (NO in step S1808), the flow returns to step S1807. If segmentation is ended (YES in step S1808), the processing is ended.

(Step S1809)

If the curve object as the processing target is already segmented by another adjacent tile in step S1801, the intersection points between the curve object and the adjacent tile, which are stored in the system memory 5 at the time of processing of the adjacent tile, are acquired.

(Step S1810)

A convex polygon including the curve object and its vertices, which are calculated regarding the adjacent tile, are acquired. The flow advances to step S1803.

The processing in step S1802 will be described next in detail with reference to FIG. 18.

Figure 18:
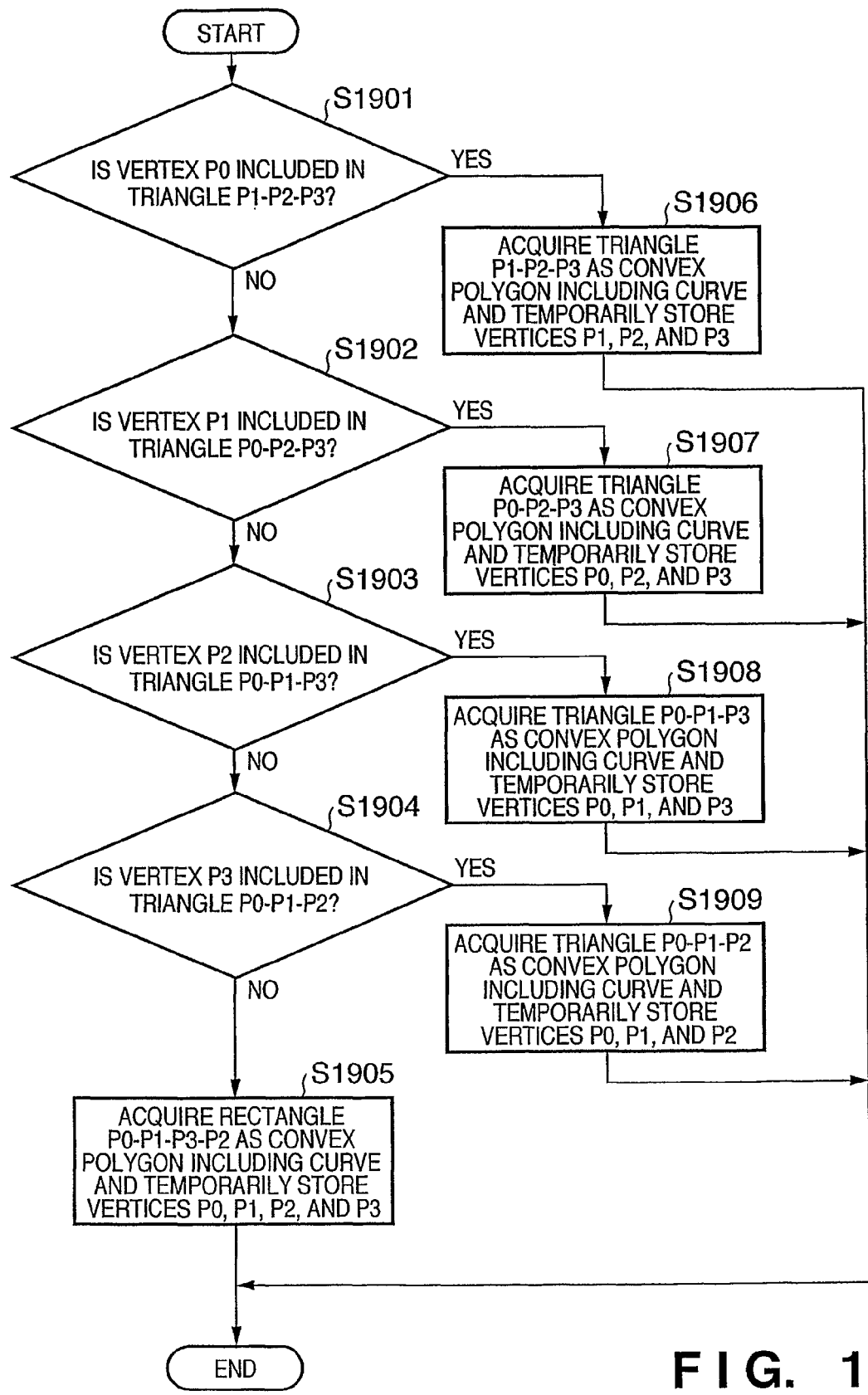
FIG. 18 is a flowchart showing details of processing in step S1802 according to the third embodiment of the present invention.

FIG. 18 is a flowchart showing details of the processing in step S1802 according to the third embodiment of the present invention.

(Step S1901)

It is determined whether one vertex P0 of the rectangle P0-P1-P3-P2 (e.g., FIG. 16B) defined by four points, i.e., the end points and anchor points of the curve object is included in a triangle P1-P2-P3 defined by the remaining vertices. If the vertex is included (YES in step S1901), the flow advances to step S1906. If the vertex is not included (NO in step S1901), the flow advances to step S1902.

(Step S1902)

It is determined whether one vertex P1 of the rectangle P0-P1-P3-P2 defined by four points, i.e., the end points and anchor points of the curve object is included in a triangle P0-P2-P3 defined by the remaining vertices. If the vertex is included (YES in step S1902), the flow advances to step S1907. If the vertex is not included (NO in step S1902), the flow advances to step S1903.

(Step S1903)

It is determined whether one vertex P2 of the rectangle P0-P1-P3-P2 defined by four points, i.e., the end points and anchor points of the curve object is included in a triangle P0-P1-P3 defined by the remaining vertices. If the vertex is included (YES in step S1903), the flow advances to step S1908. If the vertex is not included (NO in step S1903), the flow advances to step S1904.

(Step S1904)

It is determined whether one vertex P3 of the rectangle P0-P1-P3-P2 defined by four points, i.e., the end points and anchor points of the curve object is included in a triangle P0-P1-P2 defined by the remaining vertices. If the vertex is included (YES in step S1904), the flow advances to step S1909. If the vertex is not included (NO in step S1904), the flow advances to step S1905.

(Step S1905)

The rectangle P0-P1-P3-P2 is acquired as a convex polygon including the curve object. P0, P1, P2, and P3 are stored in the system memory 5 as the vertices of the convex polygon, and the processing is ended.

(Step S1906)

The triangle P1-P2-P3 is acquired as a convex polygon including the curve object. P1, P2, and P3 are stored in the system memory 5 as the vertices of the convex polygon, and the processing is ended.

(Step S1907)

The triangle P0-P2-P3 is acquired as a convex polygon including the curve object. P0, P2, and P3 are stored in the system memory 5 as the vertices of the convex polygon, and the processing is ended.

(Step S1908)

The triangle P0-P1-P3 is acquired as a convex polygon including the curve object. P0, P1, and P3 are stored in the system memory 5 as the vertices of the convex polygon, and the processing is ended.

(Step S1909)

The triangle P0-P1-P2 is acquired as a convex polygon including the curve object. P0, P1, and P2 are stored in the system memory 5 as the vertices of the convex polygon, and the processing is ended.

The processing in step S1803 will be described next in detail with reference to FIG. 19.

Figure 19:
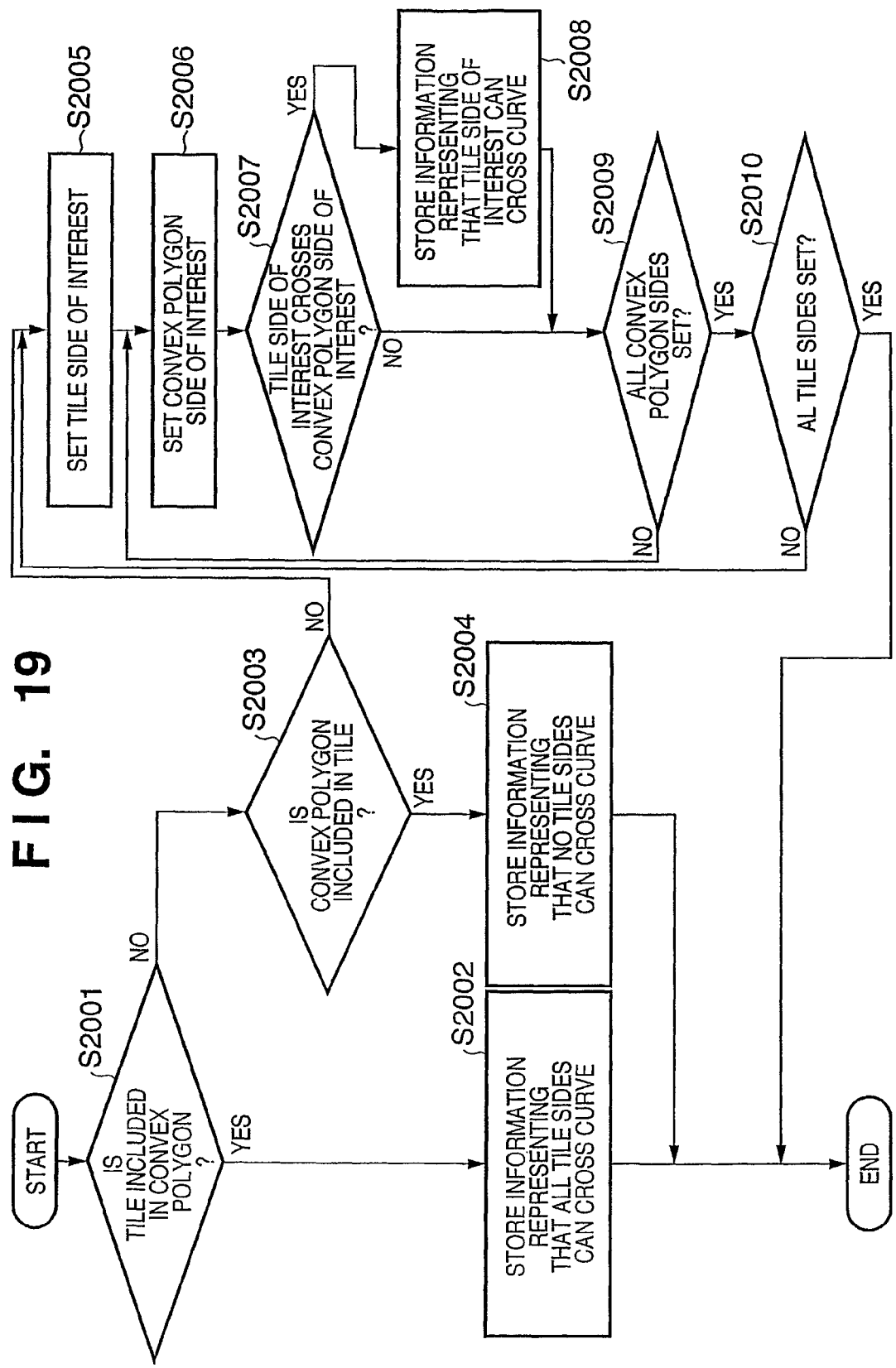
FIG. 19 is a flowchart showing details of processing in step S1803 according to the third embodiment of the present invention.

FIG. 19 is a flowchart showing details of the processing in step S1803 according to the third embodiment of the present invention.

(Step S2001)

It is determined whether the tile of interest is included in the convex polygon including the curve object. If the tile is included (YES in step S2001), the flow advances to step S2002. If the tile is not included (NO in step S2001), the flow advances to step S2003.

(Step S2002)

Information representing that all tile sides can cross the curve object is stored in the system memory 5, and the processing is ended.

(Step S2003)

It is determined whether the convex polygon including the curve object is included in the tile. If the convex polygon is included (YES in step S2003), the flow advances to step S2004. If the convex polygon is not included (NO in step S2003), the flow advances to step S2005.

(Step S2004)

Information representing that no tile sides can cross the curve object is stored in the system memory 5, and the processing is ended.

(Step S2005)

One of the four tile sides is set as the tile side of interest.

(Step S2006)

One of the three or four sides of the convex polygon is set as the convex polygon side of interest.

(Step S2007)

It is determined whether the tile side of interest crosses the convex polygon side of interest. If they cross (YES in step S2007), the flow advances to step S2008. If they do not cross (NO in step S2007), the flow advances to step S2009.

(Step S2008)

Information representing that the tile side of interest can cross the curve object is stored in the system memory 5.

(Step S2009)

It is determined for all of the three or four convex polygon sides whether setting processing (steps S2006 and S2007) for the convex polygon side of interest is ended. If the processing is not ended (NO in step S2009), the flow returns to step S2006. If the processing is ended (YES in step S2009), the flow advances to step S2010.

(Step S2010)

It is determined for all of the four tile sides whether setting processing (step S2005) for the tile side of interest is ended. If the processing is not ended (NO in step S2010), the flow returns to step S2005. If the processing is ended (YES in step S2010), the processing is ended.

As described above, according to the third embodiment, in addition to the effects described in the first and second embodiments, the shape of a curve object is evaluated in converting page vector data containing the curve object into tile vector data. The page vector data is converted into tile vector data on the basis of the evaluation result. With this processing, tile vector data in which the curve object is appropriately segmented on tiles can be generated.

[Fourth Embodiment]

Figure 29:
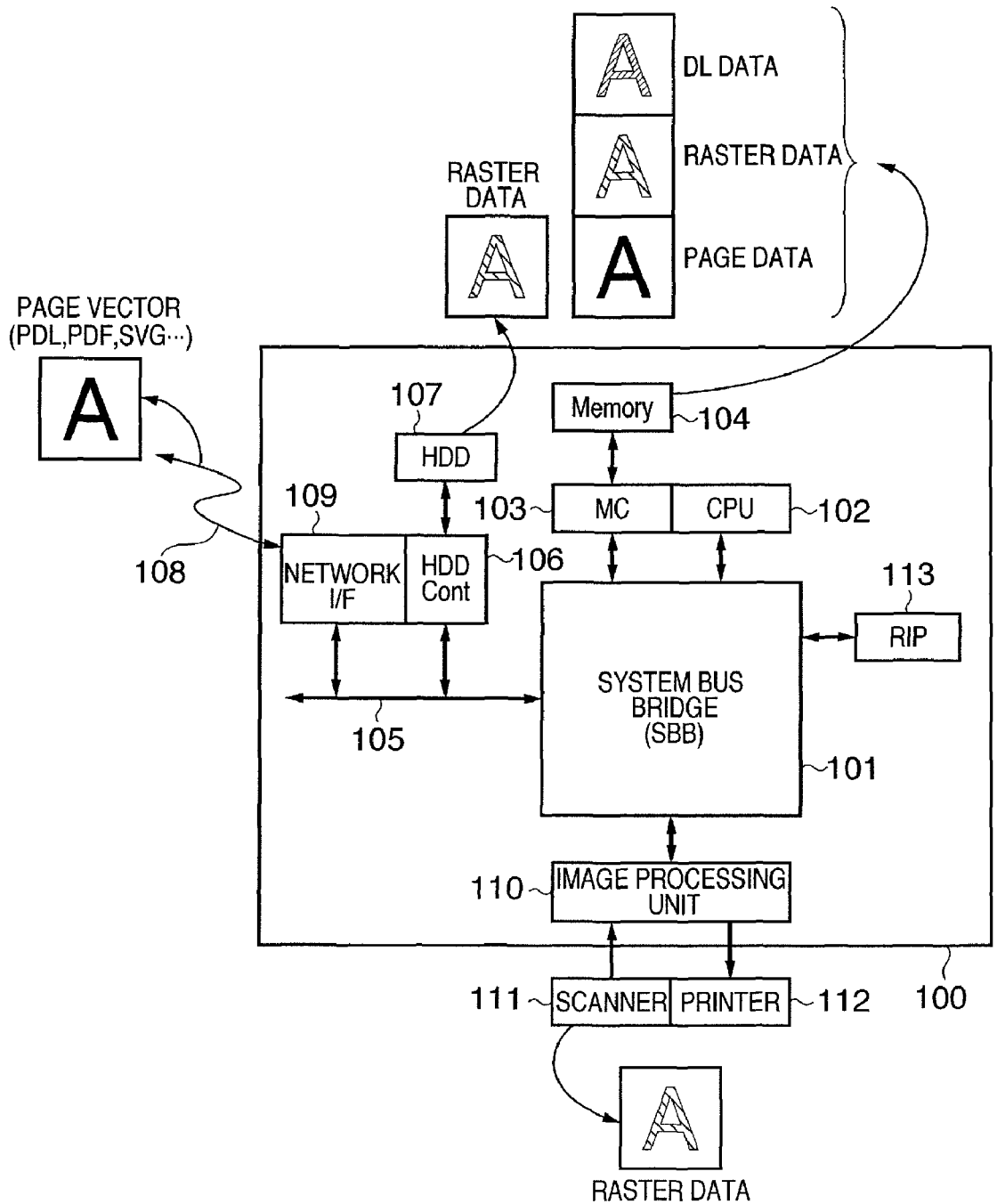
FIG. 29 is a block diagram showing the configuration of a conventional image processing system.

In the conventional system shown in FIG. 29, the RIP 113 generates raster data by rendering page vector data after the resolution of each image object contained in the page vector data is converted in accordance with the rendering resolution.

At the time of resolution conversion, an image object is enlarged/reduced by a nearest-neighbor method without interpolation processing, or interpolation processing such as a bilinear method or bicubic method is executed to avoid any side effect of aliasing. In addition, the plurality of kinds of interpolation processing are switched, or the interpolation region is extended from the boundary of the image object in executing interpolation processing, as disclosed in Japanese Patent Registration No. 3111971.

In the first embodiment, for example, several methods to be described below are available to convert page vector data containing an image object into tile vector data.

In segmenting vector data containing an image object into tile vector data, the image object itself is copied and embedded in a plurality of tiles which include the single image object. If the whole image object is embedded in each of N tiles which include the image object, the total data amount of the page (image data) increases by (N−1) times of the image object size. In this case, the data amount increases along with conversion to tile vector data.

On the other hand, an image object extending over a plurality of tiles is segmented at tile boundaries. Each segmented part of the image object is embedded in corresponding tile vector data. When this method is employed, the increase in data amount in tile vector data conversion can be avoided.

To convert the resolution of an image object in accordance with the resolution after rendering, interpolation processing such as a bilinear method or bicubic method can be selected. However, in this case, the image object segmented at the tile boundaries has no pixels outside the tile boundaries.

For this reason, if such interpolation processing is executed, and page raster data containing tile raster data is generated by rendering tile vector data, a discontinuous region of the image object is generated at positions corresponding to the tile boundaries on the page vector data, resulting in poor image quality.

To solve the problem of the above-described two methods, if an image object is to be segmented at tile boundaries, some of the pixels of the image object are duplicated. Then, the pixels outside the tile boundaries, which are necessary for interpolation processing, are also embedded in the tile vector data.

When this method is used, the problem of increase in data and the problem of poor image quality by interpolation processing can be solved. However, even when this method is employed, duplication of pixels is necessary. Hence, even in this method, the data amount still increases upon conversion to tile vector data, though the increase amount is not so large as in the above-described methods.

In the fourth embodiment, especially, the increase in data amount in converting page vector data containing an image object into tile vector data is suppressed, and no interpolation processing that degrades the image quality is executed. Image object segmentation processing capable of suppressing even aliasing will be described.

The fourth embodiment considers the fact that the resolution of an image object is generally 300 dpi or less, i.e., lower than the print resolution that is normally 600 dpi or more in most cases. This embodiment also considers that fact that the problem of aliasing is more conspicuous in image reduction than in image enlargement.

In the fourth embodiment, a threshold resolution is defined. In segmenting a single image object, if the resolution of the image object is higher than the threshold resolution, neighboring pixels outside the tile boundaries are duplicated and held in vector tile data. If the resolution of the image object is lower than the threshold resolution, neighboring pixels outside the tile boundaries are not duplicated and held in vector tile data.

In rendering an image object, if no neighboring pixels outside the tile boundaries are present, the resolution is converted by a nearest-neighbor method. If neighboring pixels outside the tile boundaries are present, the resolution is converted by using interpolation processing such as a bicubic method or bilinear method. That is, the conversion method is adaptively switched. With this arrangement, the increase in data amount by tile segmentation of an image object is suppressed, and aliasing is also suppressed even without interpolation processing.

In the fourth embodiment, an application example of object segmentation processing in step S605 in FIG. 10 of the first embodiment will be described below.

In the fourth embodiment, object segmentation processing executed by a tile/page vector conversion unit 13 especially when the processing target object is an image object will be described.

Tile segmentation of an image object extending over at least one tile will be described with reference to FIG. 20.

FIG. 20 is a view for explaining image object tile segmentation according to the fourth embodiment of the present invention.

An image object 2000 shown in FIG. 20 is contained in page vector data. When segmented into tile vector data, the image object 2000 exists over tiles 1402 to 1405 on the basis of the layout coordinates.

In object segmentation processing by the tile/page vector conversion unit 13, first, the resolution of the image object 2000 is compared with a predetermined resolution (threshold resolution: e.g., 600 dpi).

The predetermined resolution is normally the resolution of raster data generated by a RIP 18. If raster data having a plurality of kinds of resolutions can be generated, the lowest resolution may be used as the predetermined resolution.

If the resolution of the image object 2000 is lower than the predetermined resolution as a result of comparison, the image object 2000 extending over the tiles 1402 to 1405 is segmented at the tile boundaries of the tiles 1402 to 1405. Segmented image objects 1406 to 1409 are embedded in the corresponding tiles 1402 to 1405, respectively.

If the resolution of the image object 2000 is higher than the predetermined resolution, the image object 2000 extending over the tiles 1402 to 1405 is segmented such that parts of the image object 2000 beyond the tile boundaries of the tiles 1402 to 1405 overlap with each other. Segmented image objects 1410 to 1413 are embedded in the corresponding tiles 1402 to 1405, respectively.

The image object segmentation processing will be described next in detail with reference to FIG. 21.

FIG. 21 is a flowchart showing details of image object segmentation processing according to the fourth embodiment of the present invention.

(Step S1501)

A tile of interest as a tile vector data generation target is selected.

(Step S1502)

The tile boundaries of the tile of interest are projected to image coordinates that define the image object as the processing target.

(Step S1503)

A convex polygon formed from the tile boundaries projected to the image coordinates and the outer periphery of the image object itself is calculated. A perpendicular rectangle circumscribed to the convex polygon is calculated.

(Step S1504)

The resolution of the image object is compared with the predetermined resolution to determine whether the resolution of the image object is higher than the predetermined resolution. If the resolution of the image object is equal to or lower than the predetermined resolution (NO in step S1504), the flow advances to step S1505. If the resolution of the image object is higher than the predetermined resolution (YES in step S1504), the flow advances to step S1507.

(Step S1505)

The perpendicular rectangle circumscribed to the convex polygon is set as boundaries to segment the image object.

(Step S1506)

Information representing that the segmented image object has no pixels outside the tile boundaries is stored in the system memory 5.

(Step S1507)

If the resolution of the image object is higher than the predetermined resolution in step S1504, an enlarged rectangle is calculated by enlarging the perpendicular rectangle circumscribed to the convex polygon by a size corresponding to the reference region of interpolation processing.

(Step S1508)

The enlarged rectangle is set as boundaries to segment the image object.

(Step S1509)

Information representing that the segmented image object has pixels outside the tile boundaries is stored in the system memory 5.

(Step S1510)

An image having the set boundaries as the outer periphery is extracted from the image object as the processing target.

(Step S1511)

The extracted image is added to the tile of interest as an image object, and the processing is ended.

A detailed example of the image object segmentation processing in FIG. 21 will be described next with reference to FIGS. 22A to 22G.

FIGS. 22A to 22G are views showing a detailed example of image object segmentation processing according to the fourth embodiment of the present invention.

Figure 22E:
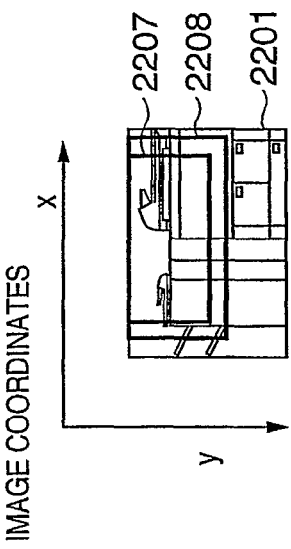
FIGS. 22A to 22G are views showing a detailed example of image object segmentation processing according to the fourth embodiment of the present invention.
Figure 22F:
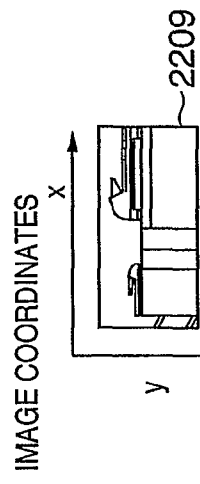
Figure 22G:
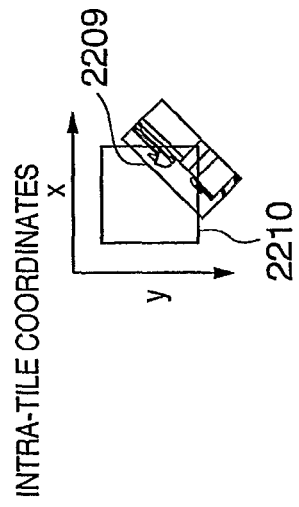
Figure 22C:
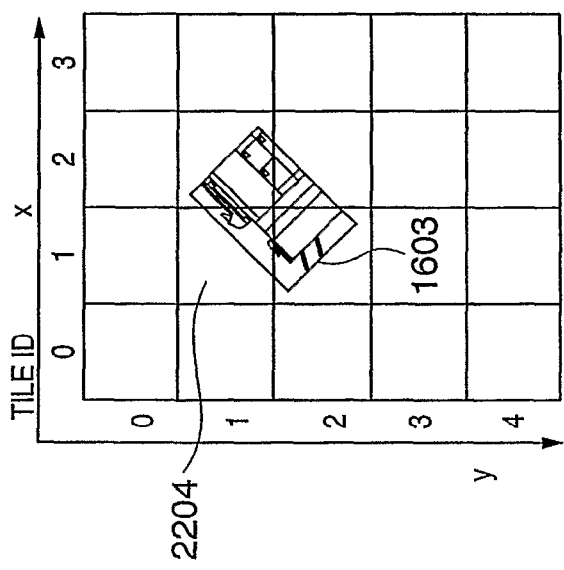
Figure 22D:
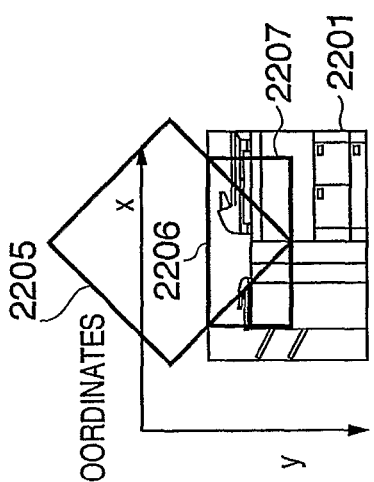
Figure 22A:
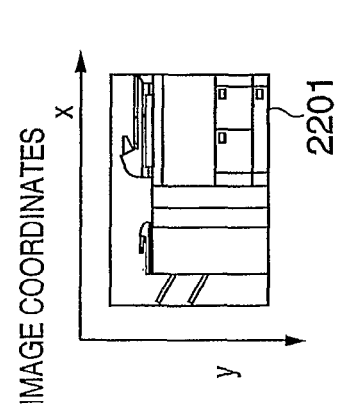
Figure 22B:
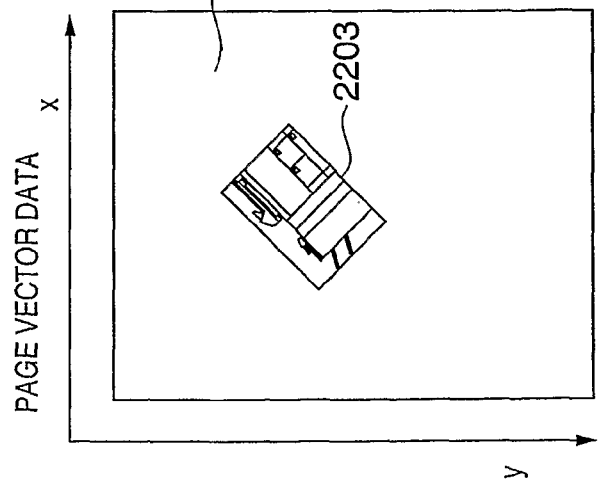

An image object 2201 has unique image coordinates (FIG. 22A). The image object 2201 is projected to the page vector data coordinates of page vector data 2202 by affine transformation (FIG. 22B) and formed as an image 2203 in the page vector data 2202. When the page vector data 2202 is converted into tile vector data, a result shown in FIG. 22C is obtained.

In image object segmentation processing by object segmentation processing (step S605 in FIG. 10), first, a tile 2204 of interest is selected in step S1501 (FIG. 22C).

As shown in FIG. 22D, the tile 2204 of interest is projected to the image coordinates (step S1502). A convex polygon 2206 formed from the tile boundaries of a tile 2205 projected to the image coordinates and the outer periphery of the image object 2201 itself is calculated. A perpendicular rectangle 2207 circumscribed to the convex polygon 2206 is calculated (step S1503).

The resolution of the image object 2201 is compared with a predetermined resolution (step S1504). If the resolution of the image object 2201 is higher than the predetermined resolution (when the image object has a high resolution), an enlarged rectangle 2208 is calculated by enlarging the perpendicular rectangle 2207 circumscribed to the convex polygon 2206 by a size corresponding to the reference region of interpolation processing, as shown in FIG. 22E (step S1507).

An image object 2209 segmented from the image object 2201 is generated by using the enlarged rectangle 2208 as boundaries, as shown in FIG. 22F (step S1510). The image object is embedded in a tile of interest 2210, as shown in FIG. 22G (step S1511). The tile of interest 2210 has unique intra-tile coordinates. The segmented image object 2209 is projected to the intra-tile coordinates as the image object 2209.

The processing of rasterizing an image object in step S77 in FIG. 11 will be described next in detail with reference to FIG. 23.

Figure 23:
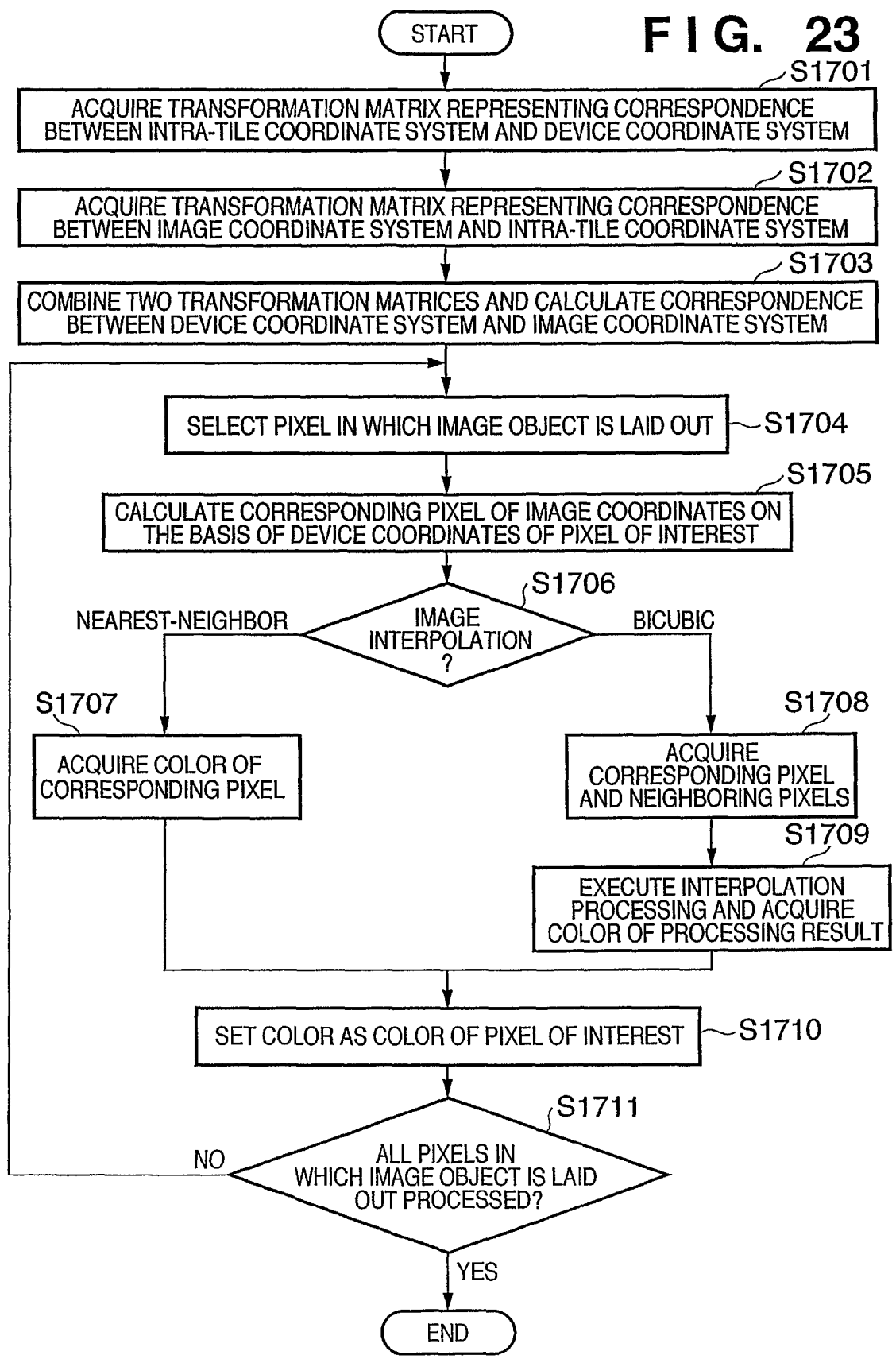
FIG. 23 is a flowchart showing details of image object rasterization in step S77 according to the fourth embodiment of the present invention.

FIG. 23 is a flowchart showing details of image object rasterization in step S77 according to the fourth embodiment of the present invention.

(Step S1701)

First, a first transformation matrix representing the correspondence between the intra-tile coordinate system and the device coordinate system is acquired. The device coordinate system is defined for the entire page formed from tile vector data as, e.g., the coordinate system shown in FIG. 8.

(Step S1702)

A second transformation matrix representing the correspondence between the intra-tile coordinates and the image coordinate system of the image object is acquired.

(Step S1703)

A third transformation matrix is generated by combining the first transformation matrix acquired in step S1701 and the second transformation matrix acquired in step S1702. The correspondence between the device coordinate system and the image coordinate system is calculated by using the third transformation matrix.

(Step S1704)

In the device coordinate system, a pixel of interest is selected in the region where the image object is laid out.

(Step S1705)

On the basis of the device coordinates of the pixel of interest in the device coordinate system, the corresponding pixel of the image coordinates in the image coordinate system is calculated by using the third transformation matrix combined in step S1703.

(Step S1706)

The image object interpolation method is selected on the basis of whether the corresponding pixel of the image object is present outside the tile boundaries. If the pixel is not present outside the tile boundaries, a first interpolation method (nearest-neighbor method) is selected as the interpolation method, and the flow advances to step S1707. If the neighboring pixels of the pixel are present outside the tile boundaries, a second interpolation method (bicubic method) is selected as the interpolation method, and the flow advances to step S1708.

As the interpolation method various kinds of interpolation methods such as the nearest-neighbor method, bicubic method, and bilinear method can be used.

(Step S1707)

The color of the corresponding pixel is acquired.

(Step S1708)

The corresponding pixel and neighboring pixels are acquired.

(Step S1709)

Interpolation processing is executed using the corresponding pixel and neighboring pixels, and the color of the processing result is acquired.

(Step S1710)

The acquired color is set as the color of the pixel of interest.

(Step S1711)

It is determined whether all pixels on the device coordinates of the device coordinate system where the image object is laid out are processed. If all the pixels are not processed yet (NO in step S1711), the flow returns to step S1704. If all the pixels are processed (YES in step S1711), the processing is ended.

As described above, according to the fourth embodiment, in addition to the effects described in the first to third embodiments, tile vector data is generated by adaptively switching the image object tile segmentation method on the basis of the resolution of the image object as the processing target. Hence, the increase in data amount by tile segmentation of an image object can be suppressed, and aliasing is suppressed even without interpolation processing.

[Fifth Embodiment]

In the above-described embodiments, to execute data handling in the image processing system at a high speed in real time, tile vector data is generated and managed in the HDD 8. In the fifth embodiment, in storing tile vector data in an HDD 8, a tile containing no object is managed without writing it in the HDD 8.

With this configuration, data access to the HDD 8 can be speeded up, and the performance of the image processing system can further be improved.

The processing outline and processing flow of the fifth embodiment will be described below with reference to FIGS. 24A, 24B, and 25.

Figure 24:
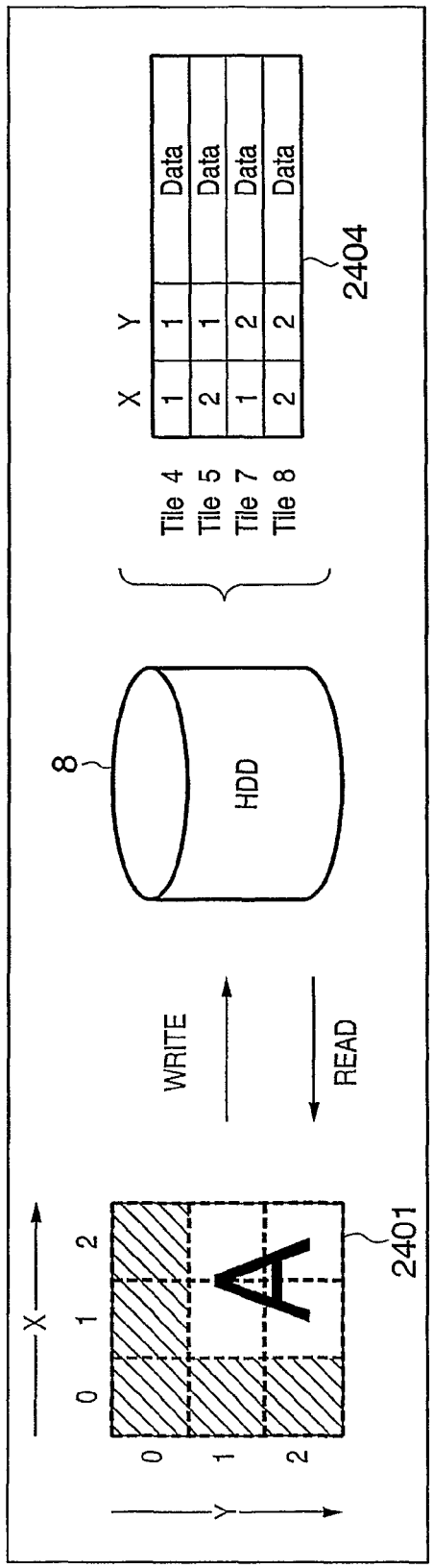
FIGS. 24A and 24B are views for explaining the outline of processing according to the fifth embodiment of the present invention.
Figure 25:
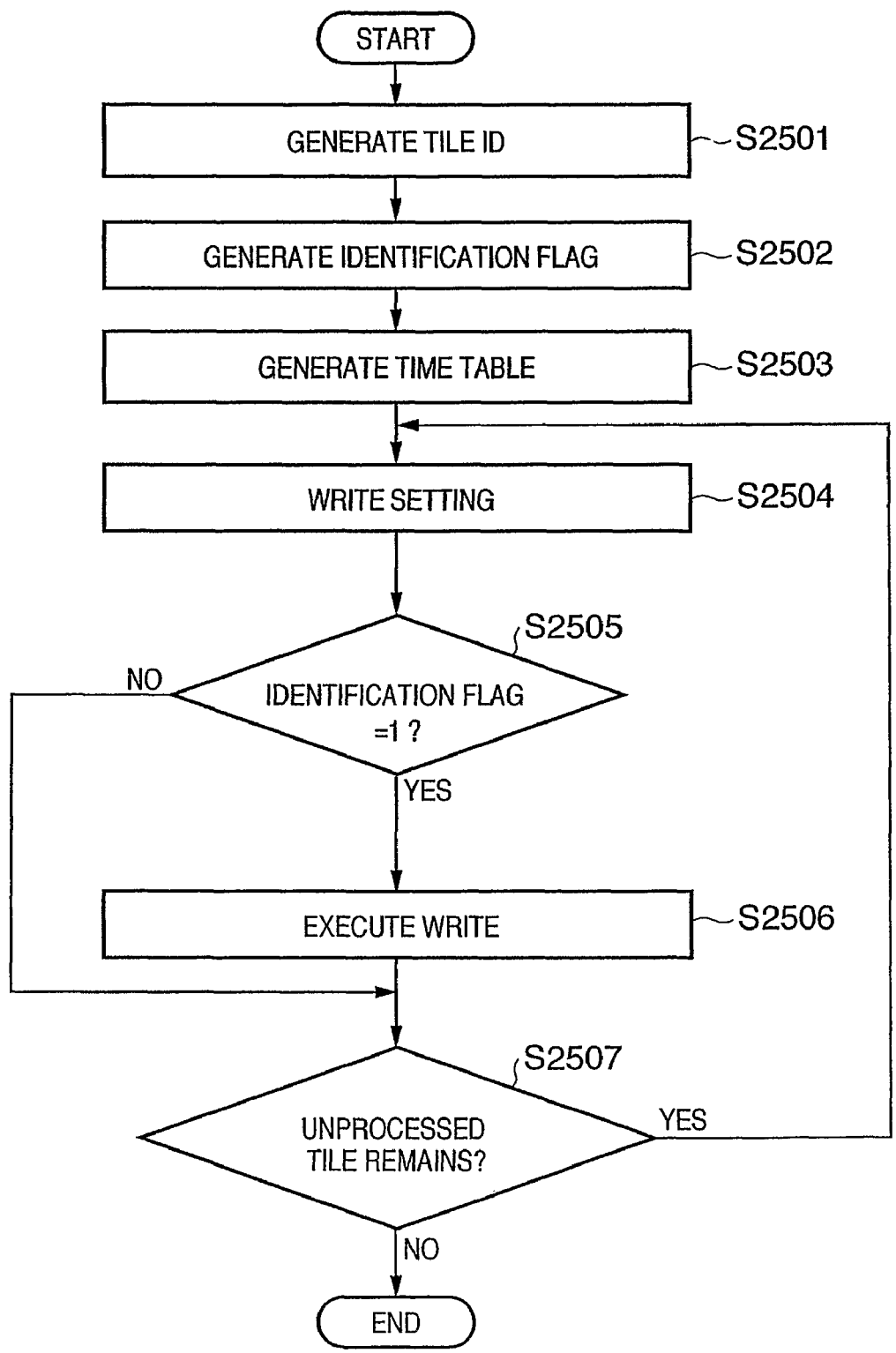
FIG. 25 is a flowchart showing tile vector data write processing according to the fifth embodiment of the present invention.

FIGS. 24A and 24B are views for explaining the outline of processing according to the fifth embodiment of the present invention. FIG. 25 is a flowchart showing tile vector data write processing according to the fifth embodiment of the present invention.

(Step S2501)

In the fifth embodiment, tile vector data is generated by segmenting image data (page vector data or raster data) of one page read in a system memory 5 into blocks (tiles (rectangles)) with a predetermined size. At this time, a tile ID (tile identification information) to identify the position of each tile vector data is generated and set in the header of the tile vector data.

For example, assume that when page vector data 2401 shown in FIG. 24A is segmented into tiles eight-pixel square, the page vector data 2401 is segmented into three tiles in the X direction and three tiles in the Y direction. That is, the page vector data is segmented into a total of nine (=3×3) tile vector data separated by dotted lines. The unit of the tile size, i.e., the number of pixels of one side can be changed by the user operation.

The coordinates of the tiles can be defined by numbering them 0, 1, and 2 in the X direction from the left side and 0, 1, and 2 in the Y direction from the upper side. A combination of the coordinates can be used as a tile ID to identify the position of each tile. For example, the upper left tile is the start of tile vector data and has a tile ID (X,Y)=(0,0). The tile ID of the tile on the right side is (X,Y)=(1,0). The tile ID of the tile at the lower right corner is (X,Y)=(2,2).

(Step S2502)

An object that exists in the page vector data of one page read in the system memory 5 is segmented into a plurality of objects each fitted in one tile, thereby generating tile vector data. To do this, an identification flag (object identification information) to identify the presence/absence of an object in a tile is generated and set in the header of the tile vector data.

More specifically, the presence/absence of an object is analyzed in each tile contained in the page vector data 2401. If an object is present, the identification flag is set to "1". If no object is present, the identification flag is set to "0".

For example, tiles with tile IDs=(0,0), (1,0), (2,0), (0,1), and (0,2) in the page vector data 2401 have no object. Hence, the identification flag is "0". On the other hand, the remaining tiles with tile IDs=(1,1), (1,2), (2,1), and (2,2) have objects. Hence, the identification flag is "1".

(Step S2503)

Tile vector data is generated from the tile IDs to identify the positions of the tiles, the identification flags indicating the presence/absence of an object in the tiles, and tile vectors. For this purpose, a tile table 2402 (tile management table) shown in FIG. 24B is created in the system memory 5. In the tile table 2402, pieces of information such as a tile ID, identification flag, and object contents ("no object" or "data") are managed for each tile. In this case, a tile table containing tiles with tile names Tile 0 to Tile 8 is formed.

(Step S2504)

When generation of the tile table 2402 corresponding to the page vector data 2401 of one page read in the system memory 5 is ended, write setting to start the write of tile vector data from the system memory 5 to the HDD 8 is executed. In this write setting, setting to start the write from the tile data with the tile ID=(0,0) identifying the tile position is executed.

(Step S2505)

On the basis of the tile ID, the identification flag of the processing target tile in the tile table 2402 is referred to. It is determined whether the identification flag is 1. If the identification flag is 1 (YES in step S2505), an object is present in the tile. In this case, the tile is determined to be a write target in the HDD 8, and the flow advances to step S2506. If the identification flag is 0 (NO in step S2505), no object is present in the tile. In this case, the tile is determined not to be a write target in the HDD 8, and the flow advances to step S2507.

(Step S2506)

The processing target tile is written in the HDD 8.

(Step S2507)

The presence/absence of unprocessed tile data is determined. If unprocessed tile data is present (YES in step S2507), the flow returns to step S2504 to set tile data indicated by the next tile ID as processing target tile data. If no unprocessed tile data is present (NO in step S2507), the processing is ended.

A detailed operation of the processing in steps S2504 to S2507 will be described with reference to FIG. 24A.

In step S2504, the tile ID=(0,0) is set. The identification flag corresponding to the tile ID=(0,0) is referred to in the tile table 2402. The value of the identification flag is "0". It is therefore determined that no object is present in the corresponding tile. For this reason, the tile data (Tile 0) with the tile ID=(0,0) is not written in the HDD 8 (the write is inhibited).

Hence, the processing of the tile with the tile ID=(0,0) advances from step S2505 to step S2507. Since an unprocessed tile (tile ID) is present in step S2507, the flow returns to step S2504.

In step S2504, the tile ID=(1,0) is set. The identification flag corresponding to the tile ID=(1,0) is referred to in the tile table 2402. The value of the identification flag is "0". It is therefore determined that no object is present in the corresponding tile. For this reason, the tile data (Tile 1) with the tile ID=(1,0) is not written in the HDD 8 (the write is inhibited).

The values of the identification flags of the tile data (Tile 2 and Tile 3) with the tile IDs=(2,0) and (0,1) are also "0". Hence, the write operation of the tile data in the HDD 8 is inhibited.

The identification flag corresponding to the next tile ID=(1,1) is referred to in the tile table 2402. The value of the identification flag is "1". It is therefore determined that an object is present in the corresponding tile. For this reason, the tile data (Tile 4) with the tile ID=(1,1) is written in the HDD 8.

Hence, the processing of the tile with the tile ID=(1,1) advances from step S2505 to step S2506. When the write is ended, the flow returns to step S2504 because an unprocessed tile (tile ID) is present.

The value of the identification flag of the tile data (Tile 5) with the tile ID=(2,1) is also "1". Hence, the write operation of the tile data in the HDD 8 is executed. The value of the identification flag of the next tile data (Tile 6) with the tile ID=(0,2) is "0". Hence, the write operation of the tile data in the HDD 8 is inhibited. The values of the identification flags of the tile data (Tile 7 and Tile 8) with the tile IDs=(1,2) and (2,2) are "1". Hence, the write operation of the tile data in the HDD 8 is executed.

When the processing for the tile ID=(2,2) is ended, no unprocessed tiles remain, and the write processing is ended.

With the above processing, of the data with the tile names Tile 0 to Tile 8 managed on the tile table 2402, only the tile data with the tile names Tile 4, Tile 5, Tile 7, and Tile 8 are stored in the HDD 8. Hence, the storage capacity of the HDD 8 can be saved. In addition, a tile table 2404 is generated as the tile data storage state in the HDD 8.

Read processing of reading out tile vector data written in the HDD 8 to the system memory 5 will be described next with reference to FIG. 26.

Figure 26:
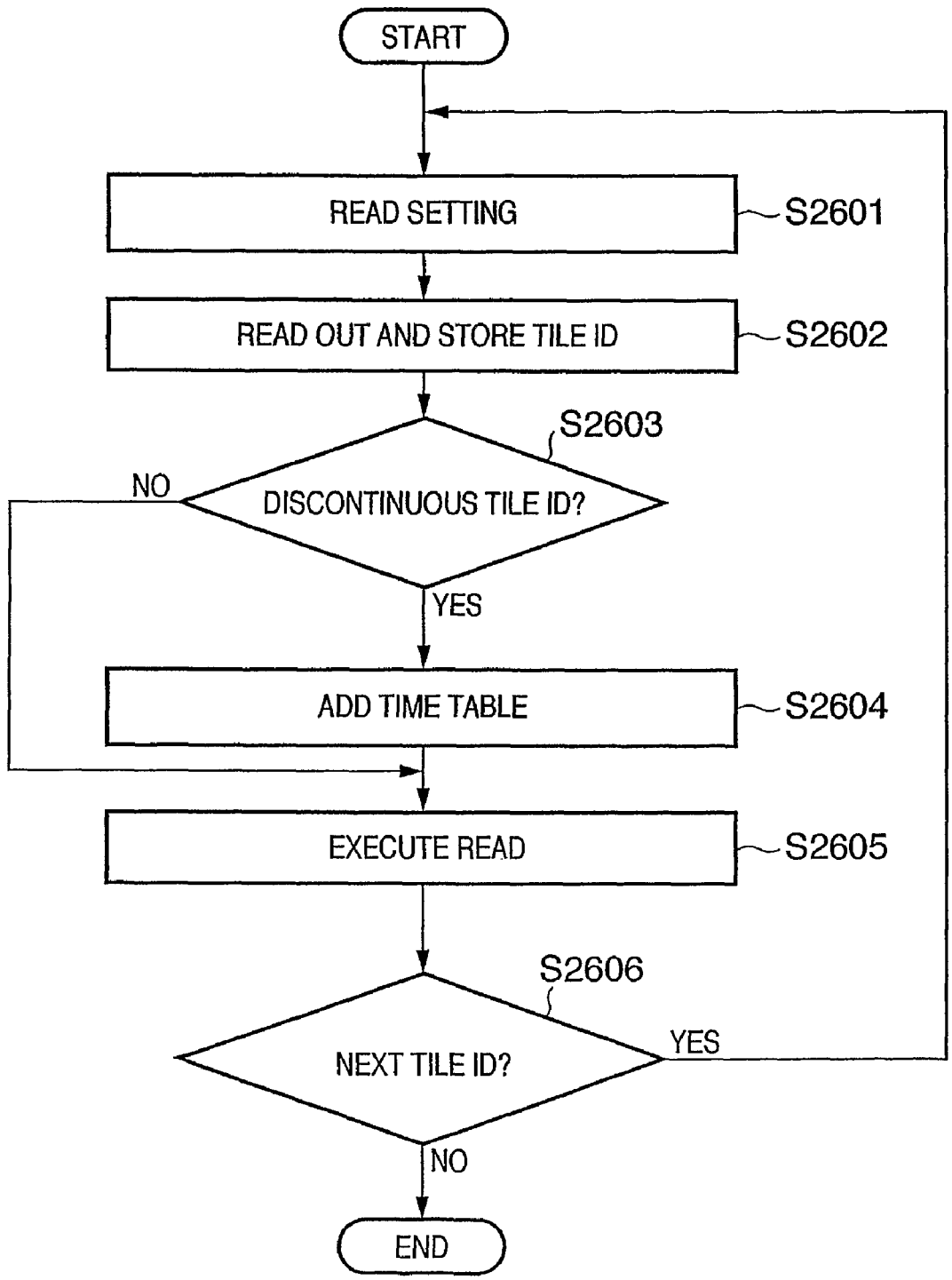
FIG. 26 is a flowchart showing tile vector data read processing according to the fifth embodiment of the present invention.

FIG. 26 is a flowchart showing tile vector data read processing according to the fifth embodiment of the present invention.

(Step S2601)

Tile ID read setting to read out and identify tile data that exits in the HDD 8 is executed.

(Step S2602)

By looking up the tile table 2404 stored in the HDD 8, the tile ID of tile data actually stored in the HDD 8 is read out and stored in the system memory 5.

(Step S2603)

It is determined whether the set tile ID set in the read setting coincides with the read tile ID read out from the HDD 8. With this processing, the presence/absence of a tile ID whose read order is discontinuous is determined. If the tile IDs do not coincide (YES in step S2603), it is determined that a discontinuous tile ID is present, and the flow advances to step S2604. If the tile IDs coincide (NO in step S2603), it is determined that no discontinuous tile ID is present, and the flow advances to step S2605.

(Step S2604)

If a discontinuous tile ID is present, tile data which was not written in the HDD 8 because it contains no object is present. In this case, in the read processing, to reproduce tile vector data containing the tile data as a constituent element, the tile table 2404 must be reconstructed to the tile table 2402.

To do this, data about the tile data corresponding to the discontinuous tile ID is added to the tile table 2404.

(Step S2605)

If no discontinuous tile ID is present, the tile data is read out by looking up the tile table 2404.

(Step S2606)

After the tile data is read out, the presence/absence of an unprocessed tile is determined. If unprocessed tile data is present (NO in step S2606), the flow returns to step S2601 to set tile data indicated by the next tile ID as processing target tile data. If no unprocessed tile data is present (YES in step S2606), the processing is ended.

A detailed operation of the processing in steps S2601 to S2606 will be described with reference to FIG. 24A.

In step S2601, to read out tile data from the HDD 8, the tile position as the read position is set to the start ID=(0,0) (set tile ID).

In step S2602, by looking up the tile table 2404, a tile ID is read out from the HDD 8, and the readout tile ID (read tile ID) is stored in the system memory 5. The readout tile ID is to be used in tile data addition processing to the tile table later. Hence, the log of several latest read tile IDs is saved. In this case, the tile ID=(1,1) is read out from the tile table 2404 stored in the HDD 8.

In step S2603, the tile IDs are compared. The set tile ID is (0,0), and the read tile ID is (1,1). The read order of the tile IDs is discontinuous. That is, a discontinuous tile ID is present. The presence of a discontinuous tile ID indicates the presence of tile data containing no object.

In step S2604, tile data is added to the tile table. That is, tile data corresponding to the read tile ID=(1,1) contains an object. The tile table 2402 is created by adding tile data containing no object regarding the tile IDs=(0,0), (1,0), (2,0), and (0,1) of the preceding discontinuous portion. At this point of time, the tile table 2402 contains the tile names Tile 0 to Tile 3.

In step S2605, tile data with the tile ID=(1,1) is read out from the HDD 8. In step S2606, an unprocessed tile ID is present. Hence, the flow returns to step S2601.

Next, in step S2601, the set tile ID is (2,1). In step S2602, the read tile ID is (2,1). In step S2602, the log of the read tile IDs is saved in the system memory 5. In step S2603, the set tile ID=(2,1) is compared with the preceding read tile ID (1,1). This time, the tile ID read order is continuous. Hence, the flow advances to step S2605 to read out tile data with the tile ID=(2,1) from the HDD 8.

The processing is executed in a similar manner. The tile data regarding the tile ID=(0,2) is added to the tile table 2402. For the tile IDs=(1,2) and (2,2), tile data are read out from the HDD 8.

Since no unprocessed tile ID remains, the read processing is ended. When the read processing is ended, the same tile table 2402 as in the write processing is reproduced. Tile vector data 2405 can be reconstructed (read out) by using the tile table 2402. After the read processing is ended, the log of read tile IDs is erased.

As described above, according to the fifth embodiment, in addition to the effects described in the first to fourth embodiments, in storing, in the HDD, tile vector data generated on the system memory, a tile table that manages tile headers to identify the positions of tile data contained in the tile vector data and flags to identify the presence/absence of an object is created. For tile data containing no object, the write of the tile data in the HDD is inhibited.

With this configuration, the amount of data stored in the HDD can be reduced. In addition, in the write/read processing for the HDD, the number of times of access can be decreased so that a system with high operation performance can be implemented.

[Sixth Embodiment]

In the conventional system shown in FIG. 29, for a font object contained in page vector data, the CPU 102 executes search to check whether a corresponding font object is already registered in a font cache (not shown) provided on the system memory 104. If no corresponding font object is registered, the CPU 102 bitmaps the font object and registers it in the font cache.

When the position of the registered font data on the system memory 104 is designated and registered in intermediate data, the position of the rasterized font data on the system memory 104 is designated in the intermediate data without rasterization processing.

Upon receiving the intermediate data, the image data rasterization unit 113 rasterizes rendering objects except the font and reads out the rasterized font data from the designated position of the font cache. With this processing, bitmap data is created and saved in the system memory 104. Then, image processing is executed by the image processing unit 110 through the SBB 101. The image data is sent to the printer 112 and printed.

An arrangement for effectively using the font cache in such an image processing system is disclosed in, e.g., Japanese Patent Laid-Open No. 10-016319. In this arrangement, a counter is provided for each font cache data. Every time the font cache is hit in intermediate data generation, the counter is incremented. In addition, every time the font cache hit in image data rasterization processing is referred to, the counter is decremented. The font cache data is held until the counter changes to the initial value.

In this arrangement, however, counters must be prepared in number equal to or larger than the number of times of hit. Since it is normally impossible to predict the number of times of appearance of a character in processing target data, a sufficiently large counter is necessary. Since the counter is normally prepared on the same system memory as the font cache, the system memory must have a larger capacity.

To further increase the printing speed, a plurality of interpreters and a plurality of image data rasterization units are provided. When parallel processing is implemented, accesses from the plurality of interpreters and the plurality of image data rasterization units to the counter often occur simultaneously, resulting in high possibility of impeding parallel processing.

To prevent this, in the sixth embodiment, an arrangement will be described in which when a plurality of sub image data rasterization units provided in an image data rasterization unit execute rasterization processing (conversion from vector data to bitmap data) in parallel, font cache data referred to by each sub image data rasterization unit is reliably protected.

In this arrangement to protect the font cache, since the sub image data rasterization units can be operated simultaneously (independently), the parallel operation of image data rasterization processing can be prevented from being impeded.

In this arrangement to protect the font cache, since it is only necessary to prepare registers equal in number to sub image data rasterization units that operate in parallel, independently of the number of times of appearance of a font, the memory utilization can be reduced.

An application example of an image data rasterization unit 18 according to the sixth embodiment will be described below.

The detailed arrangement of the image data rasterization unit 18 will be described with reference to FIG. 27.

Figure 27:
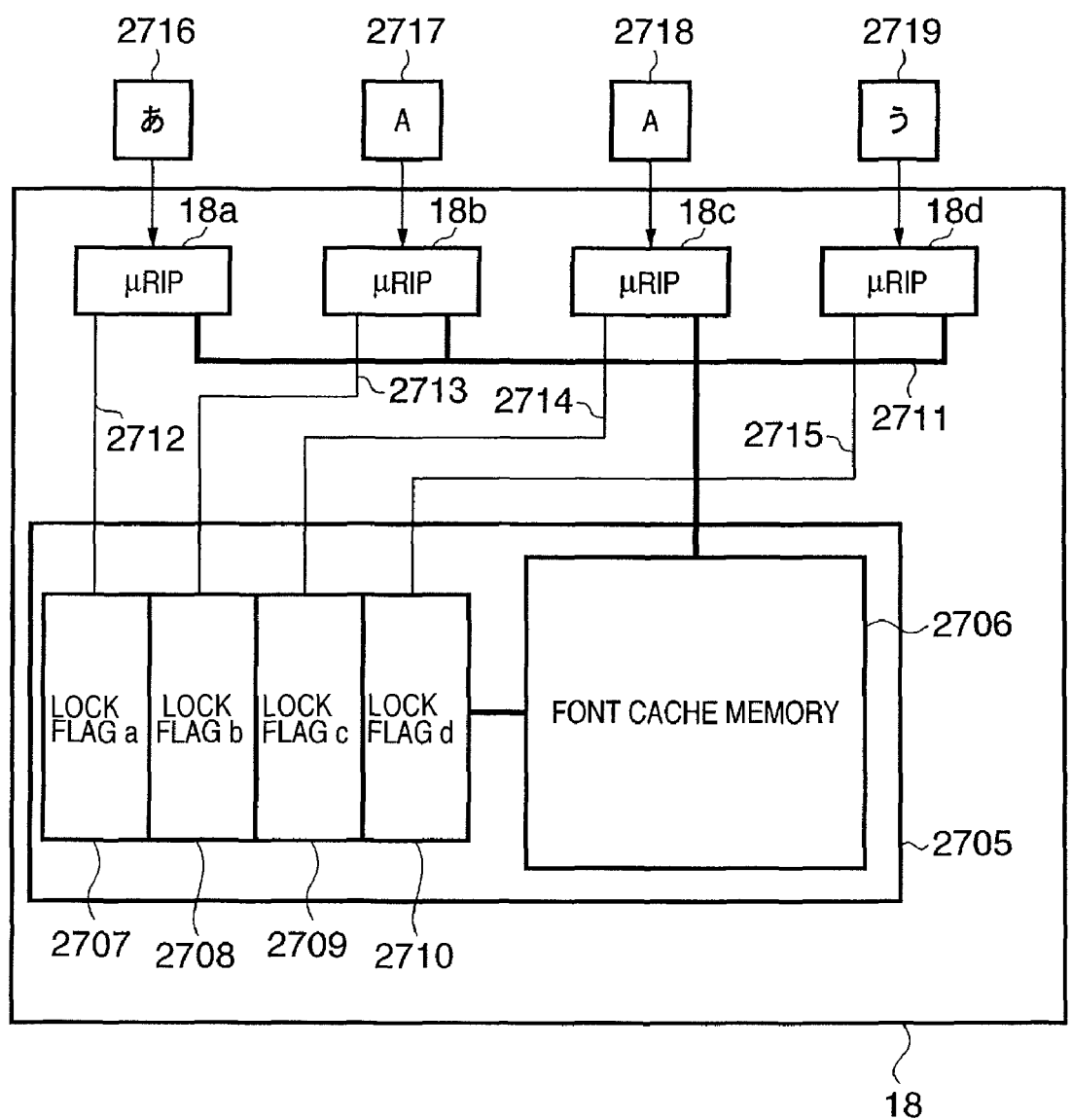
FIG. 27 is a block diagram showing the detailed arrangement of an image data rasterization unit according to the sixth embodiment of the present invention.

FIG. 27 is a block diagram showing the detailed arrangement of the image data rasterization unit according to the sixth embodiment of the present invention.

Sub image data rasterization units (μRIPs) 18a to 18d improve performance by rasterizing tile vectors that are input in parallel. A font cache 2705 saves temporarily rasterized character (font) data for reuse. The font cache 2705 includes a font cache memory 2706 and lock flag registers 2707 to 2710 each of which stores a lock flag representing that the font cache memory 2706 is being referred to. Although not illustrated in FIG. 27, the font cache memory 2706 is allocated on a local memory 19 shown in FIG. 1.

A bus 2711 is used by the μRIPs 18a to 18d to access the common font cache memory 2706. If a character to be rasterized by the μRIPs 18a to 18d is registered in the font cache 2705, rasterization of the character is ended by only reading out the rasterized font data through the bus 2711.

Control signal lines 2712 to 2715 are used by the μRIPs 18a to 18d to independently operate the corresponding lock flag registers 2707 to 2710. The μRIP 18a is connected to the lock flag register 2707. The μRIP 18b is connected to the lock flag register 2708. The μRIP 18c is connected to the lock flag register 2709. The μRIP 18d is connected to the lock flag register 2710.

Reference numerals 2716 to 2719 denote examples of tile vector data to be rasterized by the μRIPs 18a to 18d.

FIG. 27 shows four sets of μRIPs and lock flag registers. However, the number is not limited to four and can be increased or decreased in accordance with the required system performance.

An operation example of the font cache will be described next with reference to FIG. 28.

Figure 28:
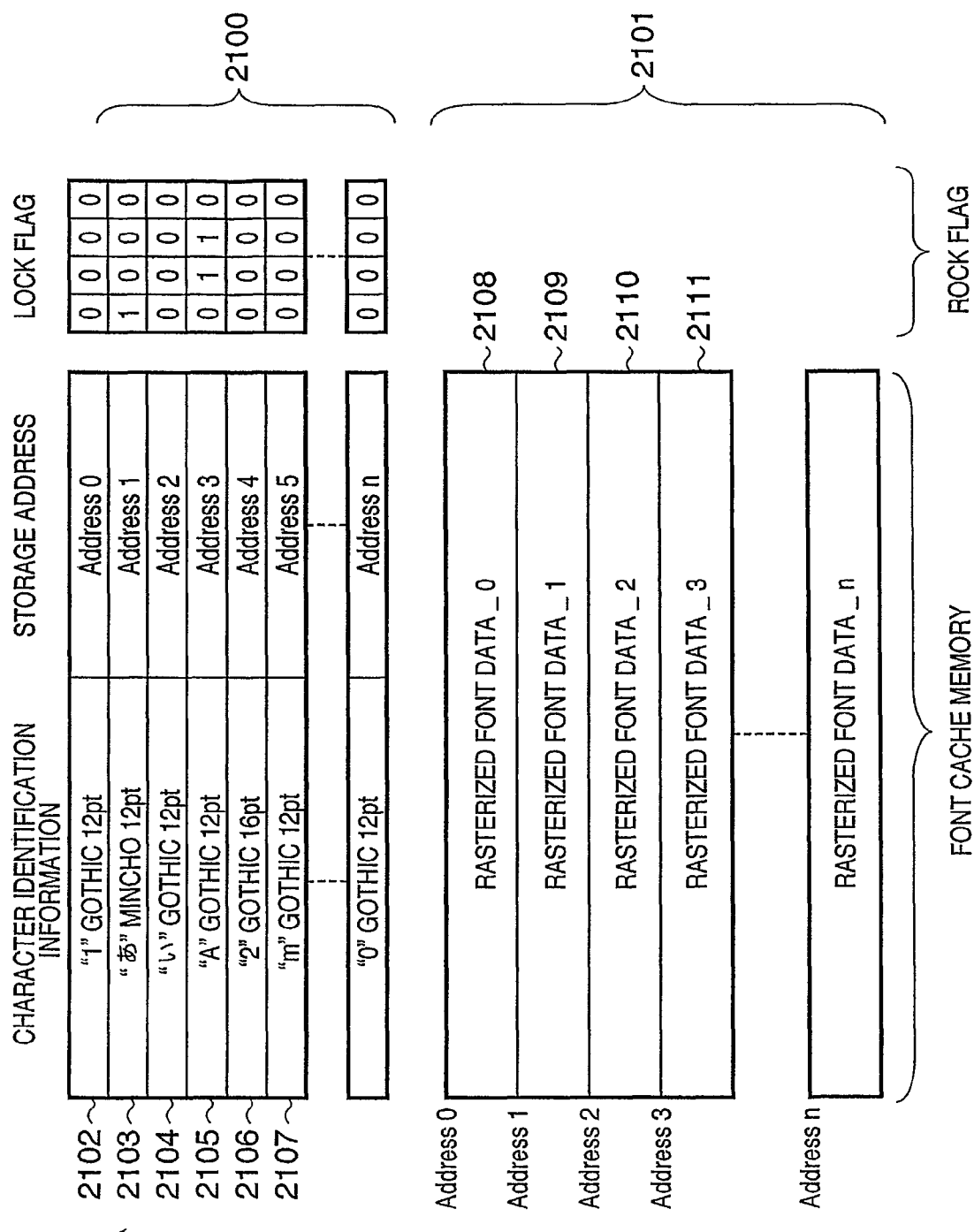
FIG. 28 is a view showing an operation example of a font cache according to the sixth embodiment of the present invention.

FIG. 28 is a view showing an operation example of the font cache according to the sixth embodiment of the present invention.

FIG. 28 shows an example of the font cache 2705 including the font cache memory 2706 and lock flag registers 2707 to 2710.

A font cache management table 2100 manages data in the font cache 2705. A rasterized font data storage unit 2101 includes n storage units. The font cache management table 2100 includes character identification information to identify registered characters, the addresses (storage addresses) of the font cache memory where the rasterized font data of the characters are stored, and lock flag registers equal in number to the sub image data rasterization units (μRIPs).

In the rasterized font data storage unit 2101, the rasterized font data of characters are stored from the storage addresses in the font cache management table 2100.

The font rasterization processing of the μRIPs and the operation of the font cache will be described below with reference to FIGS. 27 and 28.

The μRIP 18a receives the tile vector data 2716. The tile vector data 2716 contains a character "あ". The μRIP 18a searches the font cache management table 2100 for character identification information and recognizes that "あ" is already registered in a data entry 2103 (recognizes "hit").

In this case, since the font data is hit, the μRIP 18a sets "1" in a flag corresponding to the data entry 2103 of the lock flag register 2707 connected through the control signal line 2712, thereby indicating that the font cache memory 2706 is being referred to.

After that, reading of rasterized font data 1 (2109) from "Address 1" indicated by the storage address of the data entry 2103 in the font cache management table 2100 is started. The tile vector data 2716 is rasterized. When reading of the rasterized font data 1 (2109) is ended, the previously set flag corresponding to the data entry 2103 of the lock flag register 2707 is cleared to "0", thereby indicating that reference to the font cache memory 2706 is ended.

The μRIP 18b receives the tile vector data 2717. The tile vector data 2717 contains a character "A". The μRIP 18b searches the font cache management table 2100 for character identification information and recognizes that "A" is already registered in a data entry 2105 (recognizes "hit").

In this case, since the font data is hit, the μRIP 18b sets "1" in a flag corresponding to the data entry 2105 of the lock flag register 2708 connected through the control signal line 2713, thereby indicating that the font cache memory 2706 is being referred to.

After that, reading of rasterized font data 3 (2111) from "Address 3" indicated by the storage address of the data entry 2105 in the font cache management table 2100 is started. The tile vector data 2717 is rasterized. When reading of the rasterized font data 3 (2111) is ended, the previously set flag corresponding to the data entry 2105 of the lock flag register 2708 is cleared to "0", thereby indicating that reference to the font cache memory 2706 is ended.

The μRIP 18c receives the tile vector data 2718. The tile vector data 2718 contains a character "A". The μRIP 18c searches the font cache management table 2100 for character identification information and recognizes that "A" is already registered in the data entry 2105 (recognizes "hit").

In this case, since the font data is hit, the μRIP 18c sets "1" in a flag corresponding to the data entry 2105 of the lock flag register 2709 connected through the control signal line 2714, thereby indicating that the font cache memory 2706 is being referred to.

After that, reading of the rasterized font data 3 (2111) from "Address 3" indicated by the storage address of the data entry 2105 in the font cache management table 2100 is started. The tile vector data 2718 is rasterized. When reading of the rasterized font data 3 (2111) is ended, the previously set flag corresponding to the data entry 2105 of the lock flag register 2709 is cleared to "0", thereby indicating that reference to the font cache memory 2706 is ended.

The μRIP 18d receives the tile vector data 2719. The tile vector data 2719 contains a character "う". The μRIP 18d searches the font cache management table 2100 for character identification information and recognizes that "う" is not registered (recognizes "miss").

In this case, since miss has occurred, the μRIP 18d rasterizes the character "う". When the rasterization processing is ended, the rasterized font data of the character "う" is registered in the font cache memory 2705. At this time, the μRIP 18d refers to the lock flag register of the font cache management table 2100. The μRIP 18d operates to select rasterized font data to be replaced from data without any flag set, i.e., data which are not referred to by any μRIP. If the contents of the lock flag register are in the state shown in FIG. 28, the data entries 2103 and 2105 are excluded from the replacement candidates.

With the above-described arrangement and operation of the font cache, when the plurality of sub image data rasterization units (μRIPs) are to execute rasterization processing (conversion from vector data to bitmap data) in parallel, rasterized font data (font cache data) referred to by a sub image data rasterization unit has a set lock flag. The font data is not subjected to replacement and can therefore be protected reliably.

Lock flag registers are prepared for the respective μRIPs and can therefore be operated independently. For this reason, they are excluded from factors that impede the parallel operation of the μRIPs. In addition, it is only necessary to prepare lock flag registers equal in number to the μRIPs. Hence, the arrangement can be implemented by using a small resource (e.g., memory) as compared to replacement protection by counters based on the number of times of appearance.

In the sixth embodiment, the font cache is arranged on the local memory 19 in the image data rasterization unit. However, the font cache may be formed on a system memory 5.

As described above, according to the sixth embodiment, when the plurality of sub image data rasterization units provided in the image data rasterization unit are to execute rasterization processing (conversion from vector data to bitmap data), font cache data referred to by each sub image data rasterization unit can be protected reliably.

According to this configuration, since the sub image data rasterization units can operate simultaneously (independently), the parallel operation of image data rasterization processing is not impeded. In addition, since it is only necessary to prepare registers equal in number to sub image data rasterization units that operate in parallel, independently of the number of times of appearance of a font, the memory utilization can be reduced.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-157607, filed May 30, 2005, which is hereby incorporated by reference herein in its entirety.

The invention claimed is:

1. An image processing apparatus comprising:
an input device configured to input data;
an output device configured to output data;
a first converter configured to segment raster image data into blocks each having a predetermined size smaller than a page, and to generate block vector data by executing vectorization processing for each of the segmented blocks;
a memory configured to store the block vector data;
a rasterization device configured to rasterize the block vector data into raster image data;
a second converter configured to convert page vector data into block vector data of blocks each having a predetermined size smaller than a page; and
an image data transfer controller configured to control transfer of data as a processing target in the apparatus to
cause said first converter to generate block vector data based on raster image data input by said input device when the data input by said input device is the raster image data,
cause said second converter to convert page vector data input by said input device into block vector data when the data input by said input device is the page vector data,
cause said memory to store the block vector data generated by said first converter and the block vector data converted by said second converter, and
cause said output device to output the raster image data obtained by causing said rasterization device to rasterize the block vector data stored by said memory.

2. An image processing apparatus comprising:
an input device configured to input data;
an output device configured to output data;
a first converter configured to segment raster image data into blocks each having a predetermined size smaller than a page, and to generate block vector data by executing vectorization processing for each of the segmented blocks;
a memory configured to store the block vector data;
a rasterization device configured to rasterize the block vector data into raster image data;
a second converter configured to convert block vector data corresponding to one page into page vector data representing the whole page; and
an image data transfer controller configured to control transfer of data as a processing target in the apparatus to
cause said first converter to generate block vector data based on raster image data input by said input device,
cause said memory to store the block vector data generated by said first converter,
cause said output device to output raster image data that is obtained by causing said rasterization device to rasterize the block vector data stored by said memory when it is determined that a format of the data to be output by said output device is a raster image data format, and
cause said output device to output page vector data that is obtained by causing said second converter to convert the block vector data stored by said memory when it is determined that the format of the data to be output by said output device is a vector data format.

3. The apparatus according to claim 1, wherein said input device includes
an image processing unit, which inputs raster image data from a scanner unit, and
an interface, which inputs page vector data transmitted from an external device.

4. The apparatus according to claim 1, wherein said output device includes an image processing unit which outputs the raster image data to a printer unit.

5. The apparatus according to claim 2, wherein said output device includes an interface unit which outputs the page vector data to an external device.

6. The apparatus according to claim 1, wherein said image data transfer controller includes a bus arbitration device, connected to each of said input device, output device, first converter, memory, rasterization device, and second converter through a bus and configured to execute arbitration control of the bus to be used to transfer the data as the processing target in accordance with the data as the processing target.

7. The apparatus according to claim 2,
wherein said image data transfer controller controls transfer of the data as the processing target in the apparatus to cause said memory to store the block vector data generated by said first converter and page vector data corresponding to the block vector data in association with each other, and
wherein said image data transfer controller causes said output device to output the page vector data stored by said memory when it is determined that the format of the data to be output by said output device is a vector data format.

8. The apparatus according to claim 1, wherein, for converting the page vector data containing a curve object into the block vector data, said second converter includes:
a calculator configured to calculate a convex polygon including the curve object,
an evaluation device configured to evaluate whether the convex polygon calculated by said calculator crosses a side of a block of interest,
an intersection point calculator configured to calculate an intersection point between the curve object and a side of interest of the block of interest based on an evaluation result obtained by said evaluation device, and
a segmentation device configured to segment the curve object into blocks based on the intersection point calculated by said intersection point calculator.

9. The apparatus according to claim 1, wherein, for converting the page vector data containing an image object into the block vector data, said second converter includes:
a comparison device configured to compare a resolution of the image object with a predetermined resolution,
a first segmentation device configured to segment the image object extending over a plurality of blocks at each block boundary of the plurality of blocks when the resolution of the image object is not more than the predetermined resolution as a result of comparison by said comparison device, and
a second segmentation device configured to segment the image object extending over the plurality of blocks such that parts of the image object beyond each block boundary of the plurality of blocks partially overlap when the resolution of the image object is higher than the predetermined resolution as the result of comparison by said comparison device.

10. The apparatus according to claim 9, wherein said rasterization device
1) rasterizes the block vector data into raster image data by using a first interpolation method of interpolating the image object based on a pixel of interest of the image object included in the block vector data when the block vector data is segmented by said first segmentation device, and
2) rasterizes the block vector data into raster image data by using a second interpolation method of interpolating the image object based on a pixel of interest and a neighboring pixel of the image object included in the block vector data when the block vector data is segmented by said second segmentation device.

11. The apparatus according to claim 9, wherein the predetermined resolution is a resolution of the raster image data generated by said rasterization device.

12. The apparatus according to claim 1, further comprising
a write controller configured to control writing of the block vector data by said memory, wherein
when the block vector data contains an object, said write controller causes said memory to write the block vector data of a block containing the object, and
when the block vector data contains no object, said write controller inhibits said memory from writing the block vector data of a block containing no object.

13. The apparatus according to claim 12, wherein said write controller
generates a block management table in which block identification information to identify a position of block vector data and object identification information indicating presence/absence of an object in the block vector data are managed for each block, and
controls said memory to write the block vector data by looking up the block management table.

14. The apparatus according to claim 13, further comprising:
a setting device configured to cause said memory to set block identification information indicating a position of block vector data as a read target;
a reader configured to read out block identification information of block vector data stored by said memory;
a comparison device configured to compare the set block identification information set by said setting device with the read block identification information read out by said reader; and
a generation device configured to generate block vector data based on a comparison result obtained by said comparison device,
wherein, when the set block identification information and the read block identification information are discontinuous based on a result of comparison by said comparison device, said generation device generates the block vector data containing no object corresponding to a discontinuous part.

15. The apparatus according to claim 1, wherein said rasterization device includes a plurality of sub rasterization units to process a plurality of block vector data in parallel.

16. An image processing apparatus comprising:
an input device configured to input data;
an output device configured to output data;
a first converter configured to segment raster image data into blocks each having a predetermined size smaller than a page, and to generate block vector data by executing vectorization processing for each of the segmented blocks;
a memory configured to store the block vector data;

a rasterization device configured to rasterize the block vector data into raster image data, said rasterization device comprising
a plurality of sub rasterization units to process a plurality of block vector data in parallel; and
a font cache unit common to said plurality of sub rasterization units, said font cache unit comprising
a font cache memory; and
a lock flag register to store a lock flag representing that each of said plurality of sub rasterization units is referring to said font cache memory; and
an image data transfer controller configured to control transfer of data as a processing target in the apparatus to cause said first converter to generate block vector data based on raster image data input by said input device, cause said memory to store the block vector data, and cause said output device to output the raster image data obtained by causing said rasterization device to rasterize the block vector data stored by said memory.

17. The apparatus according to claim 16, wherein
when rasterized font data corresponding to font data contained in the block vector data processed by said plurality of sub rasterization unit is present in said font cache unit, said rasterization device sets the lock flag of a corresponding lock flag register, and
when read of the rasterized font data is ended, said rasterization device clears the lock flag.

18. The apparatus according to claim 17, wherein in causing said sub rasterization unit to rasterize font data as a rasterization target into raster data, if no free space is in said font cache memory, said rasterization device replaces the rasterized font data in said font cache memory without no lock flag set in the lock flag register with the font data as the rasterization target.

19. The apparatus according to claim 16, wherein a control signal line to control a corresponding lock flag register is connected to each of said plurality of sub rasterization units.

20. A control method of an image processing apparatus for executing processing for input image data, comprising steps of:
segmenting inputted raster image data into blocks each having a predetermined size smaller than a page, and generating block vector data by executing vectorization processing for each of the segmented blocks;
storing the block vector data in a memory;
rasterizing the block vector data into raster image data, said rasterizing including
sub rasterizing by executing a plurality of rasterizations to process a plurality of block vector data in parallel; and
storing a lock flag representing that, in each of said plurality of rasterizations, a font cache memory is referenced; and
controlling transfer of data as a processing target in the apparatus to
execute said generating of block vector data based on the inputted raster image data,
execute said storing of the block vector data, and
output the raster image data obtained by executing said rasterizing of the block vector data.

21. An image processing method of an image processing apparatus, said method comprising steps of:
segmenting inputted raster image data into blocks each having a predetermined size smaller than a page, and generating block vector data by executing vectorization processing for each of the segmented blocks;
storing the block vector data;
rasterizing the block vector data into raster image data;
converting inputted page vector data into block vector data of blocks each having a predetermined size smaller than a page; and
controlling transfer of data as a processing target in the apparatus to
execute said generating of block vector data based on the inputted raster image data when the inputted data input is the raster image data,
execute said converting of inputted page vector data into block vector data when the inputted data is the page vector data,
execute said storing of the block vector data generated in said generating of block vector data based on the inputted raster image data and the block vector data converted in said converting of page vector data, and
output the raster image data obtained by executing said rasterizing of the block vector data.

22. An image processing method of an image processing apparatus, said method comprising steps of:
segmenting inputted raster image data into blocks each having a predetermined size smaller than a page, and generating block vector data by executing vectorization processing for each of the segmented blocks;
storing the block vector data;
rasterizing the block vector data into raster image data;
converting block vector data corresponding to one page into page vector data representing the whole page; and
controlling transfer of data as a processing target in the apparatus to
execute said generating of block vector data based on the inputted raster image data,
execute said storing of the block vector data generated in said generating of block vector data based on the inputted raster image data,
output raster image data that is obtained from executing said rasterizing of the block vector data when it is determined that a format of the data to be output is a raster image data format, and
output page vector data that is obtained in said converting of block vector data when it is determined that the format of the data to be output is a vector data format.

23. A non-transitory computer-readable storage medium storing, in executable form, a program causing a computer to execute an image processing method, said method comprising steps of:
segmenting inputted raster image data into blocks each having a predetermined size smaller than a page, and generating block vector data by executing vectorization processing for each of the segmented blocks;
storing the block vector data in a memory;
rasterizing the block vector data into raster image data, said rasterizing including
sub rasterizing by executing a plurality of rasterizations to process a plurality of block vector data in parallel; and
storing a lock flag representing that, in each of said plurality of rasterizations, a font cache memory is referenced; and
controlling transfer of data as a processing target in the apparatus to
execute said generating of block vector data based on the inputted raster image data,
execute said storing of the block vector data, and
output the raster image data obtained by executing said rasterizing of the block vector data.

24. A non-transitory computer-readable storage medium storing, in executable form, a program causing a computer to execute an image processing method, said method comprising steps of:

segmenting inputted raster image data into blocks each having a predetermined size smaller than a page, and generating block vector data by executing vectorization processing for each of the segmented blocks;

storing the block vector data;

rasterizing the block vector data into raster image data;

converting inputted page vector data into block vector data of blocks each having a predetermined size smaller than a page; and controlling transfer of data as a processing target in the apparatus to execute said generating of block vector data based on the inputted raster image data when the inputted data input is the raster image data, execute said converting of inputted page vector data into block vector data when the inputted data is the page vector data, execute said storing of the block vector data generated in said generating of block vector data based on the inputted raster image data and the block vector data converted in said converting of page vector data, and output the raster image data obtained by executing said rasterizing of the block vector data.

25. A non-transitory computer-readable storage medium storing, in executable form, a program causing a computer to execute an image processing method, said method comprising steps of:

segmenting inputted raster image data into blocks each having a predetermined size smaller than a page, and generating block vector data by executing vectorization processing for each of the segmented blocks;

storing the block vector data;

rasterizing the block vector data into raster image data;

converting block vector data corresponding to one page into page vector data representing the whole page; and controlling transfer of data as a processing target in the apparatus to execute said generating of block vector data based on the inputted raster image data, execute said storing of the block vector data generated in said generating of block vector data based on the inputted raster image data, output raster image data that is obtained from executing said rasterizing of the block vector data when it is determined that a format of the data to be output is a raster image data format, and output page vector data that is obtained in said converting of block vector data when it is determined that the format of the data to be output is a vector data format.

\* \* \* \* \*